United States Patent
Ausubel

(10) Patent No.: US 7,249,027 B1
(45) Date of Patent: **\*Jul. 24, 2007**

(54) COMPUTER IMPLEMENTED METHODS AND APPARATUS FOR AUCTIONS

(75) Inventor: Lawrence M. Ausubel, Washington, DC (US)

(73) Assignee: Efficient Auctions LLC, Washington, DC (US)

( \* ) Notice: Subject to any disclaimer, the term of this patent is extended or adjusted under 35 U.S.C. 154(b) by 0 days.

This patent is subject to a terminal disclaimer.

(21) Appl. No.: 09/476,877

(22) Filed: Jan. 3, 2000

Related U.S. Application Data

(63) Continuation of application No. 09/303,636, filed on May 3, 1999, now Pat. No. 6,021,398, which is a continuation of application No. 08/775,880, filed on Jan. 2, 1997, now Pat. No. 5,905,975, which is a continuation-in-part of application No. 08/582,901, filed on Jan. 4, 1996.

(60) Provisional application No. 60/009,679, filed on Jan. 4, 1996, provisional application No. 60/030,043, filed on Nov. 5, 1996.

(51) Int. Cl.
   *G06F 99/00* (2006.01)
(52) U.S. Cl. .............................. 705/1; 705/37
(58) Field of Classification Search .................. 705/1, 705/5, 6–8, 10–42; 707/1, 3, 4, 5, 10, 103, 707/104
See application file for complete search history.

(56) References Cited

U.S. PATENT DOCUMENTS

| | | | | |
|---|---|---|---|---|
| 3,573,747 A | \* | 4/1971 | Adams et al. ................. | 705/37 |
| 3,581,072 A | \* | 5/1971 | Nymeyer ..................... | 705/37 |
| 4,789,928 A | \* | 12/1988 | Fujisaki ....................... | 705/37 |
| 5,077,665 A | \* | 12/1991 | Silverman et al. ............ | 705/37 |
| 5,136,501 A | | 8/1992 | Silverman et al. | |
| 5,235,680 A | | 8/1993 | Bijnagte | |

(Continued)

FOREIGN PATENT DOCUMENTS

WO     WO 96/34356     10/1996

(Continued)

OTHER PUBLICATIONS

Onsale: Onsale Brings Thrill of Auctions and Bargain Hunting Online; Unique Internet Retail Service Debuts With Week-Long Charity Auction for The Computer Museum in Boston, Dialog File 610, Accession No. 0489267, May 24, 1995.\*

(Continued)

*Primary Examiner*—Frantzy Poinvil
(74) *Attorney, Agent, or Firm*—Connolly Bove Lodge & Hutz LLP

(57) ABSTRACT

A computer implemented system and method of executing an auction. The system has at least two intelligent systems, one for the auctioneer and at least one for a user. The auction is conducted by the auctioneer's system communicating with the user system(s). The auctioneer's system receives information from the user system(s) based on bid information entered by the user(s). With this information the auctioneer's system determines whether the auction can be concluded or not and appropriate messages are transmitted to the user(s).

108 Claims, 17 Drawing Sheets

U.S. PATENT DOCUMENTS

| | | | |
|---|---|---|---|
| 5,283,731 A | | 2/1994 | Lalonde et al. |
| 5,394,324 A | * | 2/1995 | Clearwater .................. 705/37 |
| 5,664,115 A | * | 9/1997 | Fraser ......................... 705/37 |
| 5,689,652 A | * | 11/1997 | Lupien et al. ................ 705/37 |
| 5,727,165 A | * | 3/1998 | Ordish et al. ................ 705/37 |
| 5,835,896 A | | 11/1998 | Fisher et al. |
| 5,924,083 A | | 7/1999 | Silverman et al. |
| 6,012,045 A | | 1/2000 | Barzilai et al. |
| 6,023,685 A | | 2/2000 | Brett et al. |
| 6,023,686 A | | 2/2000 | Brown |
| 6,047,264 A | | 4/2000 | Fisher et al. |
| 6,243,691 B1 | | 6/2001 | Fisher et al. |
| 2001/0049650 A1 | | 12/2001 | Moshal et al. |
| 2002/0013757 A1 | | 1/2002 | Bykowsky et al. |

FOREIGN PATENT DOCUMENTS

| | | |
|---|---|---|
| WO | WO 97/37315 | 10/1997 |

OTHER PUBLICATIONS

Dialog Abstract: File 610, Acc#0489267; "Onsale: Onsale Brings Thrill of Auctions and Bargain Hunting Online: Unique Internet retail service debuts with week-long charity auction for The Computer Museum in Boston"; May 24, 1995.

"Onsale Joins Fray as Online Shopping Picks Up Speed: Internet Booms"; *Computer Reseller News*; p. 73; Jun. 5, 1995; Dialog: File 16, Acc#05649796.

Siegmann; "Nowhere to Go But Up. (Onsale CEO Jerry Kaplan) (PC Week Inside) (Inside People)"; PC Week; v12 n42; pA5 (1); Oct. 23, 1995; Dialog: File 148, Acc#08222496.

Bidder Information Packet for FCC auction scheduled for Dec. 11, 1995, pp. 33-36, 47, 57-59.

Bidder Information Packet for FCC auction scheduled for Aug. 2, 1995, pp. 99-104.

ACD Market Operations Guide, Sholtz & Associates, LLC, Jan. 3, 1996, pp. 1-5.

J. S. Banks, J. O. Ledyard and D. P. Porter, "Allocating Uncertain and Unresponsive Resources: An Experimental pproach", Rand Journal of Economics, vol. 20, No. 1, Spring 1998 pp. 1-25.

G. Demange, D. Gale and M. Sotomayer, "Multi-Item Auctions", Journal of Political Economy vol. 4, No. 4, 1986, pp. 863-872.

F. Gul and E. Stacchetti, "English Auctions with Multiple Goods", Princeton University and The University of Michigan, Mimeo, Oct. 12, 1995, pp. 1-20.

R. P. McAfee and J. McMillan, "Auctions and Bidding", Journal of Economic Literature, vol. 25, Jun. 1987, pp. 699-738.

K. A. McCabe, S. J. Rassenti and V. L. Smith, "Testing Vickrey's and Other Simultaneous Multiple Unit Versions of the English Auction," Research in Experimental Economics, vol. 4, Greenwich, CT: JAI Press, 1991, pp. 45-79.

F. M. Menezes, Four Essays on Auction Theory, University of Illinois doctoral dissertation, Feb. 1993, pp. 1-97 and 143-152.

P. R. Milgrom and R. J. Weber, "A Theory of Auctions and Competitive Bidding," Econometrica, vol. 50 No. 5Sep. 1982, pp. 1089-1122.

M. H. Rothkopf, T. J. Teisberg and E. P. Kahn, "Why Are Vickrey Auctions Rare?" Journal of Political Economy, vol. 98, No. 1, 1990, pp. 94-109.

U.S. Department of the Treasury, U.S. Securities and Exchange Commission, and Board of Governors of the Federal Reserve System, Joint Report on the Government Securities Market, Washington, D.C. : U.S.G.P.O., Jan. 1992, pp. ix-xvi, 1-34, B-17-B-24.

W. Vickrey, "Counterspeculation, Auctions, and Competitive Sealed Tenders," Journal of Finance, vol. 16, 1961, pp. 8-37.

W. Vickrey, "Auctions and Bidding Games", Recent Advances in Game Theory, Princeton: Princeton University Conference, 1962, pp. 15-29.].

W. Vickrey, "Auctions, Markets, and Optimal Allocation", Bidding and Auctioning for Procurement and Allocation, New York: New York University Press 1976, pp. 13-20.

R. J. Weber, "Multiple-Object Auctions", Auctions, Bidding, and Contracting: Uses and Theory, New York: New York University Press, 1983, pp. 165-191.

R. Wilson, "Auction of Shares", Quarterly Journal of Economics, vol. 94, 1979, pp. 675-689.

* cited by examiner

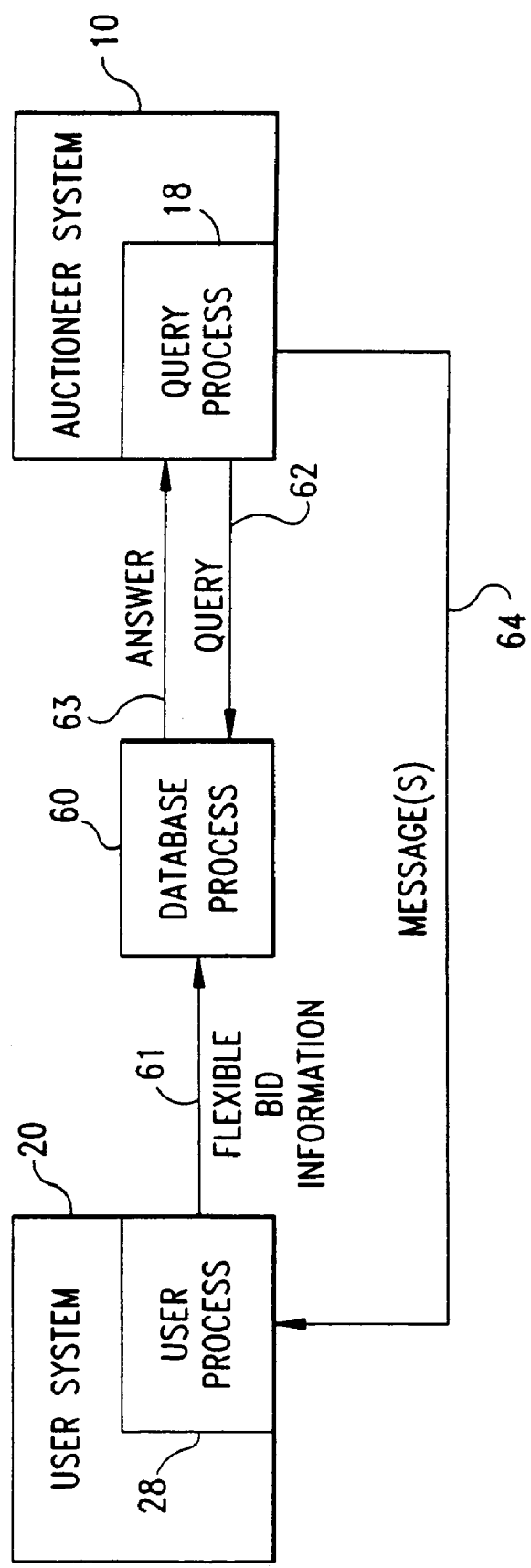

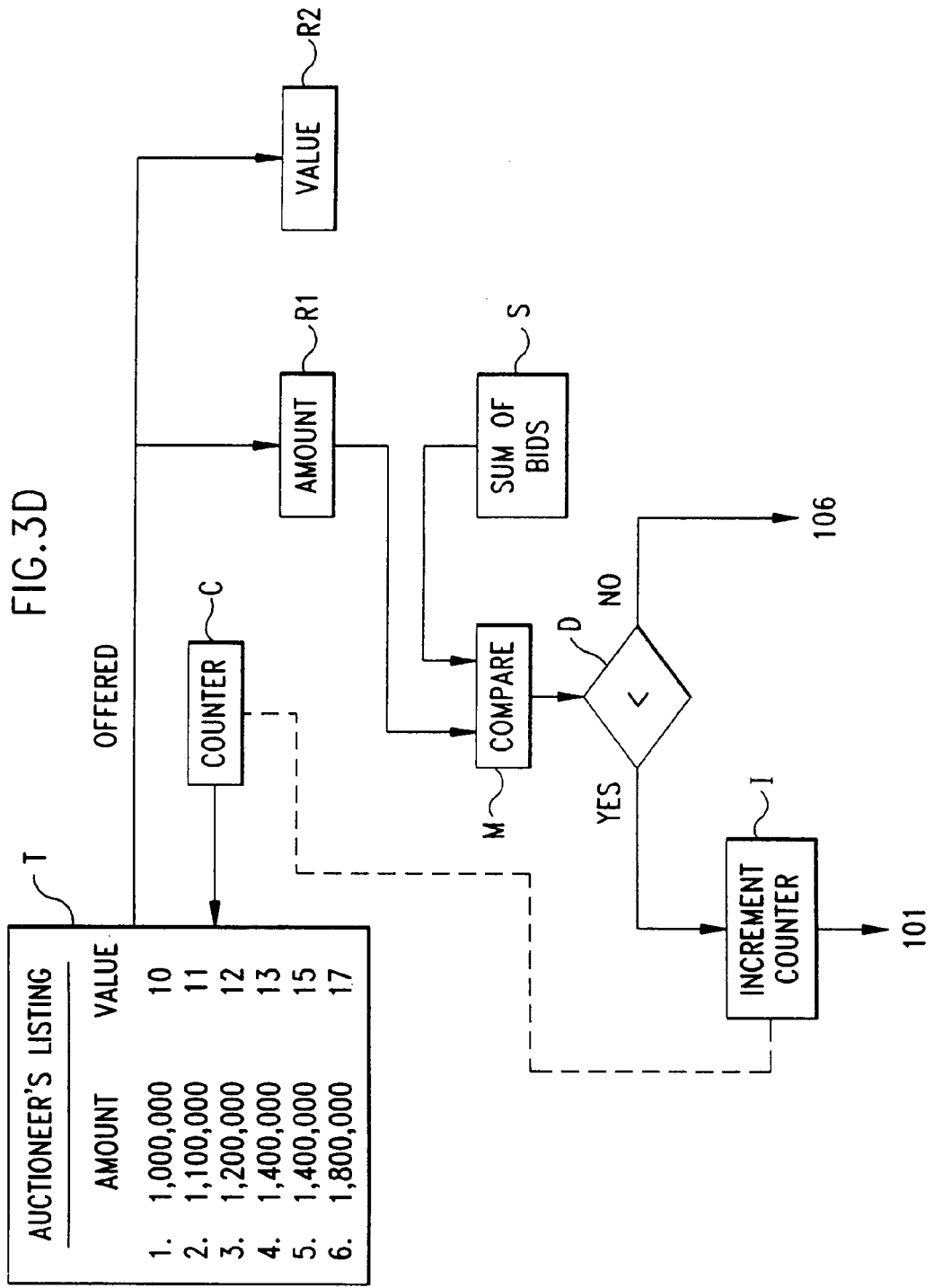

COMPUTER IMPLEMENTED METHODS AND APPARATUS FOR AUCTIONS

RELATED APPLICATION

This application is a continuation of my prior copending application Ser. No. 09/303,636, filed May 3, 1999, now U.S. Pat. No. 6,021,398 which is a continuation of Ser. No. 08/775,880, filed Jan. 2, 1997 now U.S. Pat. No. 5,905,975, which was a continuation-in-part of my prior copending application Ser. No. 08/582,901 filed Jan. 4, 1996. This application is also related to my provisional applications Ser. No. 60/009,679 filed Jan. 4, 1996 and Ser. No. 60/030,043 filed Nov. 5, 1996. The subject matter of these applications are incorporated by this reference.

FIELD OF THE INVENTION

The present invention relates to improving auctions and, more particularly, to implementing an auction, such as a flexible dynamic auction, through the use of a plurality of intelligent, i.e. CPU-based, systems.

BACKGROUND OF THE INVENTION

Auction formats in the art tend generally to be of the sealed-bid or ascending-bid variety. In the standard sealed-bid auction, bidders—in one single bidding round—simultaneously and independently submit bids to the auctioneer, who then determines the auction outcome. In the standard ascending-bid auction, bidders—in a dynamic bidding process—submit bids in real time until no more bids are forthcoming. An ascending-bid format offers the advantage that there is feedback between participants' bids: each bidder is able to infer other bidders' information about the value of the object(s) as the auction progresses and incorporate this information into his subsequent bids. This feedback tends to result in more efficient auction outcomes as well as more aggressive bidding, resulting in higher expected revenues for the seller. However, an ascending-bid format also has the disadvantage that—in complex environments—the auction may last for a long time, and require serious bidders to devote substantially all their time during this extended period of the auction. (For example, some of the ascending-bid auctions conducted by the Federal Communication Commission in 1994-96 have consisted of well over 100 bidding rounds and lasted upwards of three months each. In particular, the D-E-F block broadband PCS auction, which began on Aug. 26, 1996, was still in progress on Dec. 20, 1996, and had already conducted 229 bidding rounds.) In addition, the real-time aspect of the bidding—which gives the standard ascending-bid auction its desirable properties—also implies that any bidder's continued participation (and thus the auction's success) may be imperiled by communication breakdowns or other lapses anytime in the course of the auction. By contrast, while a sealed-bid format does not provide participants the opportunity to respond to their competitors' bids, the auction may be completed much more quickly and requires only a single bid submission by bidders, so participation is less onerous for bidders and may be less susceptible to communication breakdowns.

SUMMARY OF THE INVENTION

The present invention, in one respect, is a computerized system which allows flexible bidding by participants in a dynamic auction, combining some of the advantageous facets of the sealed-bid format with the basic advantages of an ascending-bid format. At any point in the auction, bidders are provided the opportunity to submit not only their current bids, but also to enter future bids (to be more precise, bidding rules which may have the opportunity to become relevant at future times of prices), into the auction system's database. Moreover, participants are continually provided the opportunity to revise their bids associated with all future times or prices which have not already been reached, by entering new bids which have the effect of superseding this bidder's bids currently residing in the auction system's database. Thus, at one extreme, a bidder who wishes to economize on his time may choose to enter his entire set of bidding rules into the computerized system at the start of the auction, effectively treating this as a sealed-bid auction. At the opposite extreme, a bidder who wishes to closely participate in the auction may choose to constantly monitor the auction's progress and to submit all of his bids in real time. Most bidders are likely to select an approach somewhere between these extremes: a bidder may enter a preliminary set of bidding rules at the start of the auction, but then periodically choose to revise his bidding rules as information is generated through the auction process. He can avoid the necessity of spending every minute of his time monitoring the auction, but still avail himself of the opportunity to respond to his competitors' bids. By the same token, the auctioneer can run the auction at a faster pace and using smaller bid increments with the present invention than with a system only permitting contemporaneous bids; no bidder need risk missing a submission deadline and completely losing out on placing desired bids (or being disqualified from the auction), as his bidding rules residing in the auction system database fill in until the bidder chooses to revise them.

In order to obtain the advantages of the invention, each of the bidders uses a dedicated user system and the auction itself is monitored and controlled via an auctioneer's system. The auctioneer's system can communicate messages to each of the user systems. The messages are used to initiate an auction and the message initiating an auction may carry with it information describing the particular auction being initiated. The users may thereafter enter flexible bid information which can include a scalar-value, vector-value or a function. The flexible bid information may be an expression of how many units of object(s) a bidder is willing to purchase at a given price(s), how much money a bidder is willing to pay for the purchase of a given object(s), or any other expression of the willingness-to-pay or value which a bidder places on object(s). Optionally, a bidding rule may also include a limitation (e.g. "I desire up to a quantity of x at a price P, but I do not want any positive quantity at all unless I receive a minimum quantity of y"). Thus, a bidding rule may include an unconditional bid or a contingent bid, and may consist of a function from available information to bid quantities (e.g. a function of the previous bid(s) submitted).

The flexible bid information, once input via a user system, is stored in one or more databases, each of which is accessible to the auctioneer's system.

The auction itself includes a number of queries and answers, queries from the auctioneer's system to the database, and answers to the queries from the database. The auctioneer's system is capable of making a decision based on the answers from the database for determining whether an auction should continue. If a decision is reached indicating that the auction should continue, at least one message is generated and communicated to a user system carrying that information. If a decision is reached to terminate or not to continue the auction, then a final message is generated to at least one user system. The final message may include the results of the auction.

Thus in accordance with the invention, a dynamic flexible computer-implemented auction system comprises:

at least two intelligent systems including an auctioneer's and at least one user system, the auctioneer's system communicatively coupled to each user system, each user system providing an interface with means for receiving messages from the auctioneer's system and for displaying those messages, means for receiving flexible bid information from a user and for transmitting the flexible bid information to a user database, said auctioneer's system providing means for generating and transmitting messages to each user system, means for generating queries for each user database and for receiving answers to the queries from each user database, decision means responsive to the answers from the user database for determining if an auction should continue or not, the decision means initiating the generation of another message to at least one user system in response to a determination to continue the auction, and said decision means initiating the generation of a final message to at least one user system in response to a determination not to continue the action, and the auction system further comprising a user database for each user system, said user database including means for receiving and storing the flexible bid information for a user system, means for receiving queries from the auctioneer's system and for generating and passing answers comprising information based on said flexible bid information to the auctioneer's system in response to queries from the auctioneer's system.

In respect of another aspect, the invention comprises a dynamic flexible computer-implemented auction method implemented in an auction system comprising at least two intelligent systems including an auctioneer's and at least one user system, the auctioneer's system communicatively coupled to all the user systems, each said user system providing an interface for receiving messages from the auctioneer's system and for displaying those messages, for receiving flexible bid information and transmitting the flexible bid information to a user database, said auctioneer's system for generating and transmitting messages to each user system, for generating queries for each user database and for receiving answers to the queries from each user database, said method comprising the steps of:

initiating an auction with a message sent to each user system containing information related to the auction and soliciting bids, entering flexible bid information into at least one user system and storing said flexible bid information in a user database, querying at least one user database for an answer, said query including at least one query parameter, generating an answer to said query at a user database based on the query parameter and the contents of the user database where the answer includes at least one answer parameter, evaluating each said answer at the auctioneer's system to determine if the auction should continue, in the event the auction is not continued, sending a final message to at least one user system containing the results of the auction, in the event the auction is continued, further querying at least one user database with the query containing at least one modified parameter, and repeating selected of the preceding steps until it is determined that an auction should not continue.

In another aspect, the invention relates to an implementation of an efficient auction for multiple dissimilar objects and to an implementation of a generalized English auction for multiple dissimilar objects. These types of auctions are more difficult to implement in that, because the objects are dissimilar and hence must be treated individually, significantly more information is required to be input and processed than in an auction for similar objects.

One of the most compelling advantages of the English auction for a single object over the sealed-bid, second-price auction for a single object is that it protects the bidder possessing the highest value from needing to ever reveal her value to the seller and to other bidders (Rothkopf, Teisberg, and Kahn, 1990; Engelbrecht-Wiggans and Kahn, 1991; Rothkopf and Harstad, 1995). Suppose that a broadcast license were to be sold by second-price, sealed-bid auction. Say that Bidder A, who valued the license the most, placed a value of $200 million on the license, while Bidder B, the second-highest-valuation buyer, placed a value of only $50 million on the license. Assuming independent private values, observe that the dominant-strategy equilibrium in the sealed-bid, second-price auction requires each bidder to submit a sealed bid equaling her true value. However, bidders may fear the following scenario. The seller, knowing after the bidding that Bidder A actually values the license at $200 million, may attempt to renege on the sale, and renegotiate the price above the $50 million established by the auction. Alternatively the seller, after receiving the $200 million sealed bid, may surreptitiously plant a bogus $199 million bid (or enlist a "shill" to insert a bid in his own name). If the seller is the Government, the seller may fear the public-relations disaster when it becomes generally known that it is selling a public asset which Bidder A values at $200 million for a price which is a mere quarter of that value. Finally, there are business reasons why Bidder A may wish to conceal the fact that her value is so high, for example if she is contemplating buying additional broadcast licenses, either from the Government, through subsequent auctions, or from private parties, through negotiations.

By contrast, an English auction avoids this problem. With the valuations described above, Bidder A is only required to reveal in the auction process that she values the license at greater than $50 million. The fact that her true threshold equals $200 million never needs to be elicited. Hence, the seller cannot make opportunistic use of Bidder A's true value to drive up the price, the seller is spared the public embarrassment of failing to capture the difference between the first- and second-highest values, and the highest buyer maintains the secrecy of her value for use in future transactions. Regrettably, the exact value of Bidder B—unlike that of Bidder A—is revealed to the seller in the course of the auction, but ascertaining the second-highest-bidder's valuation seems to be an inevitable part of placing the license in the hands who value it the most.

This aspect of the invention describes implementations of new ascending-bid auctions for selling multiple, dissimilar objects, which have the analogous advantage of conserving on the revelation of high-bidders' values. It begins with the Vickrey auction for multiple, dissimilar objects (often also known as the Groves mechanism or Groves-Clark mechanism), but transforms it into a progressive procedure which stops eliciting information the moment that no further information is needed to determine the efficient allocation. In the language of the analogy questions contained in standardized college admission tests: second-price auction is to English auction, as Vickrey auction is to the auctions proposed in this document.

My prior application Ser. No. 08/582,901 filed Jan. 4, 1996 treats auctions for multiple, identical objects and close substitutes. The earlier application's alternative auction—which may be viewed as a special case of the current auction design—exploits features of the homogeneous-good environment to construct an eminently-simple dynamic procedure. Unfortunately, the case of dissimilar objects does not lend itself to so simple a procedure. The reason for the difference in complexity is immediately identifiable from a cursory look at the corresponding Vickrey auctions for the two environments. With multiple identical objects, all the information which the auctioneer must extract is each bidder's value associated with every possible quantity of the good. If bidders exhibit diminishing marginal values, then it is straightforward for the auctioneer to obtain this information using a single ascending clock in marginal values, and it is unnecessary to run this clock above the marginal value at which the market clears. By contrast, with multiple dissimilar objects, the Vickrey auctioneer needs to extract each bidder's value for every possible subset of the set of objects being auctioned. In some sense, this involves utilizing a multiplicity of ascending clocks, each to obtain information concerning differences in bidders' values between one subset of objects and another.

This application presents two specific procedures for extracting this information in a sequential fashion. The efficient auction procedure is guaranteed to terminate in finite time, and at an efficient allocation of the objects being auctioned. The procedure yields truthful revelation as a weakly-dominant strategy, and will generally conserve on the revelation of values of the highest-valuation bidder. It is not intended to be the unique specific procedure which possesses these properties; rather it is intended to simply demonstrate the existence of a procedure with these properties, and to demonstrate the desirability of a procedure with these properties. The generalized English auction procedure has theoretical properties which are still speculative, but the procedure holds some promise at allowing participants to respond to other participants' bids while also yielding efficient allocations of the objects being auctioned.

BRIEF DESCRIPTION OF THE DRAWINGS

The present invention will be described in the following portions of the specification when taken in conjunction with the attached drawings in which:

FIG. 2 is a functional block diagram illustrating the implementation of a query process in the auctioneer's system, a user process in the user system, and a database process which communicates with both the user process and the query process;

FIG. 3D is a logic diagram showing an exemplary implementation of logic element 105 of FIG. 3A;

DETAILED DESCRIPTION OF PREFERRED EMBODIMENTS

Figure 1:
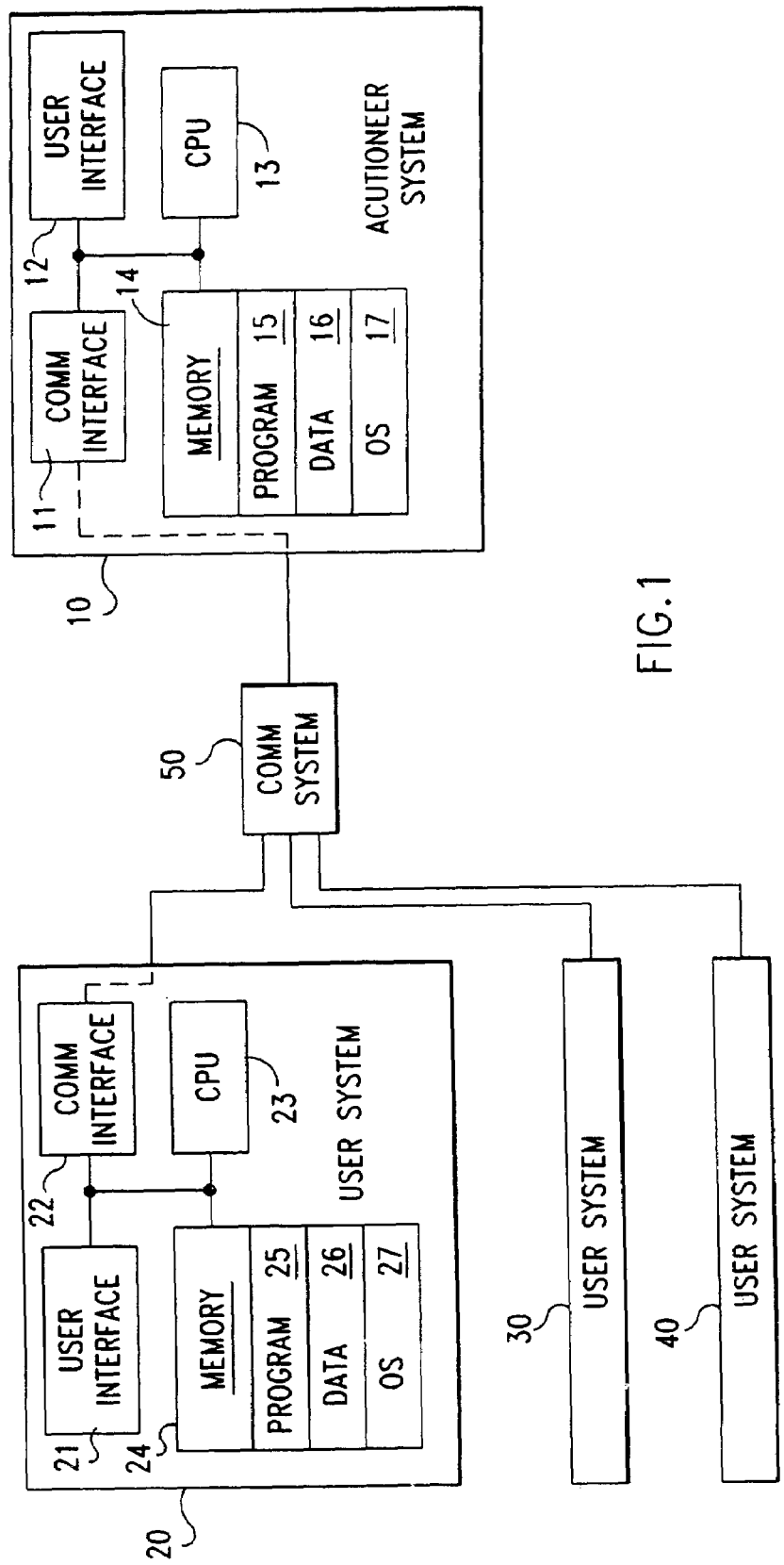
FIG. 1 is a block diagram illustrating a typical flexible dynamic auction system.

Before describing the construction and operation of the invention, defining several terms will be of assistance:

The auctioneer's computer or auctioneer's system implements an auctioneer process or query process and may consist of one or more computers, workstations, or any other hardware items which contain a CPU and may contain an interface including for example a keyboard and display.

Bidder i's computer or user i's system, where $i=1, \ldots, n$, implements a user process and may consist of one or more computers, workstations or other hardware items which contain a CPU and may contain a typical user interface such as a keyboard and display. The integer n ($n \geq 1$) denotes the number of bidder computers and the integer i ($i=1, \ldots, n$) denotes any one of the bidders' computers.

The auction system database for user i implements a database process for user i and may reside on the auctioneer's computer, bidder i's computer, any other computer, any other equipment, or any combination thereof. The database process is capable of doing a database look-up in the database for bidder i based on a query and capable of generating an answer to the query.

A message is a signal or data sent from the auctioneer's system to user i's system. A message may include (but is not required to include or restricted to including) each of the following: the current proposed terms of trade for the auction (e.g. prices and/or quantities), information about the history of bidding (e.g. the total quantity bidders demanded in response to the previous message, the number of remaining bidders, or their identities), an indicator of whether the auction is still in process, a time stamp, the identity of the bidder to whom the message is directed, and information used for security purposes. The set of possible messages includes the null message.

Bidding information may include a bidding rule such as a scalar-value, vector-value or function, and may be an expression of how many units of object(s) a bidder is willing to purchase at a given price(s), how much money a bidder is willing to pay for the purchase of a given object(s), or any other expression of the willingness-to-pay or value which a bidder places on object(s). Optionally, a bidding rule may also include a limitation (e.g. "I desire up to a quantity of x at a price P, but I do not want any positive quantity unless I will receive a minimum quantity of y"). Thus, a bidding rule may indicate the willingness to make an unconditional bid or a contingent bid, and may consist of a function based on available information as to bid quantities (e.g. a function of the previous bids submitted).

A message criterion may be the current message, a future possible message, a set of future possible messages, or a criterion which some future possible messages may satisfy. A response or flexible bid information is a signal or data which may be sent by user i's system to the database for bidder i. A response or flexible bid information may explicitly or implicitly include pairs consisting of: a bidding rule, and a message criterion. The bidding rule in the pair is the desired bidding rule which the bidder would like to be processed in reply to any current or future message satisfying the message criterion of the pair. Optionally, a response may also include other information (e.g. a time stamp, the identity of a bidder, or information used for security purposes). The set of possible responses includes the null response.

A question or query may be as simple as "How many units does bidder i's system request at the current price?" or could be a more complicated query requesting calculations and/or logical operations. The set of possible queries includes the null query. An answer may be "Yes" or "No", a scalar, a vector, or a function. The set of possible answers includes the null answer.

Throughout this document, the terms "objects", "items", and "units" are used essentially interchangeably. The inventive system may be used both for tangible objects, such as real or personal property, and intangible objects, such as telecommunications licenses or electric power. The inventive system may be used in auctions where the auctioneer is a seller, buyer or broker, the users are buyers, sellers or brokers, and for auction-like activities which cannot be interpreted as selling or buying. The inventive system may be used for items including, but not restricted to, the following: public-sector bonds, bills, notes, stocks, and other securities or derivatives; private-sector bonds, bills, notes, stocks, and other securities or derivatives; communication licenses and spectrum rights; electric power and other commodity items; airport landing slots; emission allowances and pollution permits; and other objects, items or property, tangible or intangible.

It should be emphasized that whenever this document refers to an auction for "multiple dissimilar" objects, the terminology should be interpreted as meaning that the auction is capable of effecting the auctioning of multiple dissimilar objects. However, there is no requirement that the objects auctioned be multiple or dissimilar, and the auction and its implementation can also be used for auctioning identical or similar objects. By the same token, whenever the document refers to an auction of "multiple identical" objects, the terminology should be interpreted as referring to a context where bidders primarily are concerned with the quantity of items they receive, as opposed to the identity of the individual objects they receive. As such, auctions for "identical" objects can also be used for "close substitutes" or for a single object.

Before describing how the auction process is implemented, reference is first made to FIG. 1 to describe an exemplary block diagram of one embodiment of the present invention. As illustrated in FIG. 1, the auction system includes an auctioneer's system 10 and a plurality of user systems 20, 30, and 40, each user system 20, 30, or 40 represents an individual bidder. The systems 10-40 are communicatively interconnected via a communication system 50. The communication system 50 can represent any system capable of providing the necessary communication and includes for example a local or wide area network such as for example ethernet, token ring, or alternatively a telephone system, either private or public, the internet, the worldwide web or the information superhighway.

Each of the systems 10-40 includes a typical user interface for input/output and can include a conventional keyboard, display, and other conventional devices. Within each of the systems, the user interface (11, 21, etc.) is coupled to a communication interface (12, 22, etc.) which is in turn connected to the communication system 50. Both the user interface and communication interface are also connected, at each system, to a CPU (13, 23, etc.). Each system includes a memory (14, 24, etc.) which can further be broken down into a program partition (15, 25, etc.), a data partition (16, 26, etc.) and an operating system partition (17, 27, etc.).

In each system the CPU (13, 23, etc.) represents a source of intelligence when executing instructions from the memory (14, 24, etc.) so that appropriate input/output operations via the user interface and the communications interface take place as is conventional in the art. The particular steps used in implementing the inventive auction system are described in more detail below.

In one embodiment, each of the systems are personal computers or workstations.

FIG. 2 is a functional block diagram illustrating the three main processes which are carried out in order to implement the flexible dynamic auction system of the present invention. As is shown in FIG. 2, the auctioneer's system 10 implements a query process 18, a typical user system 20 implements a user process 28; the two processes also use message(s) 64 which are transmitted from the auctioneer's system 10 to a user system 20. The processes also communicate via an intermediate process, the database process 60. In response to a message from the auctioneer's system 10, the user process 28 may generate or modify flexible bid information 61 which is coupled to the database process 60. In addition to this communication, the database process receives queries 62 from the query process 18 and responds with answers 63. As will be described below, the query process 18 is shown in FIG. 3A, the user process 28 is shown in FIG. 3B and the database process 60 is shown in FIG. 3C.

It should be noticed that the residence of the database process 60 has not been specified. That is because the database process may reside in the auctioneer's system 10, be distributed to reside in each of the user systems 20-40, in another computer, in equipment dedicated for this purpose, or some combination thereof. In the case where the database process resides in the auctioneer's system 10, there is necessarily a communication path between the user systems 20-40 for the purpose of communicating the flexible bid information from any user system 20-40 to the auctioneer's system. The same communication path from the user system to the database is required in the case where the database process resides in another computer or in dedicated equipment. In the case where each user system houses its own database process, the query/answer process requires a communication path between the auctioneer's system and each of the user systems 20-40. The same communication path from the auctioneer's system to the database is required in the case where the database process resides in another computer or in dedicated equipment.

Typically, an auction begins with a message transmitted from the auctioneer's system 10 to each user system 20, 30, etc. The user system allows (if needed—as will become clear below) the entry of flexible bid information to the database process 60. After the passage of sufficient time, allowing each of the user systems to enter whatever flexible bid information is necessary, the auctioneer's system 10 sends one or more queries to the database process for a particular user. The database process performs database look-ups for data relevant to the current questions, uses the response to generate an answer, and sends the answer to the auctioneer's system 10. The database process may perform calculations and/or logical operations in generating the answers. The auctioneer's system 10 may then generate queries to the database process for other users. After answers are received from some or all of the users, the auctioneer's system 10 can perform calculations and/or logical operations to compute additional questions, allow the auctioneer to enter data, compute additional messages to be sent to the user systems, etc. Depending upon the particular auction involved and the answers, the auctioneer's system may conclude that the auction has been concluded and send a final message to one or more of the user systems.

Figure 3A:
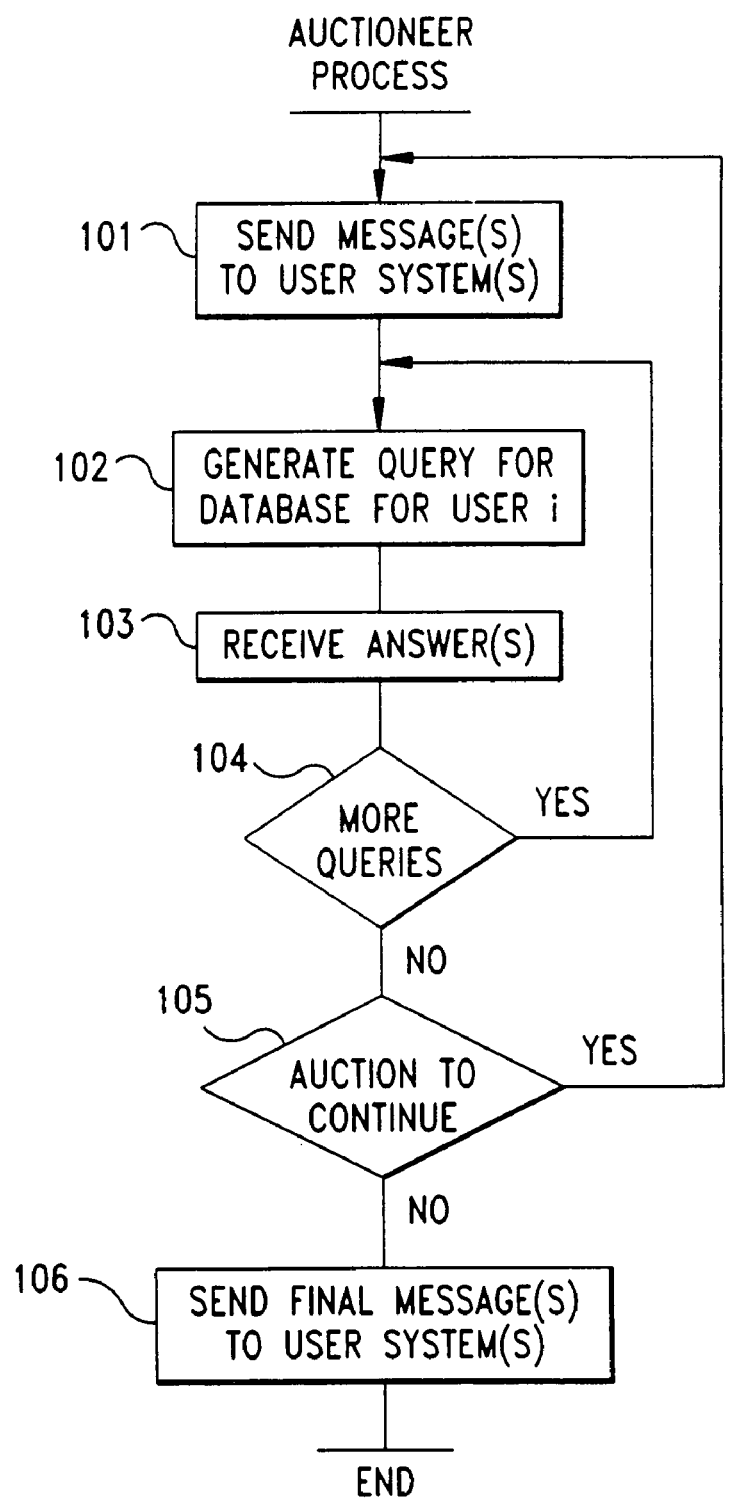
FIG. 3A is a flowchart illustrating the auctioneer process.
Figure 3B:
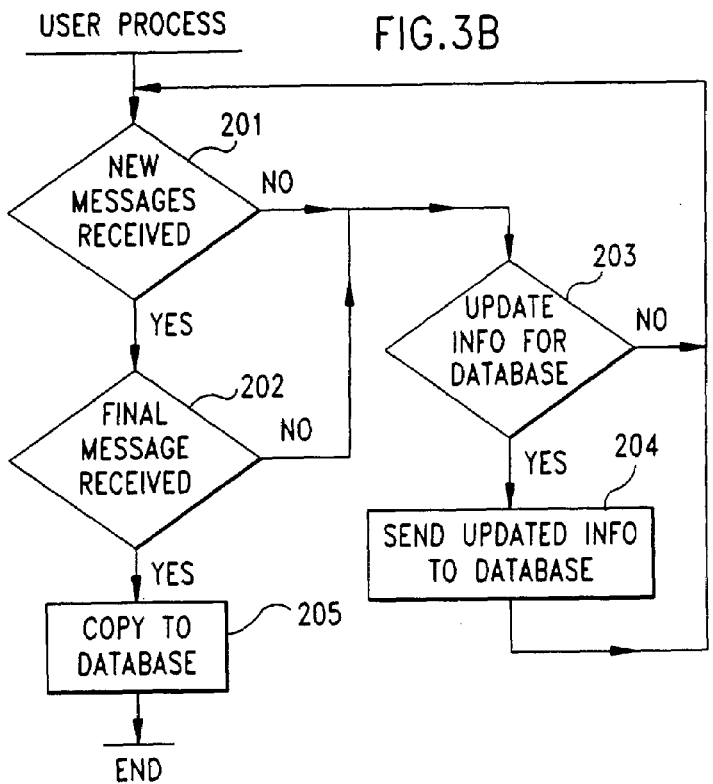
FIG. 3B is a flowchart illustrating the user process.
Figure 3C:
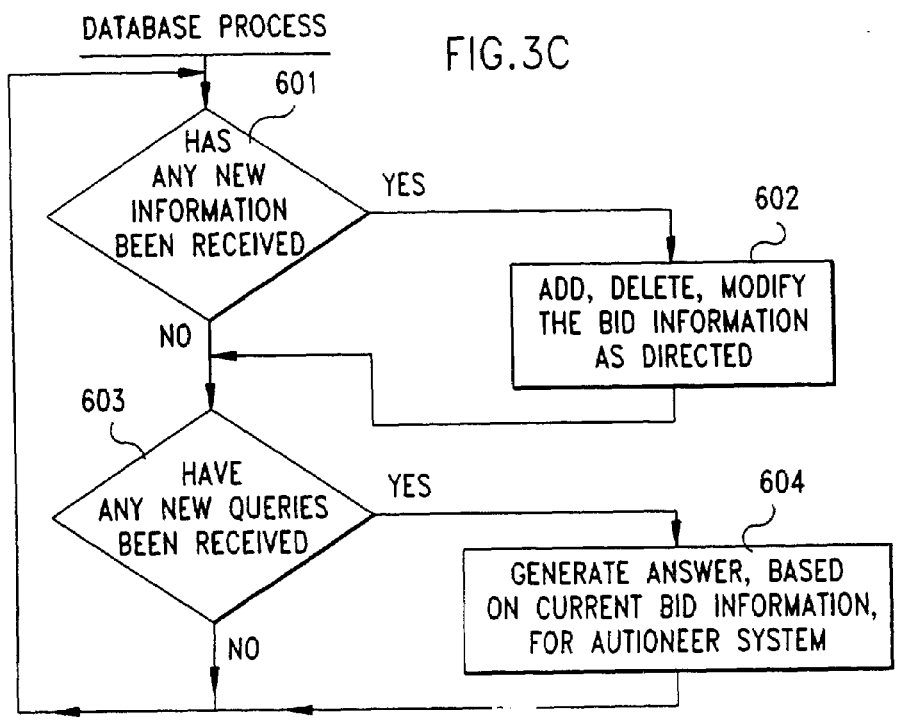
FIG. 3C is a flowchart illustrating the database process.

Referring to FIG. 3A, the auctioneer's system implements an auctioneer's process or query process 18. The query process sends a non-negative number of "messages" to each of the user systems in implementing the Send Message step 101. Subsequent to execution of step 101, the query process allows time to pass sufficient so that the user system(s) can enter appropriate flexible bid information. After the passage of a suitable period of time, the query process begins with execution of step 102, i.e. generating a query for the database for a particular user. As will be described below, in response to the query the database process will generate an answer. Reception of that answer is shown at step 103. The auctioneer's system then ascertains, at step 104, whether additional questions are needed. If the auctioneer's system determines that more questions are needed, then the auctioneer's system returns to the step 102 of generating an additional query to the database for the same or a different user. On the other hand, if no more queries are needed, then the auctioneer's system proceeds to step 105 to determine whether the auction should continue. Assuming that the auction should continue, the auctioneer's system then returns to step 101 to send a message to a user system, or plural user systems. This process is repeated until, at some point in time, execution of step 105 results in the determination that the auction should not continue. At that point, step 106 is executed where a final message is sent to one or more of the user systems. This step signifies the end of the auction. The final message may include the results of the auction, and the user system will preferably display that information for the benefit of the users.

FIG. 3B is a flow diagram of the user process in a typical user system 20. The user process, at step 201, determines whether any new messages have been received from the auctioneer's system. If step 201 detects the presence of a new message, then the user process steps to step 202 to determine whether a final message has been received. Assuming either that no message has been received or the final message has not been received, then the user process steps to step 203 to determine if the user process has received an indication that the user wishes to update the flexible bid information for the database. The user system 20 detects a desire to update information when it receives information via the user interface 21. In the event that an update indication has been received, then the user process steps to step 204 where updated information may be sent to the database. The updated information can result in the addition, deletion or modification of previously effective flexible bid information as will be described below. In the event there is no indication of updated information, or after the updated information has been transmitted to the database process, the user process returns to step 201 where the foregoing process is repeated. At some point, if the user process determines that a final message has been received, it proceeds to step 205 to copy that message to the database. The user process also provides for the display, to the user, of messages that are received.

The database process 60 is illustrated in FIG. 3C. The database process is performed to manage the data in the database for each active user. As shown in FIG. 3C, the database process includes an initial step 601 to determine if any new information has been received. New information can be either new flexible bid information from the user process and/or an indication of a final message. In either event, the process steps to step 602 where the database process provides for the addition, deletion or modification of the flexible bid information in the event that new flexible bid information has been received. In addition, in the event that a final message has been received, step 602 optionally effects the deletion of all the flexible bid information inasmuch as retention of that information is no longer necessary, the auction having been completed.

If no new information has been received and/or after execution of step 602, the database process proceeds to step 603 to determine if any new queries have been received from the auctioneer's system 10. If one or more new queries have been received from the auctioneer's system 10, the database process steps to step 604 for the purpose of generating an answer based on the current bid information and coupling that answer to the auctioneer's system 10.

The manner in which a determination is made to conclude the auction depends on the parameters of the particular auction and the content of the answers provided to the auctioneer's system. In addition, the manner in which the queries are generated, the content of the queries, and the manner in which answers to the queries are generated, also depends on the parameters of the different auctions. In order to make this clear, several different examples of application of the invention will be described below.

EXAMPLE ONE OF THE INVENTION'S APPLICATION

Let us consider an elementary example out of a myriad of possible applications for the present invention, in order to give a clearer indication of its usefulness and operation. Suppose that a securities firm sought to sell shares of stock via an auction. The securities firm might announce, via a message, that it plans to begin the auction at a price of $10 per share, and then successively increment the price by $1 per share. At each price, the auctioneer will indicate the quantity of shares which are being offered, and bidders will indicate the quantity which they are willing to purchase. The auction concludes when the price reaches a level where supply equals demand: bidders are awarded shares according to the quantity which they demanded at the concluding price; bidders might be charged the concluding price for every unit that they win, or they might be awarded some of the shares at other prices [see my patent application for "System and Method for an Efficient Dynamic Auction for Multiple Objects", Ser. No. 08/592,901, filed Jan. 4, 1996].

If a dynamic auction system in the prior art were used, the auctioneer would periodically announce a price (and quantity being offered) to bidders, and bidders would be provided with a deadline by which they must provide a contemporaneous bid consisting of a desired quantity of shares. There is no scope for a bidder to send a response which includes desired quantities at subsequent prices as well (e.g., "I desire 40,000 shares at a price of $10; 35,000 shares at $11; 30,000 shares at $12"). There is also no scope for a bidder to submit a bidding rule (e.g., "I desire 60% of the quantity which Company XYZ demanded at the previous price"). Typically, there is also no scope for a bidder to submit a bid which includes a limitation (e.g., "I desire up to 30,000 shares at $12, but do not want any shares unless I will receive a minimum of 10.000 shares").

Utilizing the present invention, the auctioneer might begin a computerized auction by transmitting a "message" indicating that he is willing to sell 1,000,000 shares at $10 apiece. Bidders are permitted to input "responses" consisting of bidding rules (including limitations, if desired) for both the current price and subsequent prices as well. Each response resides in the user database until such time that either it is called upon by the auctioneer (i.e., when the subsequent price is reached by the auctioneer) or it is added to, deleted, or modified by the bidder.

For example, Bidder 1 might enter an initial response into the auction system's database that he is willing to purchase:

40,000 shares at a price of $10;

35,000 shares at a price of $11;

30,000 shares at a price of $12, if at most 1,100,000 shares are offered;

34,000 shares at a price of $12, if more than 1,100,000 shares are offered;

20,000 shares at a price of $13, if at most 1,200,000 shares are offered;

25,000 shares at a price of $13, if more than 1,200,000 shares are offered;

15,000 shares at a price of $14, if at most 1,300,000 shares are offered;

20,000 shares at a price of $14, if more than 1,300,000 shares are offered.

The foregoing is an example of a flexible bid function. Each line, other than the first, is applicable at a price different from the current price and, in some cases, the bid is contingent. At a given time, with an initial query the auctioneer queries the user database and accesses the quantity which each bidder demands at $10. The auctioneer would find, for example, that Bidder 1 is willing to purchase 40,000 shares. The auctioneer might then sum up the quantities demanded by all the bidders and announce, via another message, that 2,000,000 shares were demanded at $10 (i.e., the issue was vastly oversubscribed at $10 per share).

Next, the auctioneer might send a new "message" indicating that he is willing to sell 1,100,000 shares at $11 apiece. This time, Bidder 1 might choose not to enter any new flexible bid information. At a given time, the auctioneer queries the system's database and accesses the quantity which each bidder demands at $11. The auctioneer would find, for example, that Bidder 1 is willing to purchase 35,000 shares. The auctioneer might then sum up the quantities demanded by all the bidders and announce that 1,900,000 shares were demanded at $11 (i.e., the issue continues to be vastly oversubscribed at $11 per share).

Next, the auctioneer might send a new "message" indicating that he is willing to sell 1,200,000 shares at $12 apiece. This time, Bidder 1 might input a response consisting of:

Delete my existing bids at $13 and $14 from the auction system's database;

At a price of $13, I desire 1.5% of the total shares which were demanded at $12;

At a price of $K, $K \geq 14$, I desire 1.0% of the total shares which were demanded at $(K-1)$.

Observe that Bidder 1's old bidding rule at $12 remains active in the database for user i. At a given time, the auctioneer queries the user database and accesses the quantity which each bidder demands at $12. Since 1,200,000 shares are being offered at $12, the auctioneer would determine that Bidder 1 is willing to purchase 34,000 shares. The auctioneer might then sum up the quantities demanded by all the bidders and announce that 1,800,000 shares were demanded at $12 (i.e., the issue continues to be somewhat oversubscribed at $12 per share).

Next, the auctioneer might send a new "message" indicating that he is willing to sell 1,400,000 shares at $13 apiece. This time, Bidder 1 might choose not to send any new response. At a given time, the auctioneer queries the system's database and accesses the quantity which each bidder demands at $13. The auctioneer would find that Bidder 1 is willing to purchase 27,000 shares (1.5% of the 1,800,000 shares demanded at $12). The auctioneer might then sum up the quantities demanded by all the bidders and announce that 1,400,000 shares were demanded at $13 (i.e., the market clears at $13 per share). As a consequence of this, the auction concludes, and Bidder 1 is awarded 27,000 shares of stock.

Finally, observe that the securities firm may determine that it is feasible, with the present invention, to run the auction using very small bid increments (e.g., $0.01 increases at a time). Although the use of such small steps may require the auction to run several hundred iterations, the fact that the present invention allows the submission of bidding rules for future messages may still enable the completion of the auction in as short a time as one business day. To the extent that the present invention allows smaller bid increments to be used, the securities firm can expect to realize greater revenues from the auction.

The foregoing description, while referring to actions of the "auctioneer" should not be taken as an indication that a person must necessarily control the auctioneer's system to implement the simple auction which has just been described. Rather, FIG. 3D is an example illustrating how the logic element 105 may be automated so that the auction can be carried out without human intervention on the part of an auctioneer.

FIG. 3D shows that the auctioneer's system 10 includes, within the data portion 16 of the memory 14, an auctioneer's listing of a sequence of value pairs. Each value pair includes an amount representing a number of shares of stock or other objects offered and a value parameter indicating the offered price for the number of objects. The table T containing the auctioneer's listing is sequentially addressed so long as the auction continues and the data at each addressed location is used as the messages which are sent to the user systems 20-40 as the auction progresses. These data values are also, at the same time, loaded into register R1, for the amount in a register R2 for the value. When each of the user databases have been queried for a quantity (or when the users participating in an auction have entered bids), the register S stores the sum of those quantities, i.e. the total number of objects demanded by the bidders. A comparator M then compares the amount offered, from the register R1, with the value in the register S. Logic element D then branches based on the result. A strictly-less-than comparison indicates, in this auction, that the bidders have demanded more objects than have been offered and therefore the auction should continue. Step I is first performed to increment the counter C so as to address the next sequential location from which data may be extracted to make up the messages to be transmitted to the user systems, as is indicated by the arrow to step 101 (FIG. 3A). On the other hand, if the branch indicates a greater-than-or-equal-to comparison, then the logic flow proceeds to step 106 (FIG. 3A) for the transmission of the final message indicating that the auction has been completed. Optionally, if a strictly-greater-than comparison was found, i.e. supply exceeded demand at the final price tested but supply was less than demand at the penultimate price tested, then the system would proceed to follow additional steps to ration objects among the users in accordance with the auction rules.

EXAMPLE TWO OF THE INVENTION'S APPLICATION

Let us consider a second example of a possible application for the present invention, again in order to give a clearer indication of its usefulness and operation. Suppose that a nation's central bank sought to simultaneously sell a fixed quantity of three-month and six-month treasury bills via a dynamic auction. The central bank might announce that it will begin by posting an interest rate of 5.40% for the three-month bill and 5.80% for the six-month bill, and proceed by reducing the interest rate by 0.01% on whichever bill is more oversubscribed, until supply equals demand for both bills.

Bidder 2, a government securities dealer, might be interested in purchasing $30 million in treasury bills, and might consider the reasonable difference between the interest rates for the three-month and six-month bills to be 0.30%. Thus, Bidder 2 might enter initial flexible bid information consisting of:

A quantity of $30 million in three-month bills and a quantity of $0 in six-month bills, if the six-month interest rate minus the three-month interest rate is at most 0.30%;

A quantity of $0 in three-month bills and a quantity of $30 million in six-month bills, if the six-month interest rate minus the three-month interest rate is strictly greater than 0.30%.

This initial bidding rule might be sufficiently flexible that Bidder 2 would never find any need to submit any further "response" at any later time in the auction. However, Bidder 2 would always maintain the right to enter a superseding response later in the auction if, for example, he thought the interest rate was becoming absurdly low.

Use of such a flexible bidding system would enable the central bank and bidders to avoid undue worry about communication breakdowns or time lags in the bid entry process, and so the dynamic auction might be able to complete in the same short time as the current turnaround time (about 45 minutes) between the bid submission deadline and the announcement of results in the current (sealed-bid) computerized auctions conducted by the U.S. Treasury.

EXAMPLE THREE OF THE INVENTION'S APPLICATION

Let us consider a third example of a possible application for the present invention, again in order to give a clearer indication of its usefulness and operation. Suppose that a region's electric power pool sought to arrange for the production of electric power at various times of day via a dynamic auction. The power pool might announce that it will begin by posting a price of 10 cents per kilowatt-hour on each half-hour period of the day and indicate the quantity of power it desires at that price. It might then proceed by reducing the price by ½ cent per kilowatt-hour on one or more time periods which are heavily oversubscribed, also indicating the quantity of power desired at the new price. Bidders in this auction (electric power companies) might typically place bids with limitations of the form: "I am willing to supply×kilowatts of power during both the 9:00-to-9:30 am time slot and the 10:00-to-10:30 am time slot, but only if I can also supply the same amount during the 9:30-to-10:00 am time slot. Moreover, I am willing to supply a positive quantity of power only if I am able to supply a minimum of y kilowatts of power [the capacity of one of my power plants]."

Even more so than in the previous examples, the dynamic auction process could potentially require a very large number of iterations, and so would probably only be feasible if the turnaround time for each round was quite short. However, by utilizing the present invention, the auction system could incorporate the submission of bidding rules treating subsequent proposed pricing configurations, and so the turnaround time would not necessarily be restricted by the bidders' ability to prepare and submit new bids following each adjustment in the pricing configuration.

Discussion of an Efficient Auction for Multiple Dissimilar Objects

I now turn to the implementation of an efficient auction for multiple dissimilar objects. Before describing the implementation, I describe the thesis for the auction.

1. TWO ILLUSTRATIVE EXAMPLES, INVOLVING TWO BIDDERS AND TWO DISSIMILAR OBJECTS

Example A

Suppose that two dissimilar—but somewhat related—broadcast licenses, denoted A and B, are offered simultaneously for auction. Each bidder possesses a value for each license separately, and for the two licenses together. It is assumed that each bidder's values for these licenses are additively separable from their values for everything else in the world, that these values are expressible in monetary units, and that we normalize to zero the value associated with possessing neither license. There are two bidders with values in the relevant range, and their values are given as follows (where numbers are expressed in millions of dollars):

| (1.1) | Bidder 1: | $v_1(\emptyset) =$ | 0 |
|---|---|---|---|
| | | $v_1(\{A\}) =$ | 200 |
| | | $v_1(\{B\}) =$ | 60 |
| | | $v_1(\{A,B\}) =$ | 260; |
| | Bidder 2: | $v_2(\emptyset) =$ | 0 |
| | | $v_2(\{A\}) =$ | 40 |
| | | $v_2(\{B\}) =$ | 40 |
| | | $v_2(\{A,B\}) =$ | 50. |

In this example, bidders are presumed to possess complete information about their rivals' valuations, but exactly the same logic would apply if they possessed independent private values.

In the Vickrey auction for this situation, each bidder would submit a sealed bid consisting of a price associated with each subset of the available objects, i.e., for each of Ø, {A}, {B} and {A,B}. The auctioneer would then determine which allocation of goods is associated with the highest total bids; in this example, assigning both licenses A and B to Bidder 1 yields the highest bids, totaling 260. However, Bidder 1 does not pay her bid of 260. Instead, the auctioneer also calculates the allocation of goods associated with the highest total bids if Bidder 1 were absent from the bidding, thus determining the marginal surplus which Bidder 1 brings to the auction. The auctioneer then requires a payment by Bidder 1 chosen so that the surplus obtained by Bidder 1 exactly equals the marginal surplus which Bidder 1 brings to the auction. In this example, the total bids associated with the optimal allocation of the objects, in the absence of Bidder 1, equals 50. Thus, Bidder 1's payment for the two licenses is set equal to 50, and then the surplus of 210 she obtains exactly equals the marginal surplus of 210 which she brings to the auction. As is now well known, sincere bidding is a weakly-dominant strategy in the Vickrey auction (Vickrey, 1961; Clark, 1971; Groves, 1973). With values that are complete information, or with independent private values, it is weakly dominant for each bidder to submit a sealed bid exactly equaling his true values from Eqs. (1.1), and the Vickrey auction is then guaranteed to assign an efficient allocation of the good.

It should now briefly be observed that it is unnecessary for the auctioneer to learn that Bidder 1 values $\{A,B\}$ at 260, in order for the auctioneer to implement the outcome of the Vickrey auction. It will suffice for the auctioneer to determine the following facts: (i) the licenses are most efficiently awarded to a single bidder; (ii) $v_2(\{A,B\})=50$; and (iii) $v_1(\{A,B\})>50$. Once these three facts are elicited, the auctioneer can call an immediate end to the auction and carry out the Vickrey outcome. This can be done while maintaining the confidentiality of Bidder 1's value for the two licenses together (and avoiding the potential ills discussed above), thus making it more likely that Bidder 1 will feel confident enough to be willing to reveal her true value of 260.

Let us now see how my design for an efficient auction of dissimilar objects would proceed, and why it would accomplish these goals. The easiest conceptualization of the procedure is to think of six separate auctions being run simultaneously, each of which in turn consists of two or three subauctions also being run simultaneously, as follows:

Auction I: "Bidder 1's Auction for $\{A,B\}$"

An ascending-bid auction is conducted between Bidder 1 and Bidder 2, for each of the following differences in value:

| | | | |
|---|---|---|---|
| A. | $v_1(\{A,B\}) - v_1(\emptyset)$ | versus | $v_2(\{A,B\}) - v_2(\emptyset)$ |
| B. | $v_1(\{A,B\}) - v_1(\{A\})$ | versus | $v_2(\{B\}) - v_2(\emptyset)$ |
| C. | $v_1(\{A,B\}) - v_1(\{B\})$ | versus | $v_2(\{A\}) - v_2(\emptyset)$ |

Auction II: "Bidder 1's Auction for $\{A\}$"

An ascending-bid auction is conducted between Bidder 1 and Bidder 2, for each of the following differences in value:

| | | | |
|---|---|---|---|
| A. | $v_1(\{A\}) - v_1(\emptyset)$ | versus | $v_2(\{A,B\}) - v_2(\{B\})$ |
| B. | $v_1(\{A\}) - v_1(\{B\})$ | versus | $v_2(\{A\}) - v_2(\{B\})$ |

Auction III: "Bidder 1's Auction for $\{B\}$"

An ascending-bid auction is conducted between Bidder 1 and Bidder 2, for each of the following differences in value:

| | | | |
|---|---|---|---|
| A. | $v_1(\{B\}) - v_1(\emptyset)$ | versus | $v_2(\{A,B\}) - v_2(\{A\})$ |
| B. | $v_1(\{B\}) - v_1(\{A\})$ | versus | $v_2(\{B\}) - v_2(\{A\})$ |

Auction IV: "Bidder 2's Auction for $\{A,B\}$"

An ascending-bid auction is conducted between Bidder 2 and Bidder 1, for each of the following differences in value:

| | | | |
|---|---|---|---|
| A. | $v_2(\{A,B\}) - v_2(\emptyset)$ | versus | $v_1(\{A,B\}) - v_1(\emptyset)$ |
| B. | $v_2(\{A,B\}) - v_2(\{A\})$ | versus | $v_1(\{B\}) - v_1(\emptyset)$ |
| C. | $v_2(\{A,B\}) - v_2(\{B\})$ | versus | $v_1(\{A\}) - v_1(\emptyset)$ |

Auction V: "Bidder 2's Auction for $\{A\}$"

An ascending-bid auction is conducted between Bidder 2 and Bidder 1, for each of the following differences in value:

| | | | |
|---|---|---|---|
| A. | $v_2(\{A\}) - v_2(\emptyset)$ | versus | $v_1(\{A,B\}) - v_1(\{B\})$ |
| B. | $v_2(\{A\}) - v_2(\{B\})$ | versus | $v_1(\{A\}) - v_1(\{B\})$ |

Auction VI: "Bidder 2's Auction for $\{B\}$"

An ascending-bid auction is conducted between Bidder 2 and Bidder 1, for each of the following differences in value:

| | | | |
|---|---|---|---|
| A. | $v_2(\{B\}) - v_2(\emptyset)$ | versus | $v_1(\{A,B\}) - v_1(\{A\})$ |
| B. | $v_2(\{B\}) - v_2(\{A\})$ | versus | $v_1(\{B\}) - v_1(\{A\})$ |

Each of the two or three subauctions can be thought of as operating with an ascending clock. The clock begins running at zero, and each bidder simultaneously indicates if she is "in". If both bidders are "in", the auctioneer increments the clock, and again each bidder simultaneously indicates whether she is "in". The subauction concludes at the moment that at most one bidder indicates she is "in", and the outcome of the subauction is described as the price standing on the clock and which (if any) bidder is still "in".

Bidder 1 will be defined to have won any of the above Auctions I-III when, for each of the subauctions contained in that auction, Bidder 2 did not remain in at the final price on the clock. Similarly, Bidder 2 will be defined to have won any of the above Auctions IV-VI when, for each of the subauctions contained in that auction, Bidder 1 did not remain in at the final price on the clock. Observe that we will only examine whether the bidder who is named in the title of the auction wins the auction; if she does not, then she will be defined to have lost the auction.

For example, consider the operation of Auction I, above, if each bidder bids according to her true values as expressed in Eqs. (1.1). For convenience, let us think of the ascending clock as running continuously. We then observe that subauction IA concludes with a "price" of 50 on the clock, and with Bidder 1 remaining "in". We also observe that subauction IB concludes with a "price" of 40 on the clock, and with Bidder 1 remaining "in". Finally, we observe that subauction IC concludes with a "price" of 40 on the clock, and with Bidder 1 remaining "in". Thus, in the terminology we have just defined, Bidder 1 is said to have "won" Auction I.

Table 1A summarizes the outcomes of all the subauctions. Table 1B then summarizes which bidder (if any) won each of the auctions. Table 1B also includes two additional, degenerate auctions whose outcomes are useful to define. We define "Bidder 1's Auction for 0" to be an auction which Bidder 1 always wins, and we define "Bidder 2's Auction for 0" to be an auction which Bidder 2 always wins.

Finally, we are ready to define the outcome of the entire procedure of simultaneous auctions and subauctions. Let X denote any subset of the set of available objects, and let ~X={A,B}\X denote the complement of X, i.e., ~X is the set consisting of all the available objects other than those contained in set X. Then the alternative auction procedure concludes with X assigned to Bidder 1 and ~X assigned to Bidder 2 provided that Bidder 1 wins Bidder 1's Auction for X and Bidder 2 wins Bidder 2's Auction for ~X. In Example A, observe from Table 1B that the unique X which satisfies this criterion is {A,B}; that is, Bidder 1 wins Bidder 1's Auction for {A,B}, and Bidder 2 wins Bidder 2's Auction for Ø. Finally, our payment rule shall be that Bidder 1 pays the final price which is reached in Bidder 1's Auction for X, and Bidder 2 pays the final price which is reach in Bidder 2's Auction for ~X. Thus, in Example A, Bidder 1 pays 50 and Bidder 2 pays 0, fully replicating the outcome of the Vickrey auction.

What is revealed, in the operation of this efficient auction for dissimilar objects? Clearly, the values of Bidder 2 for all of the subsets of the available objects are exposed: Subauction IC reveals that $v_2(\{A\})=40$; Subauction IB reveals that $v_2(\{B\})=40$; and Subauction IA reveals that $v_2(\{A,B\})=50$. However, very minimal information about Bidder 1's values is communicated. Subauction IIA reveals that $v_1(\{A\})>10$, but in fact, $v_1(\{A\})=200$. Subauction IIIA reveals that $v_1(\{B\})>10$, but in fact, $v_1(\{B\})=60$. Subauctions IB and IC reveal that $v_1(\{A,B\})-v_1(\{A\})>40$ and $v_1(\{A,B\})-v_1(\{B\})>40$, but in fact, $v_1(\{A,B\})-v_1(\{A\})=60$ while $v_1(\{A,B\})-v_1(\{B\})=200$. The dynamic auction design does a reasonable job of maintaining the confidentiality of the high bidder's true valuations.

Example B

Let us next consider a two-object, two-bidder scenario similar to Example A, only let us modify the values of Eqs. (1.1) so that efficiency now requires each bidder to receive one license. The bidders' values are now given by:

| (1.2) | Bidder 1: | $v_1(\emptyset) =$ | 0 |
|---|---|---|---|
| | | $v_1(\{A\}) =$ | 200 |
| | | $v_1(\{B\}) =$ | 30 |
| | | $v_1(\{A,B\}) =$ | 230; |
| | Bidder 2: | $v_2(\emptyset) =$ | 0 |
| | | $v_2(\{A\}) =$ | 40 |
| | | $v_2(\{B\}) =$ | 40 |
| | | $v_2(\{A,B\}) =$ | 50. |

We may again run the six separate, simultaneous auctions listed in Example A, each again consisting of two or three simultaneous subauctions. The results of the auctions for Example B are now somewhat different, as summarized in Tables 2A and 2B.

We see that in Example B—unlike Example A—Bidder 1 loses Bidder 1's Auction for {A,B}, so the auctioneer will no longer be assigning {A,B} to Bidder 1. However, Bidder 2 now wins Bidder 2's Auction for {B}. Since Bidder 1 continues to win Bidder 1's Auction for {A}, we have shown that {A} now constitutes the set X such that Bidder 1 wins Bidder 1's Auction for X and Bidder 2 wins Bidder 2's Auction for ~X. Finally, observe that Bidder 1's Auction for X stops at a price of 10, which becomes Bidder 1's payment; while Bidder 2's Auction for ~X stops at a price of 30, which becomes Bidder 2's payment. These again match the payments from the Vickrey auction. But, again, the highest values remain reasonably confidential: Auctions IIA and IC have only revealed that $v_1(\{A\})>10$ and $v_1(\{A,B\})-v_1(\{B\})>40$, but in fact, $v_1(\{A\})=v_1(\{A,B\})-v_1(\{B\})=200$. Meanwhile, Auction IB has revealed that $v_2(\{B\})>30$, but in fact $v_2(\{B\})=40$.

2. RESULTS FOR TWO BIDDERS AND ARBITRARY SETS OF DISSIMILAR OBJECTS

In this subsection, we will formulate the two-bidder, efficient auction procedure for arbitrary sets of dissimilar objects.

Let $\Omega$ denote any finite set of objects which are offered at auction, and let $|\Omega|=M$, i.e., the number of available objects equals M. There are two bidders, subscripted by i (i=1, 2). It is assumed that bidders' values for these objects are additively separable from their values for everything else in the world, and that these values are expressible in monetary units. Thus, each bidder, i, possesses a value, $v_i(Y)$, for every subset Y of $\Omega$, and we may normalize $v_i(\emptyset)=0$, for i=1, 2.

DEFINITION 2.1. For each bidder i=1, 2 and for every subset $X \in 2^\Omega$ of the available objects, Bidder i's Auction for X is defined to consist of the $2^M-1$ subauctions:

$$v_i(X)-v_i(Y) \text{ versus } v_j(\sim Y)-v_j(\sim X),$$

where $Y \in 2^\Omega \backslash X$ and $j \neq i$. Each of the $2^M-1$ subauctions is conducted with an ascending clock. The clock begins with $p_0=0$, and then follows an increasing sequence $\{p_t\}$. At each $p_t$, Bidder i must indicate whether $v_i(X)-v_i(Y)>p_t$ and Bidder j must simultaneously indicate whether $v_j(\sim Y)-v_j(\sim X)>p_t$. If both bidders indicate they are "in", the clock increments from $p_t$ to $P_{t+1}$, and the process repeats. If either bidder indicates that she is "not in," the subauction concludes. The outcome of the subauction is described by the final price, $p_t$, on the clock, and which (if any) bidder is still "in" at $P_t$.

DEFINITION 2.2. For each bidder i=1, 2 and for every subset $X \in 2^\Omega$ of the available objects, Bidder i will be defined to have won Bidder i's Auction for X if for every $Y \in 2^\Omega \backslash X$, the outcome of the subauction corresponding to Y has Bidder j "not in" at the final price.

It should be remarked that, given reasonable conditions on the bidders' values, $v_i(\bullet)$, a number of the $2^M-1$ subauctions included in Definitions 2.1 and 2.2 may be extraneous. For example, suppose that bidders' values are strictly increasing, so that $X \subseteq Y$ implies $v_i(X)<v_i(Y)$. Then any subauction in which $v_i(X)-v_i(Y)$ is compared to $v_j(\sim Y)-v_j(\sim X)$, where $X \subseteq Y$, is certain to be extraneous, since $v_i(X)-v_i(Y)<0$ and $v_j(\sim Y)-v_j(\sim X)<0$, so the outcome of the auction will have a price of zero, and Bidder j (as well as Bidder i) will be "not in."

It should also be remarked that, if instead of starting the clock for each subauction at zero, we had started the clock at $-\infty$, it would have been unnecessary to run both Bidder i's Auction for X and Bidder j's Auction for ~X. The two auctions test the same inequalities, and therefore one or the other would suffice. However, precisely because we are starting the clock for each subauction at zero, both Bidder i's Auction for X and Bidder j's Auction for ~X are necessary to extract all of the information necessary for efficient assignment from the bidders.

It is believed that the above procedure always yields an outcome (i.e., it is believed that there always exists at least one set X such that Bidder 1 wins Bidder 1's Auction for X and Bidder 2 wins Bidder 2's Auction for ~X) and that the allocation of the objects is efficient. Moreover, it is believed that if the bidders' values are in general position, then the outcome yielded by the above procedure is unique.

3. AN EXAMPLE WITH THREE BIDDERS AND TWO DISSIMILAR OBJECTS

Subsection 2 completely treated the case of two bidders and an arbitrary number of dissimilar objects. In order to gain some insight into the treatment of more than two bidders, let us extend Example B by adding an additional bidder.

Example C

| (3.1) | Bidder 1: | $v_1(\emptyset) =$ | 0 |
| | | $v_1(\{A\}) =$ | 200 |
| | | $v_1(\{B\}) =$ | 30 |
| | | $v_1(\{A,B\}) =$ | 230; |
| | Bidder 2: | $v_2(\emptyset) =$ | 0 |
| | | $v_2(\{A\}) =$ | 40 |
| | | $v_2(\{B\}) =$ | 40 |
| | | $v_2(\{A,B\}) =$ | 50; |
| | Bidder 3: | $v_3(\emptyset) =$ | 0 |
| | | $v_3(\{A\}) =$ | 25 |
| | | $v_3(\{B\}) =$ | 75 |
| | | $v_3(\{A,B\}) =$ | 125. |

The basic ingredient of the efficient auction for three bidders is to first consider the bidders pairwise. For each pair (j,k) of bidders, and for each subset W of the set of available objects, we conduct a "virtual auction" according to the procedure of Subsection 2, above. The outcomes of these virtual auctions provide the efficient assignment of the objects in W—if they were to be allocated only among Bidders j and k—as well as lower bounds on the values associated with the efficient assignments. (As we will see later, if more precise bounds are needed concerning the values associated with the efficient assignments, the virtual auctions can be restarted.) Second, we conduct another series of virtual auctions, which this time place Bidder i in competition with the combination of Bidders j and k, again using the procedure of Subsection 2. When the second series of virtual auctions is completed, the auctioneer has elicited the efficient allocation among Bidders i, j, and k, as well as how much of a payment to assess Bidder i. Performing these steps, for each of i=1, 2, 3, the auctioneer obtains all of the information needed to implement the outcome rule of the Vickrey auction. However, since the procedure of Subsection 2 was followed, the auctioneer avoids being unnecessarily intrusive in eliciting the values of the high bidders, providing the same advantages as before.

For each pair (j,k) of bidders, and for each subset W of the set of available objects, let $v_{jk}(W)$ denote the total value if the objects in W are allocated efficiently between Bidders j and k. Observe that Bidders 1 and 2 of Example C are exactly the same as in Example B, so we have already analyzed the virtual auction used to construct $v_{12}(\{A,B\})$, in Subsection 1 and Tables 2A and B. Thus, if the objects can only be allocated between Bidder 1 and Bidder 2, the efficient assignment is to give Object A to Bidder 1 and Object B to Bidder 2, and:

$$v_{12}(\{A,B\}) = v_1(A) + v_2(B) \qquad (3.2)$$

Similarly, the general procedure for two bidders trivially yields:

$$v_{12}(\{A\}) = v_1(\{A\}) \qquad (3.3)$$

and:

$$v_{12}(\{B\}) = v_2(\{B\}) \qquad (3.4)$$

The second step of the procedure is then to treat the combination of Bidders 1 and 2 as an artificial bidder (who is denoted by "12" and whose values for $\{A,B\}$, $\{A\}$, and $\{B\}$ are given by Eqs. (3.2), (3.3) and (3.4), respectively), and to run a virtual auction between Bidder 3 and the combination Bidder "12". The only obstacle in executing this program is that some of the subauctions require the combination bidder to report information such as whether $v_{12}(\{A\}) - v_{12}(\{B\}) > p$, which is equivalent to reporting whether $v_1(\{A\}) - v_2(\{B\}) > p$, but answering this question requires using information part of which is known only by Bidder 1 and part of which is known only by Bidder 2. The auctioneer deals with this difficulty by simultaneously running ascending clocks for each of $v_1(\{A\})$ and $v_2(\{B\})$, i.e., asking Bidder 1 whether $v_1(\{A\}) > p_t$, and asking Bidder 2 whether $v_2(\{B\}) > p_t$, for gradually-incrementing $p_t$. If, for example, the clock for $v_2(\{B\})$ stops first, then the auctioneer has ascertained that $v_1(\{A\}) - v_2(\{B\}) > 0$, and by continuing to increment $p_t$, the auctioneer learns whether $v_1(\{A\}) - v_2(\{B\}) > p_t - v_2(\{B\})$.

Table 3A summarizes the outcomes of all the subauctions between Bidder 3 and combination bidder "12", and Table 3B then summarizes whether the named bidder won her auction. Following the remark in the last paragraph of Subsection 2, it is believed that there always exists a set X such that Bidder 3 wins Bidder 3's Auction for X and Bidder "12" wins Bidder 12's Auction for ~X. In this example, X={B}, so Object B is assigned to Bidder 3 and Object A is assigned to the combination Bidder "12" (and, hence, to Bidder 1). Moreover, Bidder 3's Auction for {B} stopped at a price of 40, so Bidder 3 pays 40 for Object B; and Bidder 12's Auction for {A} stopped at a price of 50, so Bidder 1 pays at least 50 for Object A.

What information is elicited in the course of the above three-bidder procedure? We already know (from Example B) that in the first step of the procedure, it was revealed that $v_1(\{A\}) > 10$, $v_1(\{A,B\}) - v_1(\{B\}) > 40$, and $v_2(\{B\}) > 30$. In the second step of the procedure, as remarked above, it became necessary to establish that $v_1(\{A\}) - v_2(\{B\}) > 0$. In running the clock on $v_2(\{B\})$, it was revealed that $v_2(\{B\}) = 40$ and that $v_1(\{A\}) > 40$. Then, in the face-off between Bidder 3 and combination Bidder "12", it was further revealed that $v_1(\{A\}) > 50$ and $v_3(\{B\}) > 40$. However, the high values—the facts that $v_1(\{A\}) = 200$ and $v_3(\{B\}) = 75$—are still kept nicely confidential in the three-bidder procedure.

4. RESULTS FOR N BIDDERS AND ARBITRARY SETS OF DISSIMILAR OBJECTS

We now give general results for n bidders and arbitrary sets of dissimilar objects. We begin by defining N={1, 2, . . . ,n} to be the set of all bidders. The general procedure is:

Step 1. For any jEN and for any kEN\{j}, run the two-bidder auction of Subsection 2 between Bidder j and Bidder k, for every WE2$^\Omega$\∅. Use the results to define Composite Bidder "jk".

Step 2. For any iEN\{j,k}, run the two-bidder auction of Subsection 2 between Bidder i and Composite Bidder "jk", for every WE2$^\Omega$\∅. As needed, return to the bidders of previous steps and restart the associated ascending clocks to elicit additional information. Use the results to define Composite Bidder "ijk".

Step 3. For any hEN\{i,j,k}, run the two-bidder auction of Subsection 2 between Bidder h and Composite Bidder "ijk", for every WE2$^\Omega$\∅. As needed, return to the bidders of previous steps and restart the associated ascending clocks to elicit additional information. Use the results to define Composite Bidder "hijk".

Step n. For the one remaining rEN, run the two-bidder auction of Subsection 2 between Bidder r and Composite Bidder "N\{r}". As needed, return to the bidders of previous steps and restart the associated ascending clocks to elicit additional information. If, in the outcome of this final auction, Bidder r wins Bidder r's Auction for X, and Composite Bidder "N\{r}" wins the Auction of Bidder "N\{r}" for ~X, then X is the subset of objects assigned to Bidder r. Moreover, if p is the highest price reached in Bidder r's Auction for X, then p is the payment charged to Bidder r.

It is believed that the above procedure always yields an outcome and that the allocation of the objects is efficient. Moreover, it is believed that if the bidders' values are in general position, then the outcome yielded by the above procedure is unique.

5. THE SUBMISSION OF BIDS

The most straightforward way to implement the efficient auction for dissimilar objects is by use of what might be referred to as a "safe bidding terminal." The most basic version of a safe bidding terminal would operate as follows. Before the start of the auction, each bidder i enters her value, $v_i(W)$, for every subset WE2$^\Omega$ of the available objects. Once the auction begins, these values are locked in and may not be changed—quite like a submission of sealed bids. However, the values, $v_i(W)$, reside only in the memory of the safe bidding terminal, and are never directly transmitted to the auctioneer. Instead, the auction is conducted by the auctioneer's system sending a series of queries to bidders' terminals, each question of the form: Is $v_i(X)-v_i(Y)>p$ ? (X and Y are subsets of Ω, and p is a nonnegative number.) Bidder i's safe bidding terminal automatically responds to these questions, on behalf of Bidder i, by using the values which Bidder i entered before the start of the auction. The responses to all of the questions become known to the auctioneer (and, of course, are used in determining the auction outcome). However, when the auctioneer's system sends the signal that the auction has concluded, the bidder's values may be erased from the safe bidding terminal's memory. Any information which was not elicited by the auctioneer's questions remains confidential. Of course, the "safe bidding terminal" is nothing more than the user's system 20, for example, as augmented, if necessary, by the computer or equipment running the database process 60.

If bidders' values are in general position, and if the inquiry prices are increased in sufficiently small increments, we have seen that the general auction procedure leads to the unique allocation and payments of the Vickrey auction. With complete information or with independent private values, it immediately follows that sincere bidding is a dominant strategy. Observe that this statement holds true regardless of the pacing of the auction, as the pacing rules have no effect on the auction-determined allocation and payments. However, the pacing of the auction will affect the precise questions which are directed to bidders, and so the pacing rules will affect which information is elicited in the auction and which information remains confidential.

6. APPLICATIONS

Many applications of the efficient auction for dissimilar objects may seem inordinately cumbersome, on account that, with M objects, each bidder is required to determine a valuation for each of $2^{M-1}$ subsets of objects. However, let me now briefly describe one example of a potential application where the operation of the auction could be quite straightforward. Suppose that the Government wished to auction a collection of M television licenses in a city, and the Government enforced a regulation limiting each buyer to holding at most one television license in the city. Observe that it is probably sensible to view this as a dissimilar-object auction, since (at least with current technology), some television frequencies are more desirable than others. Moreover, in a larger setting, bidders may value different television channels differently, depending on what channel a given bidder already holds in other cities.

In this situation, it would only be necessary for each bidder to determine a valuation for the M feasible subsets of licenses: namely, the set of M singletons. Moreover, the collection of subauctions which would need to be considered between various pairs of bidders would now be comparatively small. Given the considerations discussed earlier in this document, the efficient auction for dissimilar objects may be an attractive candidate for this application.

EXAMPLE FOUR OF THE INVENTION'S APPLICATION

In this example, the inventive system implements the Vickrey auction for multiple, dissimilar objects. The system implementing the Vickrey auction can be similar to the subject matter illustrated in FIG. 1 although this auction is not flexible in that each user enters bidding information one, and only one, time. The implementation does employ the functional block diagram and arrangement of FIG. 2. Because of the format of this auction, there are only two messages, one beginning the auction and the other the final message indicating the result of the action. Rather than employing the flowcharts of FIGS. 3A-3C, the system implements the flowcharts of FIG. 4. The object of the auction is to distribute, among the bidders, each of a set Ω of dissimilar objects. The bidding information for each user may include the price the user is willing to pay for each conceivable subset S of the objects making up the set Ω. Thus for example if the set included objects A, B, and C, the user could provide a price for all possible subsets, i.e. prices for the singletons {A}, {B} and {C}, prices for the pairs {A,B}, {A,C} and {B,C}, and a price for the entire set of objects {A,B,C}. The price for the empty set is automatically taken to be zero.

Figure 4:
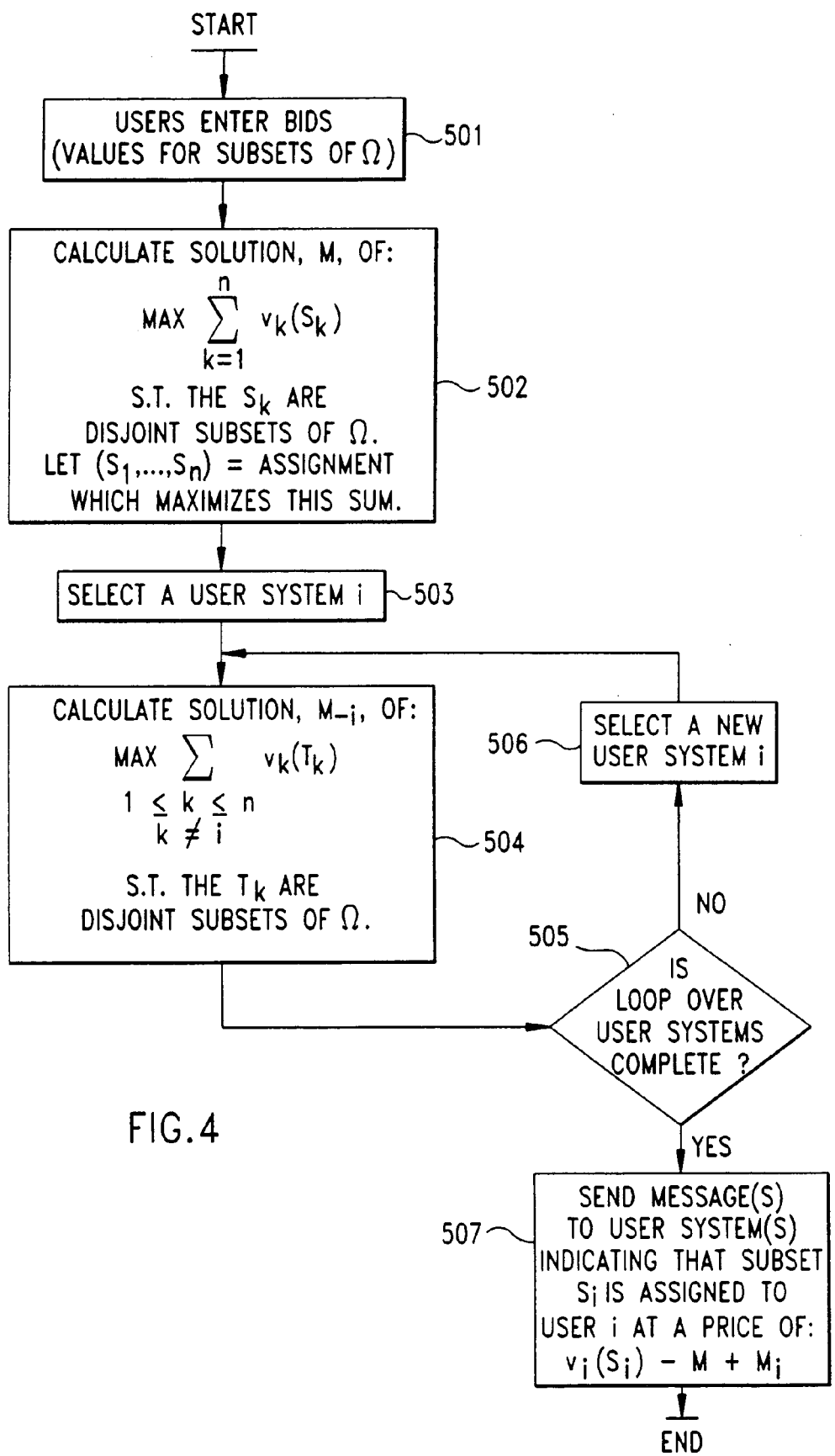
FIG. 4 is a flowchart illustrating the Vickrey auction.

As illustrated in FIG. 4, the implementation of the Vickrey auction begins at step 501 where each user k (k=1, ..., n) enters bids, i.e. values, $v_k(S)$, for subsets S of the set $\Omega$. The auctioneer's system then executes the step 502 of calculating the maximized sum of $v_k(S_k)$, where the summation is over all k from 1 to n, and the $S_k$ are required to be disjoint subsets of $\Omega$. Stated differently, $S_i \subset \Omega$, $S_j \subset \Omega$, and no object of set $S_i$ is a member of the set $S_j$ if i≠j. Let M denote the maximized SUM Of $v_k(S_k)$ and let $(S_1, \ldots, S_n)$ denote an assignment of objects which attains this maximum. Step 503 then selects any user system i from the set $\{1, \ldots, n\}$. Step 504 then calculates the maximized sum of $v_k(T_k)$, where the summation is taken over all k from 1 to n, except for i, and the $T_k$ are required to be disjoint subsets of $\Omega$. Let $M_{-i}$ denote the maximized sum of $v_k(T_k)$ Step 505 is performed to determine if the loop over user systems has been completed, i.e. has each possible user system been used? If that is not the case, then step 506 is performed to select a new user system i different from all user systems previously used. Processing returns to step 504. On the other hand, if at the branch 505 it was determined that the loop over user systems has been completed, then step 507 is executed where message(s) are sent to one or more of the user systems. The message(s) may include part or all of the results of the auction, namely that for each $i \in \{1, \ldots, n\}$, subset $S_i$ is assigned to user i, and at a price of $v_i(S_i)-M+M_{-i}$ if $S_i \neq \emptyset$, and at a price of zero if $S_i = \emptyset$. The user system(s) which receive message(s) will preferably display that information for the benefit of the user(s). If the flow of FIG. 4 is executed by itself—as opposed to as a subroutine within a larger auction—then the message(s) of step 507 constitute "final message(s)". The processing has been completed at this step.

EXAMPLE FIVE OF THE INVENTION'S APPLICATION

In this example, the inventive system implements the efficient auction for multiple dissimilar objects. The system implementing the efficient auction can be similar to the subject matter illustrated in FIG. 1 although this auction is not flexible in that each user enters bidding information one, and only one, time. The implementation does employ the functional block diagram and arrangement of FIG. 2. Because of the format of this auction, there are only two messages, one beginning the auction and the other the final message indicating the result of the action. Rather than employing the flowcharts of FIGS. 3A-3C, the system implements the flowcharts of FIGS. 5A-5B and 6A-6B. As in Example Four, the object of the auction is to distribute, among the bidders, each of a set $\Omega$ of dissimilar objects.

Figure 5A:
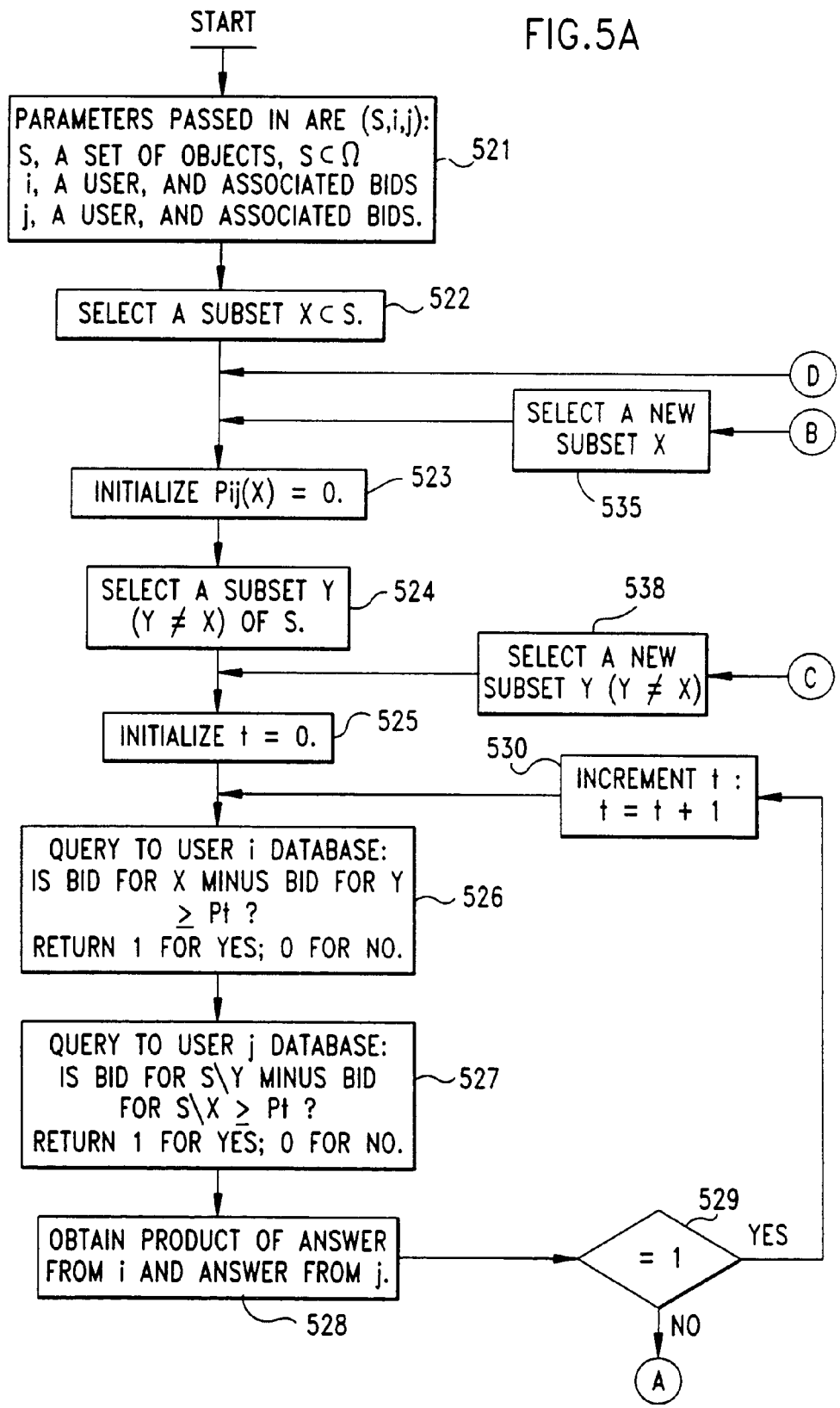
FIGS. 5A-5B are a flowchart of the two-user auction for multiple dissimilar objects.
Figure 5B:
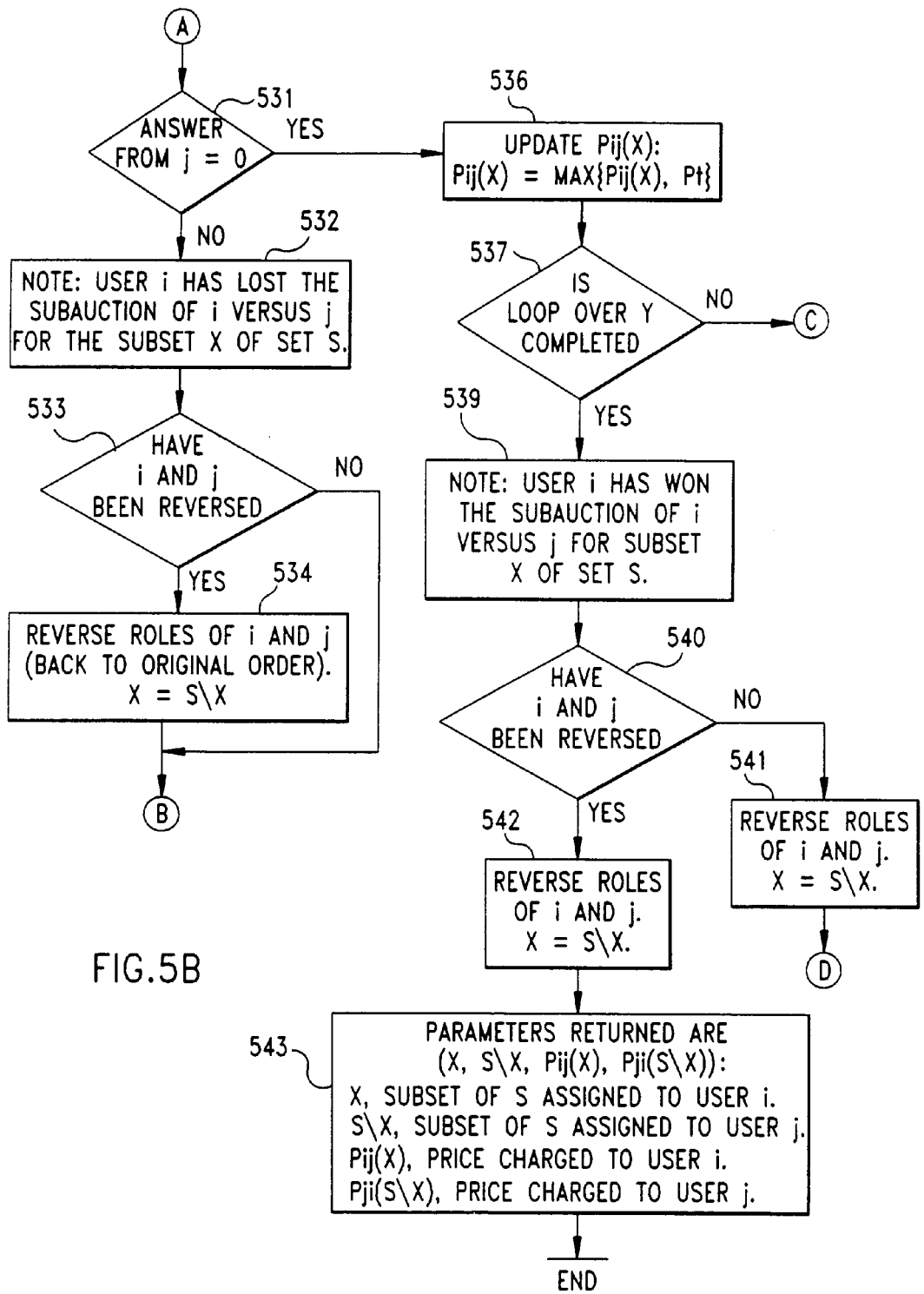

FIGS. 5A-5B are a flow diagram of a process or subroutine entitled "Two-User Auction for Multiple Dissimilar Objects." The process of FIGS. 5A-5B will typically be used as a subroutine which can be called by other auctions, as opposed to as a stand-alone auction. (For example, block 568 of FIG. 6A, block 574 of FIG. 6B, and block 707 of FIG. 7 all involve the calling of the process of FIGS. 5A-5B as a subroutine.) The auction of FIGS. 5A-5B is related to the theory described above, under the two headings: "1. Two Illustrative Examples, Involving Two Bidders and Two Dissimilar Objects;" and "2. Results for Two Bidders and Arbitrary Sets of Dissimilar Objects." The auction begins at step 521 where parameters are passed into the auction. The parameters passed in consist of (S,i,j), where $S \subset \Omega$ is a set of objects or items, i is a user number, and j (j≠i) is another user number. As will become clear below, the process also possesses the capability of querying the users i and j or querying the databases associated with users i and j (or directly has access to the bids of users i and j). The auctioneer's system then executes the step 522 to select any subset X of S. Step 523 initializes the parameter $P_{ij}(X)$ to zero. The use of this parameter will become evident below. Step 524 then selects any other subset Y of S, where Y≠X. Thereafter the parameter t is initialized to zero in step 525. This parameter identifies a price parameter $P_t$, where $P_0=0$. Steps 526 and 527 are the query steps. Step 526 is a query to user i (or user i's database) and step 527 is a query to user j (or user j's database). The query to user i (step 526) asks for response to the question "Is the bid for X less the bid for Y greater than or equal to parameter $P_t$?". The answer to this query is 1 if the answer is yes or 0 for the answer no. The query to user j (step 527) asks for response to the question "Is the bid for S\Y less the bid for S\X greater than or equal to parameter $P_t$?", where S\X denotes the complement of X in S, i.e. S\X contains every object in the set S which is not in the set X and S\Y contains every object in the set S which is not in the set Y. The same convention for the answer to the query is used as in step 526. Step 528 then obtains the product of the answer from user i and the answer from user j. A branch is made at step 529 depending on whether the product is 1 or 0. If the product is 1, i.e. both users i and j responded with a yes, then processing continues at step 530 where the parameter t is incremented by one. Processing then loops back to re-ask the queries (steps 526 and 527) using the incremented price parameter. On the other hand, if at the branch 529 it was determined that the product was not unity, i.e. one or both of the responses was no, then further branch is effected at step 531, depending on whether or not the answer from j was zero. If it was not, then processing proceeds to step 532 to note that the user i has lost the subauction of i versus j for the subset X of set S. Thereafter, at branch 533 a test is made to see if the positions of users i and j have been reversed. If they have, step 534 is performed to reverse the positions of the users i and j (back to their original order) and to set X=S\X, and processing then proceeds to step 535. On the other hand, if at the branch 533 it is determined that the positions of i and j have not been reversed, processing proceeds immediately to step 535. Step 535 then selects a new subset X, that is different from each other subset X already processed, and processing returns to step 523 to initialize the parameter $P_{ij}(X)$ to zero.

On the other hand, if at the branch 531 it was determined that the answer from j was 0, then step 536 is performed to set the parameter $P_{ij}(X)$ to the larger of $P_{ij}(X)$ and Pt. Step 537 then determines if the loop over Y has been completed, i.e. has each possible subset Y been used? If that is not the case, then step 538 is performed to select a new subset Y (Y≠X) different from all previously used subsets Y. Processing returns to step 525.

If on the other hand, at the branch 537 it was determined that the loop over Y has been completed, then step 539 is performed to note that the user i has won the subauction of i versus j for the subset X of set S. Thereafter, at branch 540 a test is made to see if the positions of users i and j have been reversed. If not, step 541 is performed to reverse the position of the users i and j and to note that the positions have been reversed for use in subsequent tests. Step 541 also sets X=S\X, and the processing then returns to step 523, so that the process is repeated for the set S\X now occupying the role previously held by the set X and the user pair (j,i) now occupying the role previously held by the user pair (i,j).

On the other hand, if at the branch 540 it is determined that the positions of i and j have already been reversed, processing proceeds to step 542. Step 542 is performed to reverse the position of the users i and j (back to their original order) and to set X=S\X. Step 543 completes the processing by returning parameters. The parameters returned consist of (X, S\X, $P_{ij}(X)$, $P_{ji}(S\backslash X)$), where X is interpretable as the set of objects which is efficiently assigned to user i, S\X is interpretable as the set of objects which is efficiently assigned to user j, $P_{ij}(X)$ is interpretable as the shadow price or opportunity cost associated with assigning set X to user i, and $P_{ji}(S\backslash X)$ is interpretable as the shadow price or opportunity cost associated with assigning set S\X to user j.

Figure 6A:
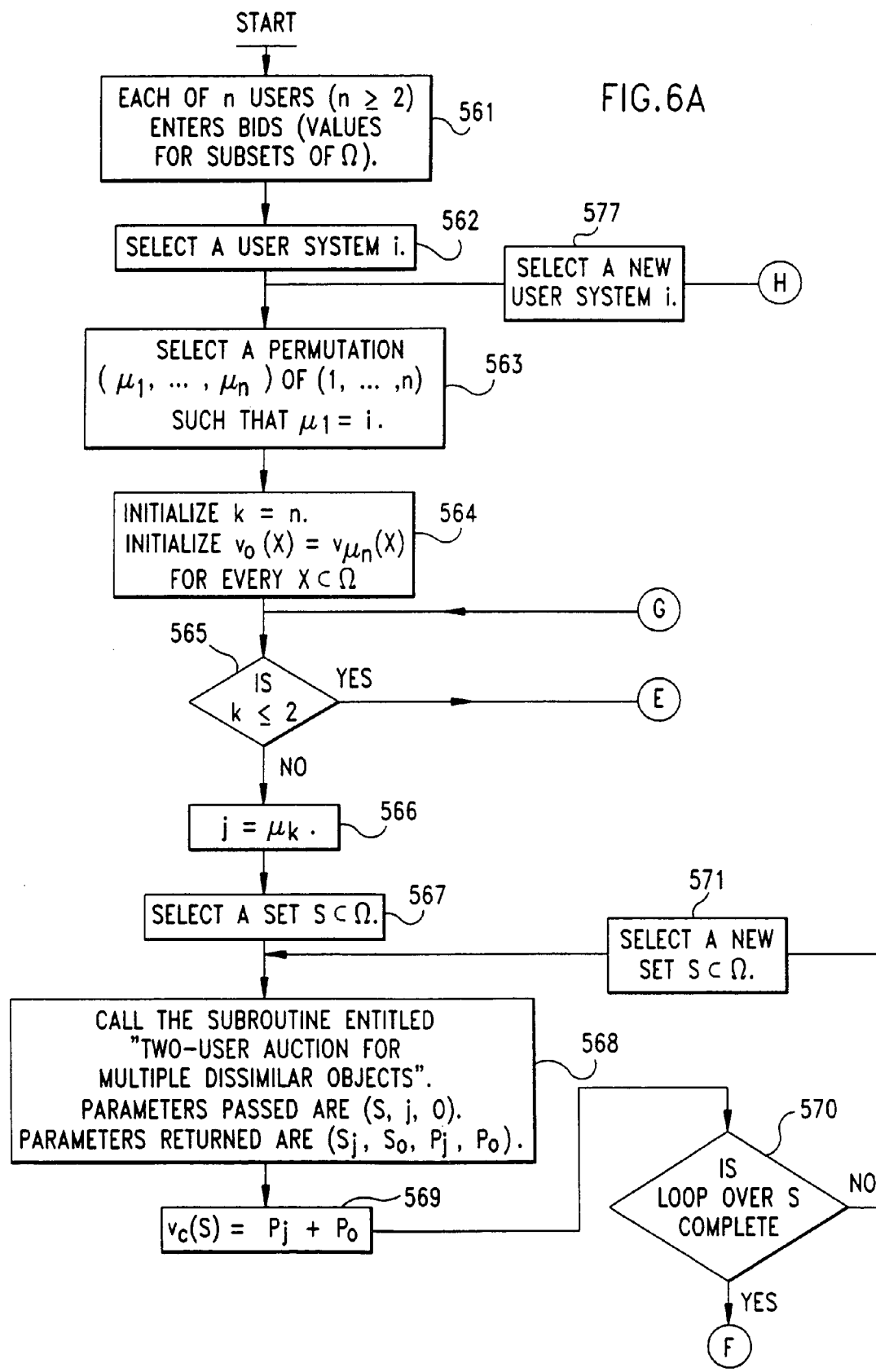
FIGS. 6A-6B are a flowchart of the n-user efficient auction for multiple dissimilar objects.
Figure 6B:
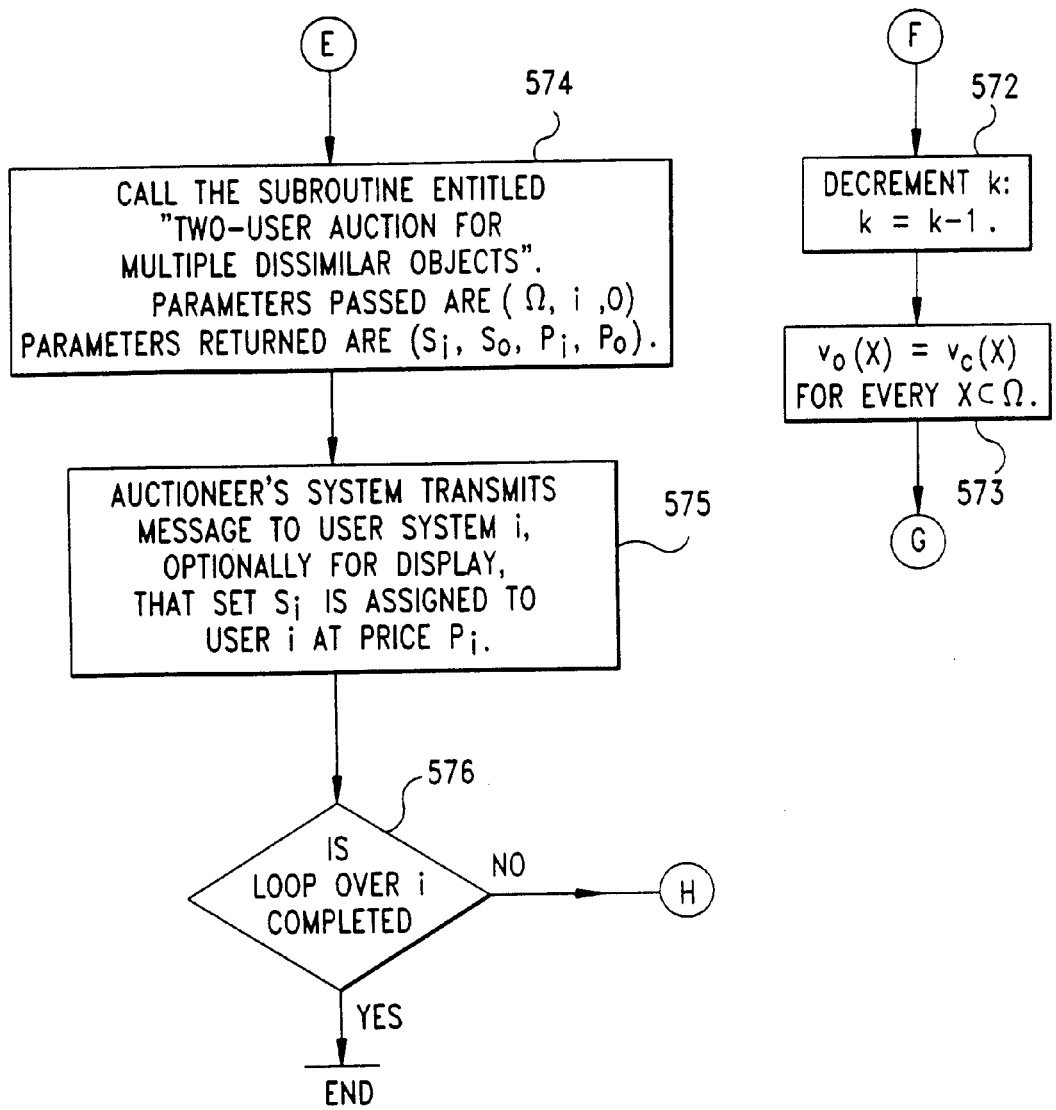

FIGS. 6A-6B are a flow diagram of an n-user auction for multiple dissimilar objects, which repeatedly applies the two-user auction of FIGS. 5A-5B as a subroutine. The auction of FIGS. 6A-6B is related to the theory described above, under the two headings: "3. An Example with Three Bidders and Two Dissimilar Objects;" and "4. Results for n Bidders and Arbitrary Sets of Dissimilar Objects." The auction begins at step 561 where each of n users (n≧2) enter bids, i.e. values for subsets of Ω. The auctioneer's system then executes the step 562 to select any user, denominated for convenience by i. Step 563 then selects a permutation $(u_1, \ldots, u_n)$ of $(1, \ldots, n)$ such that $u_1=i$. Stated differently, step 563 selects a re-ordering of the set $\{1, \ldots, n\}$ such that all n elements are used and such that the first element is the user i selected in step 562. Thereafter the parameter k is initialized to equal n and the array $v_0(\bullet)$ is initialized to equal $v_{u_n}(\bullet)$ for every $X \subset \Omega$ in step 564. A branch is made at step 565 depending on whether k is not more than 2. If that is not the case, i.e. if k is greater than 2, then processing proceeds to step 566 where the parameter j is set equal to $u_k$. Step 567 then selects a set $S \subset \Omega$. At step 568, the process proceeds to call the subroutine entitled the "Two-User Auction for Multiple Dissimilar Objects" as exemplified in FIGS. 5A-5B. Note, however, that the parameters, particularly (S,j,0), shown in block 568, correspond to different parameters, particularly (S,i,j), shown in block 521. Stated differently, the subroutine is called with S of block 521 set equal to S of block 568, i of block 521 set equal to j of block 568, and j of block 521 set equal to 0 of block 568. For example, this means that the present call of the subroutine will examine $v_j(X)$ less $v_j(Y)$ at step 526 and will examine $v_0(S\backslash Y)$ less $v_0(S\backslash X)$ at step 527. Upon completion of the subroutine at block 543, the processing returns to the main routine. Note, however, that the parameters, particularly (X, S\X, $P_{ij}(X)$, $P_{ji}(S\backslash X)$), shown in block 543, correspond to different parameters, particularly ($S_j$, $S_0$, $P_j$, $P_0$), shown in block 568. Stated differently, the results of the present call of the subroutine are returned to the main routine with $S_j$ of block 568 set equal to X of block 543, $S_0$ of block 568 set equal to S\X of block 543, $P_j$ of block 568 set equal to $P_{ij}(X)$ of block 543, and $P_0$ of block 568 set equal to $P_{ji}(S\backslash X)$ of block 543. Thereafter, at step 569 the parameter $v_C(S)$ is set equal to the sum of $P_j$ and $P_0$. Step 570 then determines if the loop over S has been completed, i.e. has each possible set S been used? If that is not the case, then step 571 is performed to select a new set S different from all previously used sets S. Processing returns to step 568.

If on the other hand, at the branch 570 it was determined that the loop over S has been completed, then step 572 is performed to decrement k by one. Thereafter, at step 573 the array $v_0(\bullet)$ is updated to equal $v_C(\bullet)$ for every $X \subset \Omega$. Processing then returns to step 565.

On the other hand, if at branch 565 it was determined that k was not more than 2, then processing proceeds to step 574.

At step 574, the process proceeds to call the subroutine entitled the "Two-User Auction for Multiple Dissimilar Objects" as exemplified in FIGS. 5A-5B. Note, however, that the parameters, particularly (Ω,i,0), shown in block 574, correspond to different parameters, particularly (S,i,j), shown in block 521. Stated differently, the subroutine is called with S of block 521 set equal to Ω of block 574, i of block 521 set equal to i of block 574, and j of block 521 set equal to 0 of block 574. Upon completion of the subroutine at block 543, the processing returns to the main routine. Note, however, that the parameters, particularly (X, S\X, $P_{ij}(X)$, $P_{ji}(S\backslash X)$), shown in block 543, correspond to different parameters, particularly ($S_i$, $S_0$, $P_i$, $P_0$), shown in block 574. Stated differently, the results of the present call of the subroutine are returned to the main routine with $S_i$ of block 574 set equal to X of block 543, $S_0$ of block 574 set equal to S\X of block 543, $P_i$ of block 574 set equal to $P_{ij}(X)$ of block 543, and $P_0$ of block 574 set equal to $P_{ji}(S\backslash X)$ of block 543. Thereafter, at step 575 the auctioneer's system transmits a signal, optionally for display, to user system i including the message that $S_i$ is assigned to user i at a price of $P_i$. Step 576 is performed to determine if the loop over user systems has been completed. i.e. has each possible user system been used? If that is not the case, then step 577 is performed to select a new user system i different from all user systems previously used. Processing returns to step 563. On the other hand, if at the branch 576 it was determined that the loop over user systems has been completed, then the auction reaches its end.

EXAMPLE SIX OF THE INVENTION'S APPLICATION

The process or subroutine above entitled "Two-User Auction for Multiple Dissimilar Objects" may be used not only as a subroutine for the querying of participants in an auction, but also as a subroutine which improves the efficiency of calculations within an auction. At the same time, the output of this subroutine may usefully be provided to auction participants as a means of justifying the auction outcome to them without unnecessarily disclosing the actual bids of other participants. This may be especially useful in situations where the auctioneer can be trusted to maintain the privacy of bid information, but where it is more likely that participants can be induced to bid their true values if disclosure to rival bidders can be avoided.

For example, recall in Example A that Bidder 1 valued {A,B} at 260, but in order to convince Bidder 2 that Bidder 1 was the valid high-value user, it was only necessary to convey to Bidder 2 that Bidder 1 valued {A,B} at some amount greater than 50. Moreover, under the auction rules, the price paid by Bidder 1 is 50. Then, provided that Bidder 1 trusted the auctioneer, Bidder 1 might feel comfortable disclosing his true value of 260 to the auctioneer, knowing that the auctioneer would not reveal this fact to Bidder 2 (provided that Bidder 1 is assigned both objects). Similarly reasoning applies in Examples B and C. The question is how the auctioneer can systematically generate the requisite minimal amount of information; application of the "Two-User Auction for Multiple Dissimilar Objects" provides a systematic method of generating the minimal information to disclose.

Figure 7:
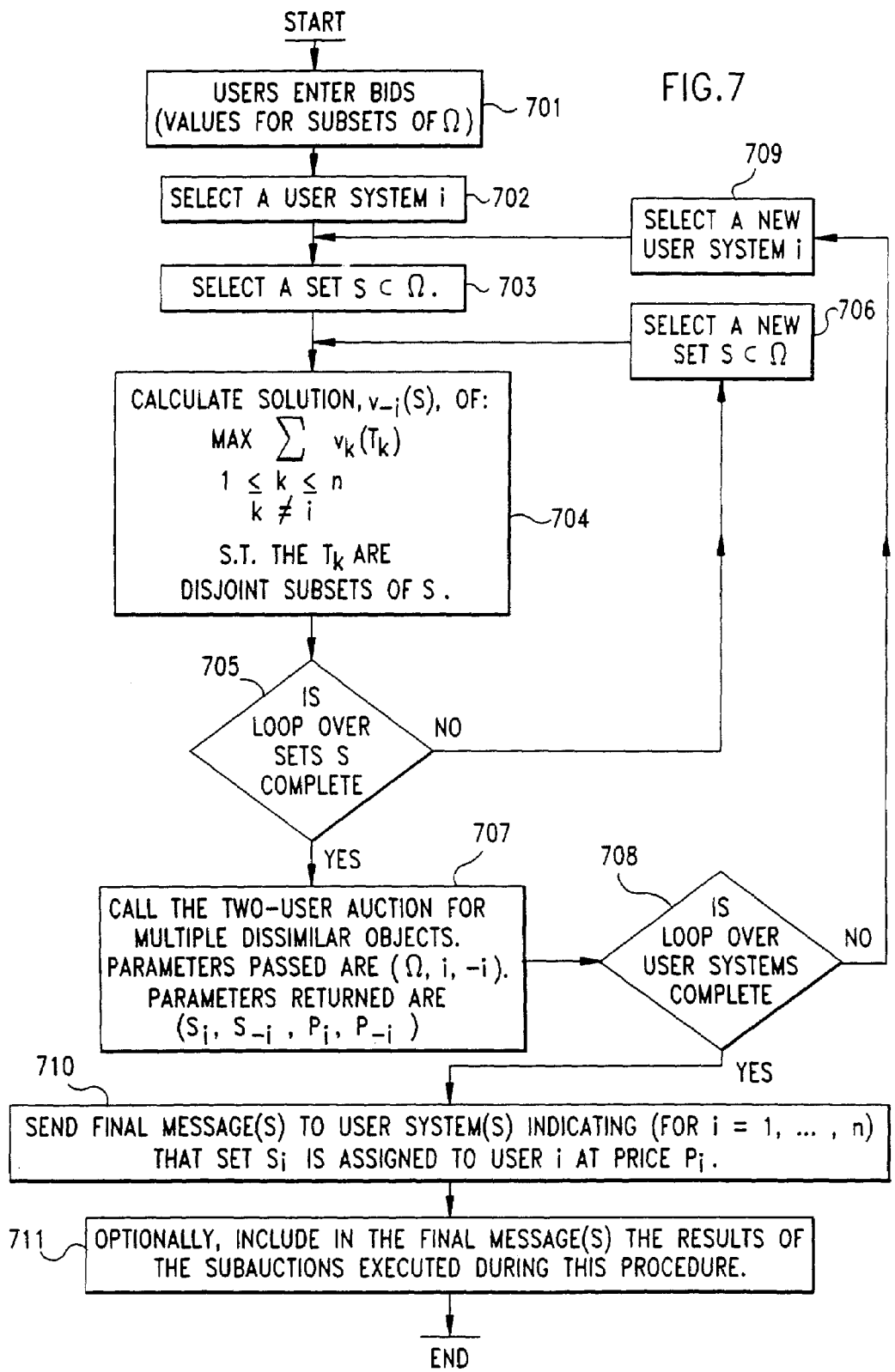
FIG. 7 is a flowchart of an implementation of an auction in which the minimal information needed to justify the auction outcome is disclosed.

FIG. 7 illustrates one embodiment of an auction where users submit bids for subsets of the available units and the auctioneer discloses the minimal information to justify the auction outcome. The auction begins at step 701 where the users enter bids, i.e., values, $v_k(S)$, for subsets S of the set Ω.

At step 702 the auctioneer's system selects any user system i from the set $\{1, \ldots, n\}$. Step 703 then selects a set $S \subset \Omega$. The auctioneer's system then executes the step 704 of calculating the maximized sum of $v_k(T_k)$, where the summation is taken over all k from 1 to n, except for i, and the $T_k$ are required to be disjoint subsets of $\Omega$. Let $v_{-i}(S)$ denote the maximized sum of $v_k(T_k)$. Step 705 is performed to determine if the loop over sets S has been completed, i.e. has each set S been used? If that is not the case, then step 706 is performed to select a new set S different from all sets S previously used. Processing returns to step 704.

On the other hand, if at the branch 705 it was determined that the loop over user systems has been completed, then step 707 is executed where the subroutine entitled the "Two-User Auction for Multiple Dissimilar Objects" as exemplified in FIGS. 5A-5B is called. Note, however, that the parameters, particularly $(\Omega,i,-i)$, shown in block 707, correspond to different parameters, particularly $(S,i,j)$, shown in block 521. Stated differently, the subroutine is called with S of block 521 set equal to $\Omega$ of block 707, i of block 521 set equal to i of block 707, and j of block 521 set equal to $-i$ of block 707. For example, this means that the present call of the subroutine will examine $v_i(X)$ less $v_i(Y)$ at step 526 and will examine $v_{-i}(S\backslash Y)$ less $v_{-i}(S\backslash X)$ at step 527. Upon completion of the subroutine at block 543, the processing returns to the main routine. Note, however, that the parameters, particularly $(X, S\backslash X, P_{ij}(X), P_{ji}(S\backslash X))$, shown in block 543, correspond to different parameters, particularly $(S_i, S_{-i}, P_i, P_{-i})$, shown in block 707. Stated differently, the results of the present call of the subroutine are returned to the main routine with $S_i$ of block 707 set equal to X of block 543, $S_{-i}$ of block 707 set equal to $S\backslash X$ of block 543, $P_i$ of block 707 set equal to $P_{ij}(X)$ of block 543, and $P_{-i}$ of block 707 set equal to $P_{ij}(S\backslash X)$ of block 543. Thereafter, step 708 is performed to determine if the loop over user systems has been completed. i.e. has each possible user system been used? If that is not the case, then step 709 is performed to select a new user system i different from all user systems previously used. Processing then returns to step 703.

On the other hand, if at the branch 708 it was determined that the loop over user systems has been completed, then step 710 is executed where final message(s) are sent to one or more of the user systems. The final message(s) may include part or all of the results of the auction, namely that for each $i \in \{1, \ldots, n\}$, subset $S_i$ has been assigned to user i, and at a price of $P_i$. Optionally, at step 711 the final message to user i may include the results of all the subauctions of user i versus "composite user" $-i$ for set $\Omega$, executed in the subroutine call at step 707. It is precisely the results of these subauctions which constitute the minimal information needed to justify the auction results to user i. The user system(s) which receive final message(s) will preferably display that information for the benefit of the user(s). The processing has been completed at this step.

Discussion of a Generalized English Auction

The early pages of this document emphasized the desirability of auctions in which users have repeated opportunities to improve upon their earlier bids, and discussed aspects of the inventive system which allow flexible bidding in auctions where users have repeated opportunities to bid. The middle pages of this document emphasized additional aspects of the inventive system rendering it suitable for situations with dissimilar items, where bidders would find it useful to be able to bid on sets of items. However, the implementations treated in the middle pages face the limitation that auction users have only a single opportunity to place bids. The last pages of this document unify the two strands, by describing a fully-dynamic auction design for multiple dissimilar objects, along with an implementation in a computer system which allows flexible bidding by users. Before describing the implementation, I describe the thesis for the auction design.

The fully-dynamic auction design may be thought of as a multi-unit generalization of the English auction for a single object. By the English auction, I mean the traditional method of auction used by auction houses such as Sotheby's and Christie's, where users successively raise each others' bids, until no new bids are entered. Clearly such an auction method can be implemented on the inventive system. However, the English auction faces the severe limitation that bids are one-dimensional, and so the method can only be used for the auction of a single parcel at a time. In order to auction multiple parcels in an English auction, it is necessary to auction the parcels in sequence, one after another. And if the parcels are related, sequential auctioning is inefficient, as the prices of the last items may be out of line with the prices of the first items, and it becomes difficult for bidders to assemble desired packages of items. This is particularly an issue when there exist synergies between the various items being auctioned: for example, in the case of related telecommunications licenses, or contiguous parcels of land.

The most visible attempt in the art to generalize the English auction for multiple items is the design of the recent FCC auctions for telecommunications licenses. A set $\Omega$ of licenses are put up for auction simultaneously. In each of a sequence of bidding rounds, participants may submit one or more bids; where bids comprise pairs $(\omega, P)$, where $\omega \in \Omega$ is a license and P is a price for that license. After each round, the auctioneer posts the high bids for each license and, optionally, the entire list of bids which were submitted. The auction remains open for all licenses so long as bidding remains active on any one of the licenses. The auction does not close until such time that a round occurs in which no new bids are submitted for any of the licenses.

The FCC auctions have been reasonably successful in practice, in large part because the aspect of simultaneously auctioning the licenses has enabled bidders to assemble geographic packages of licenses which are reasonably coherent and realize some synergies. However, the FCC auctions do not have especially desirable theoretical properties: compare the FCC auction with the traditional English auction. In the English auction for a single object, if bidders have pure private values (i.e. Bidder 1's value for the object does not depend on Bidder 2's value for the same object), "sincere bidding" is an equilibrium strategy. Stated less technically, it is an equilibrium of the English auction for every bidder to stay in the auction up to the price equaling what the object is worth to him, and then to drop out. By contrast, "sincere bidding" is not an equilibrium of the FCC auction: bidders have incentive to drop out of the bidding on some objects at prices below what the objects are worth to them, in order to depress the prices which they will need pay on other objects. This has serious consequences for the efficiency of the FCC auctions.

By contrast, the Vickrey auction which was discussed as Example Four and illustrated in FIG. 4 above is a multiple-object auction in which, if bidders have pure private values, "sincere bidding" is preserved as an equilibrium. Thus, the Vickrey auction possesses some theoretical advantages over the FCC auction design. However, the Vickrey auction also possesses a serious disadvantage compared to the FCC auction, in that it is a purely static auction: participants submit bids only once, and there is no opportunity for feedback from one participant's bids to another's.

The overall design objective is to construct multiple-object auctions which have the dynamic aspect of the FCC auction but maximize the "sincere bidding" aspect of the Vickrey auction. My prior application Ser. No. 08/582,901 filed Jan. 4, 1996 identified an auction design for multiple identical objects (or close substitutes) which attains both of these design objectives when bidder exhibit diminishing or constant marginal utilities. However, it has been an open question how to design an auction for multiple but possibly-dissimilar objects which attains both of these design features.

EXAMPLE SEVEN OF THE INVENTION'S APPLICATION

The inventive design which attempts to attain these design features will be referred to as the "generalized English auction." While the theoretical properties of the generalized English auction are not yet nearly fully developed, and I do not wish to be bound by the speculations which I now state, it is helpful in pondering its usefulness to consider the following conjectures:

If the level of prices in the current round of the generalized English auction exactly equals the outcome of the Vickrey auction, then no self-interested bidder has any incentive to place new bids in the next round, and so the auction ends.

At all price levels below the outcome of the Vickrey auction, there exist one or more bidders who possess incentive to place new bids, and so the auction does not conclude.

However, convergence of prices in the generalized English auction to the outcome of the Vickrey auction appears to depend on bidders' strategies and the initial conditions.

Figure 8:
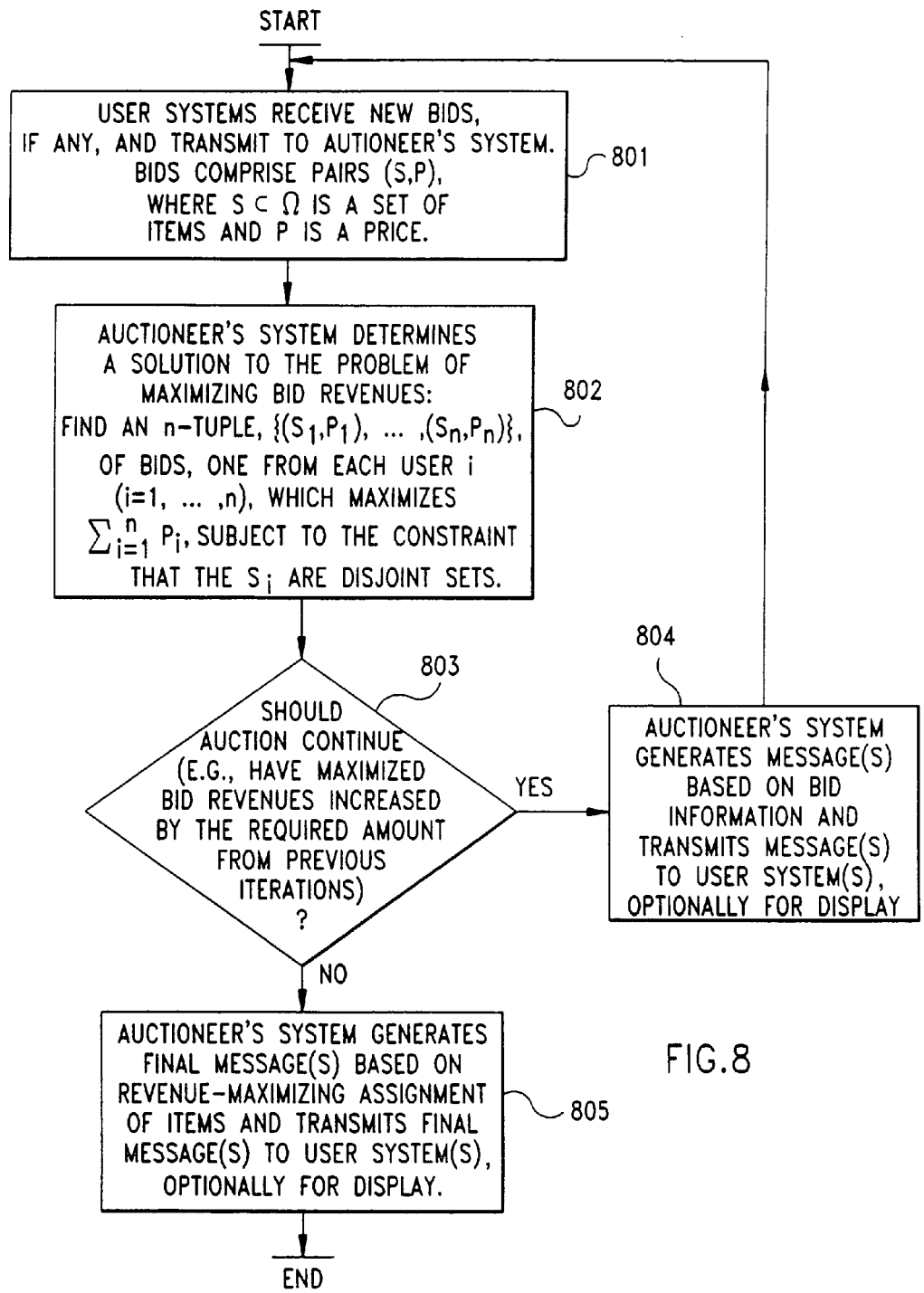
FIG. 8 is a flowchart of one embodiment of the generalized English auction.

FIG. 8 displays the flow of one embodiment of a computerized implementation of the generalized English auction, where the bidding effectively occurs in real time. The auction begins at step 801 where the user systems receive new bids, if any, from users and transmit the new bids to the auctioneer's system. Bids comprise pairs (S,P), where $S \subset \Omega$ is a subset of the set of all items being auctioned and P is a price which the user is offering to pay for the subset S. Stated differently, a bid comprises a set of objects and an associated price for the bundle. The auctioneer's system then executes the step 802 of determining a solution to the problem of maximizing bid revenues: find an n-tuple, $\{(S_1,P_1), \ldots, (S_n,P_n)\}$ of bids, one from each user i (i=1, . . . ,n), which maximizes the sum $P_1 + \ldots + P_n$, subject to the constraint that the $S_i$ are disjoint subsets of $\Omega$. Stated differently, for every i (i=1, . . . ,n) and for every $j \neq i$ (j=1, . . . ,n), it is required that $(S_i,P_i)$ be a new or previous bid of user i, $(S_j,P_j)$ be a new or previous bid of user j, and $S_i \cap S_j = \emptyset$, i.e. no object of set $S_i$ is a member of the set $S_j$ if $i \neq j$. In performing this calculation, the auctioneer's system may take as implicit the existence of a zero bid, i.e. the pair $(\emptyset,0)$, associated with each user. Let M denote the maximized sum $P_1 + \ldots + P_n$ and let $(S_1, \ldots, S_n)$ denote an assignment of objects which attains this maximum. Step 803 is then performed to determine if the auction should continue. One exemplary way to perform step 803 is to compare the current maximized bid revenues M with a function of the maximized bid revenues obtained in previous iteration(s) of the loop, and to continue the auction if and only if the current maximized bid revenues exceed the function of the maximized bid revenues obtained in previous iteration(s). However, this particular stopping rule is only exemplary, and many other embodiments are also possible. If branch 803 determines that the auction should continue, then the processing proceeds to step 804, at which the auctioneer's system generates message(s) based on the bid information and transmits message(s) to user system(s), optionally for display to users. One exemplary way to perform step 804 is to generate for one or more user systems i a message which comprises the entire list of new bids which were received from users other than i, and to transmit said message to user system i. A second exemplary way to perform step 804 is to generate a message which comprises the current maximizing n-tuple, $\{(S_1,P_1), \ldots, (S_n,P_n)\}$, and to transmit this message to one or more users. However, these particular examples of step 804 were only illustrative, and many other embodiments are also possible. Thereafter, the processing returns to step 801 and the loop is repeated.

On the other hand, if branch 803 determines that the auction should not continue, then the processing proceeds to step 805, at which the auctioneer's system generates final message(s) based on the final revenue-maximizing assignment of items, i.e. the most recent determination of the revenue-maximizing n-tuple $(S_1,S_n)$ at step 802, and transmits final message(s) to user system(s). One exemplary way to perform step 805 is to generate for one or more user systems i a message which comprises the set $S_i$ contained in the final revenue-maximizing assignment of items and to transmit said message to user system i. A second exemplary way to perform step 805 is to generate a message which comprises the final revenue-maximizing n-tuple, $\{(S_1, P_1), \ldots, (S_n,P_n)\}$, and to transmit this message to one or more users. However, these particular examples of step 805 were only illustrative, and many other embodiments are also possible. The user system(s) which receive final message(s) will preferably display that information for the benefit of the user(s). The processing has been completed at this step.

Several notes may helpfully be made about the auction of FIG. 8. First, observe that in the preferred embodiment, users are allowed to enter more than one bid. However, in the solution determined in step 802, only one bid by each user (including, possibly, the zero bid) is actually included in the revenue-maximizing n-tuple. Thus, if a given user is interested in purchasing both item A and item C, it would not be advisable for this user to exclusively submit bids of the form $(\{A\},P_A)$ and $(\{C\},P_C)$. Rather, it would be prudent to also submit bids of the form $(\{A,C\},P_{AC})$, since it is only by submitting bids on $\{A,C\}$ or supersets thereof that it is possible to win both A and C. Second, in the preferred embodiment, the maximization calculations and assignments are based on all of the new and previous bids which have been entered at any point in the auction, i.e. bids once entered may never be withdrawn. (Note, though, that the rules may allow submission of bids of the form $(\emptyset,P)$, where P>0, which is perhaps logically equivalent to a bid withdrawal with a penalty P.) However, other reasonable embodiments are also possible, including: bids are freely withdrawable in case of error; bids are freely withdrawable at any time, unless they are part of the current revenue-maximizing n-tuple; and bids are withdrawable subject to the penalty of paying the difference between the final maximized bid revenues with the withdrawn bid(s) and the final maximized bid revenues without the withdrawn bid(s). Third, in the preferred embodiment, as many bids as desired may be entered, without limitation. However, other reasonable embodiments are also possible, including: only bids which would become part of the revenue-maximizing n-tuple (given the other previous bids) are allowed to be entered; only bids greater than previous bids by the same user may be entered; no more than K bids (where K is a positive constant) may be entered, e.g. in order to limit computational complexity; only bids for particular subsets of Ω may be entered; and (as in the FCC auctions) current bidding activity is limited by the magnitude of previous bidding activity or the magnitude of upfront payments made by the particular user. Fourth, in the preferred embodiment, the exemplary stopping rule involves a comparison between current maximized bid revenues and a function of previous maximized bid revenues. However, as will also be seen in FIG. 10, other reasonable embodiments are also possible, including: the auction stops when no new bids are submitted by any user; the auction stops when no new bids and no bid waivers are submitted by any user; or the stopping rule is a function of time. Fifth, in the preferred embodiment, the maximization problem solved was literally to determine an n-tuple of compatible bids which maximize the sum of prices. However, other reasonable embodiments are also possible, including: the maximization problem includes one or more reserve prices which must be exceeded or some of the objects are not sold; the maximization problem is only approximately solved; or the maximization problem involves a maximand which is a somewhat different function from the sum of the bids. Finally, in the preferred embodiment, the payment of user i equals the associated price $P_i$ in the final revenue-maximizing n-tuple. However, other reasonable embodiments are also possible, including that the final payments are a somewhat different function of the entered bids.

The reader may note, in comparing the description of FIG. 8 to some of the above descriptions—for example, that of FIGS. 4, 5A-5B, 6A-6B, and 7— that bid prices are currently denoted as P whereas they were sometimes previously denoted by $v_i(S)$. The reason for the change in notations is that, in many of the above instances, it was believed that users would tend to bid their true values, on account that their required payment would typically be less than the bid. In the process of FIG. 8, accepted bids themselves will correspond to payments, and so the price notation appears more appropriate.

Figure 9:
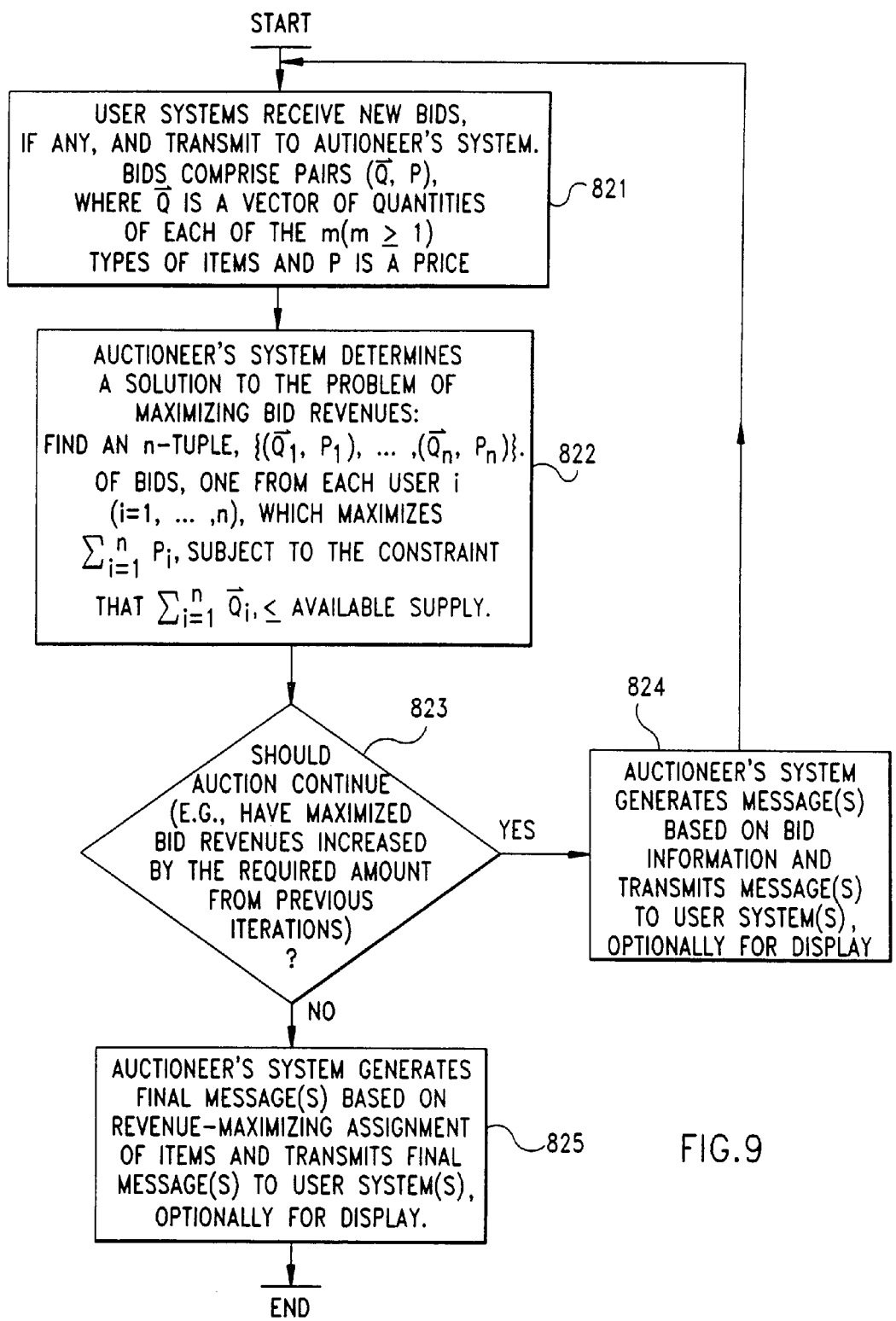
FIG. 9 is a flowchart of a second embodiment of the generalized English auction.

FIG. 9 displays the flow of another embodiment of a computerized implementation of the generalized English auction, where the bidding effectively occurs in real time. This embodiment is appropriate when m (m≧1) types of objects are being auctioned, and a plurality of identical units (or close substitutes) of each type are being auctioned. For example, in Example Two above, a nation's central bank sought to simultaneously sell a quantity of three-month treasury bills and a quantity of six-month treasury bills. Within each type, the objects are identical, i.e. all three-month treasury bills sold on the same date are the same as each other. However, between types, the objects are dissimilar, i.e., three-month and six-month treasury bills sold on the same date are distinctly different in value from each other. Or, as a second example, beginning on Jul. 25, 1994, the FCC held an auction of ten nationwide narrowband licenses. Five of the licenses were 50-50 KHz paired licenses; three of the licenses were 50-12.5 KHz paired licenses; and two of the licenses were 50 KHz unpaired licenses. In the notation which will follow, m=3 and $\overline{A}=(5,3,2)$. The actual nationwide narrowband auction, of course, was conducted using the FCC auction design.

As illustrated in FIG. 9, the auction begins at step 821 where the user systems receive new bids, if any, from users and transmit the new bids to the auctioneer's system. Bids comprise pairs $(\overline{Q},P)$, where $\overline{Q}=(Q^1, \ldots, Q^m)$ is a vector consisting of a quantity of each of the m (m≧1) respective types of objects being auctioned and P is a price which the user is offering to pay for the collection $\overline{Q}$ of objects. Stated differently, a bid comprises a quantity for each of the types of objects and an associated price for the bundle. The auctioneer's system then executes the step 822 of determining a solution to the problem of maximizing bid revenues: find an n-tuple, $\{(\overline{Q}_1,P_1), \ldots, (\overline{Q}_n,P_n)\}$ of bids, one from each user i (i=1, . . . ,n), which maximizes the sum $P_1+ \ldots +P_n$, subject to the constraint that $\overline{Q}_1+ \ldots +\overline{Q}_n \leq \overline{A}$, where vector $\overline{A}=(A^1, \ldots, A^m)$ denotes in its components the available supply of each of the m types of objects. Stated differently, for every i (i=1, . . . ,n), it is required that $(\overline{Q}_i,P_i)$ be a new or previous bid of user i, and the number of units of each type demanded by the users in aggregate must be less than or equal to the supply. In performing this calculation, the auctioneer's system may take as implicit the existence of a zero bid, i.e. the pair $(\overline{0},0)$, associated with each user. Let M denote the maximized sum $P_1+ \ldots +P_n$ and let $(\overline{Q}_1, \ldots, \overline{Q}_n)$ denote an assignment of objects which attains this maximum. Step 823 is then performed to determine if the auction should continue. One exemplary way to perform step 823 is to compare the current maximized bid revenues M with a function of the maximized bid revenues obtained in previous iteration(s) of the loop, and to continue the auction if and only if the current maximized bid revenues exceed the function of the maximized bid revenues obtained in previous iteration(s). However, this particular stopping rule is only exemplary, and many other embodiments are also possible. If branch 823 determines that the auction should continue, then the processing proceeds to step 824, at which the auctioneer's system generates message(s) based on the bid information and transmits message(s) to user system(s), optionally for display to users. One exemplary way to perform step 824 is to generate for one or more user systems i a message which comprises the entire list of new bids which were received from users other than i, and to transmit said message to user system i. A second exemplary way to perform step 824 is to generate a message which comprises the current maximizing n-tuple, $\{(\overline{Q}_1,P_1), \ldots, (\overline{Q}_n,P_n)\}$, and to transmit this message to one or more users. However, these particular examples of step 824 were only illustrative, and many other embodiments are also possible. Thereafter, the processing returns to step 821 and the loop is repeated.

On the other hand, if branch 823 determines that the auction should not continue, then the processing proceeds to step 825, at which the auctioneer's system generates final message(s) based on the final revenue-maximizing assignment of items, i.e. the most recent determination of the revenue-maximizing $(\overline{Q}_1, \ldots, \overline{Q}_n)$ at step 822, and transmits final message(s) to user system(s). One exemplary way to perform step 825 is to generate for one or more user systems i a message which comprises the quantity vector $\overline{Q}_i$ contained in the final revenue-maximizing assignment of items and to transmit said message to user system i. A second exemplary way to perform step 825 is to generate a message which comprises the final revenue-maximizing n-tuple, $\{(\overline{Q}_1,P_1), \ldots, (\overline{Q}_1,P_n)\}$, and to transmit this message to one or more users. However, these particular examples of step 825 were only illustrative, and many other embodiments are also possible. The user system(s) which receive final message(s) will preferably display that information for the benefit of the user(s). The processing has been completed at this step.

Figure 10:
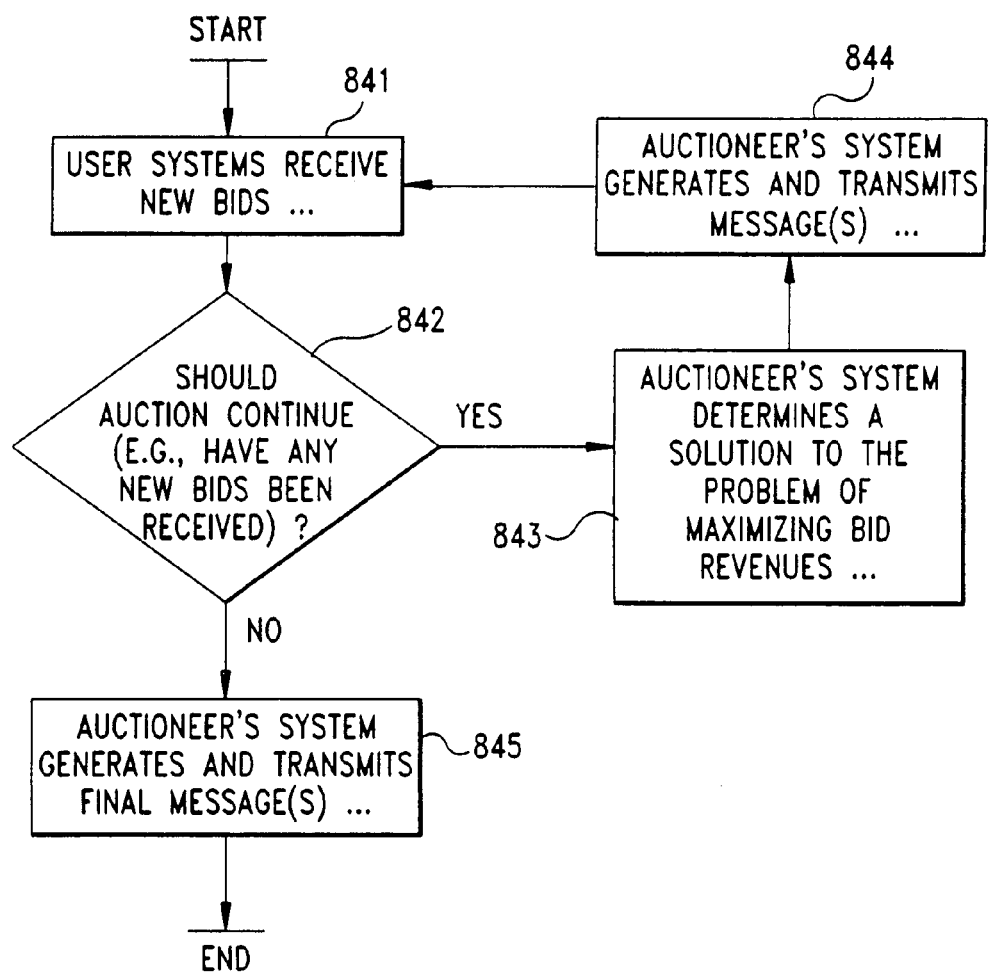
FIG. 10 is a flowchart of a third embodiment of the generalized English auction.

It should be observed that there exist many other embodiments of this auction design with inessential differences. FIG. 10 illustrates one such alternative embodiment, which differs from FIG. 8 (FIG. 9) in that the order of steps 802 and 803 (steps 822 and 823) have been reversed. The auction of FIG. 10 begins at step 841 where the user systems receive new bids, if any, from users and transmit the new bids to the auctioneer's system. Step 842 is then performed to determine if the auction should continue. One exemplary way to perform step 842 is to determine whether any new bids have been received. However, this particular stopping rule is only exemplary, and many other embodiments are also possible. If branch 842 determines that the auction should continue, then the processing proceeds to step 843. At step 843, the auctioneer's system determines a solution to the problem of maximizing bid revenues: find an n-tuple of compatible bids, one from each user i(i=1, . . . ,n), which maximizes the sum $P_1 + \ldots + P_n$. Then, at step 844, the auctioneer's system generates message(s) based on the bid information and transmits message(s) to user system(s), optionally for display to users. Thereafter, the processing returns to step 841 and the loop is repeated.

On the other hand, if branch 842 determined that the auction should not continue, then the processing proceeds to step 845, at which the auctioneer's system generates final message(s) based on the final revenue-maximizing assignment of items, i.e. the most recent determination of the revenue-maximizing n-tuple at step 843, and transmits final message(s) to user system(s). The user system(s) which receive final message(s) will preferably display that information for the benefit of the user(s). The processing has been completed at this step.

EXAMPLE EIGHT OF THE INVENTION'S APPLICATION

Thus far, our discussion of the generalized English auction has focused on the inventive auction design, but has only considered its implementation in a form where users enter their bids in real time. Given that the process will often require a large number of iterations, and given that it is often desirable to conclude an auction in a short time, this suggests that the most preferred embodiment of the generalized English auction will be while exploiting the full generality of the dynamic flexible bidding system.

As samples of flexible bid information which users might wish to enter into the auction system, consider the following. A bidder might like to be able to enter instructions:

"Whenever my bid on the set {A,B} is not part of the revenue-maximizing n-tuple, raise my bid on {A,B} by the minimum amount required to again make it part of the revenue-maximizing n-tuple, given all previous bids; but never exceed $120 million."

Or, alternatively, a bidder might like to be able to make his instructions opponent-specific:

"Select the lowest-cost bid which prevents Bidder H from being assigned object C, given all previous bids."

After entering such flexible bid information, the bidder would be able to walk away from his user system yet still have desired bids entered on his behalf. In keeping with the nature of the flexible bidding system, the bidder might then be able to modify his flexible bid information at any time; bids placed on his behalf in the interim might be binding on him, but the generation of subsequent bids on his behalf could be completely altered.

The implementation of the generalized English auction in the dynamic flexible bidding system takes the basic structure which was shown above in FIGS. 3A-3B-3C. However, the flow of the auctioneer's process is more specifically shown in FIG. 11, so that the implementation is better illustrated by the combination of FIG. 11 and FIGS. 3B-3C.

Figure 11:
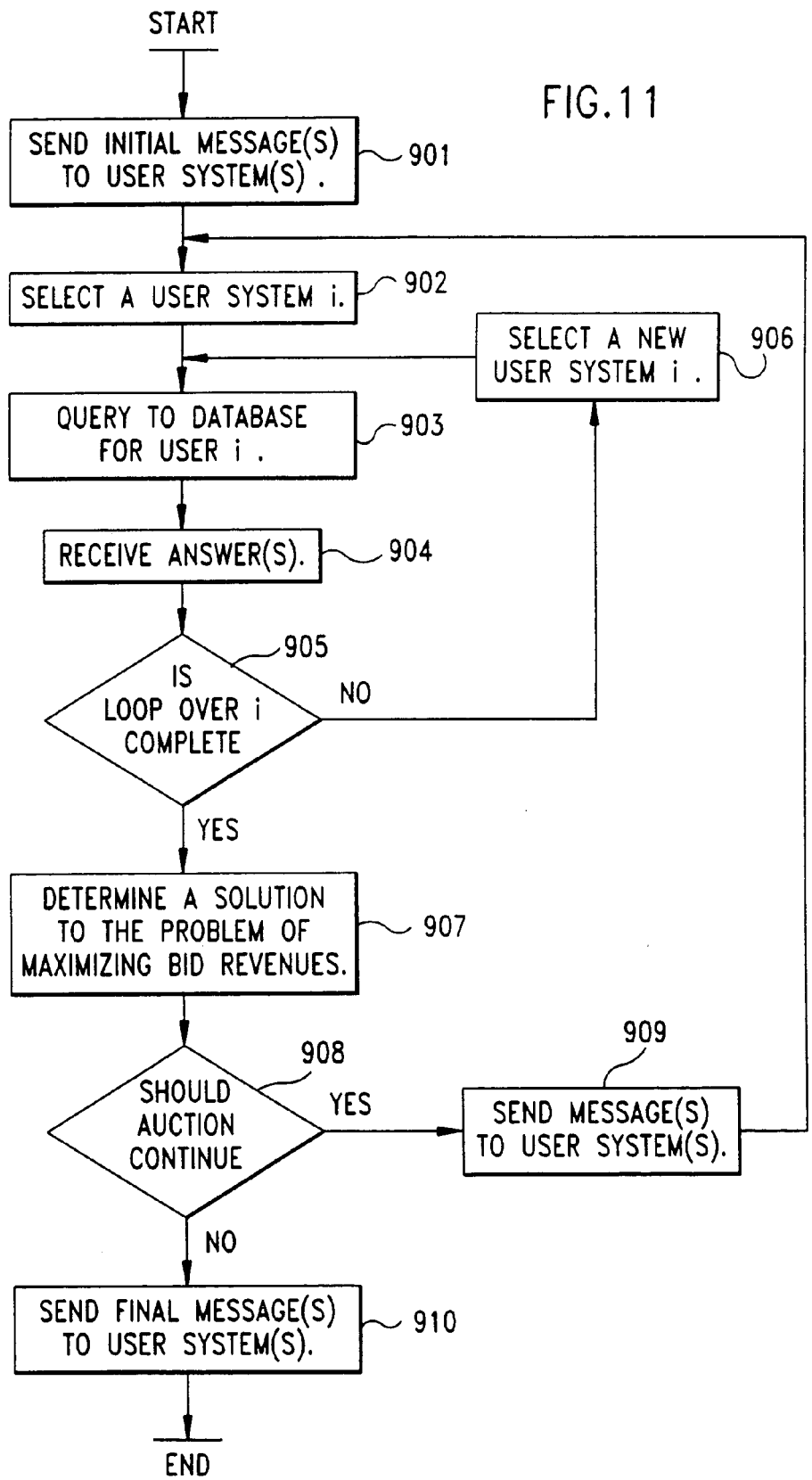
FIG. 11 is a flowchart illustrating the auctioneer process for an implementation of the generalized English auction in the dynamic flexible bidding system.

FIG. 11 is a flow diagram of the auctioneer's process in one implementation of the generalized English auction, as implemented in the dynamic flexible bidding system. The auctioneer's process, at step 901, sends message(s) to user system(s) initiating the auction. Subsequent to execution of step 901, the auctioneer process allows time to pass sufficient so that the user systems can receive flexible bid information. After the passage of a suitable period of time, the auctioneer process begins a loop over user systems at step 902 by selecting a user system i. At step 903, the auctioneer system queries the database for user i. Said query at step 903 may include parameters based on the current bid information, and asks the database process 60 for any new bids (given the current state of the auction) on behalf of user i. For example, the query may comprise providing to the database the current revenue-maximizing assignment and prices and, given the current assignment, prices and flexible bid information in the database, asking for any new bids. Reception of the answer(s) to that query are shown at step 904. Thereafter, step 905 is performed to determine if the loop over user systems has been completed, i.e. has each possible user system been used? If that is not the case, then step 906 is performed to select a new user system i different from all user systems previously used. Processing returns to step 903.

On the other hand, if at the branch 905 it was determined that the loop over user systems has been completed, then step 907 is executed of determining a solution to the problem of maximizing bid revenues, based on the new answers to the queries (new bids) as well as previous answers to the queries (old bids). Step 908 is then performed to determine if the auction should continue. One exemplary way to perform step 908 is to compare the current maximized bid revenues M with a function of the maximized bid revenues obtained in previous iteration(s) of the loop, and to continue the auction if and only if the current maximized bid revenues exceed the function of the maximized bid revenues obtained in previous iteration(s). Another exemplary way to perform step 908 is to determine whether any new bids were received in the most recent loop over user systems. If branch 908 determines that the auction should continue, then the processing proceeds to step 909, at which the auctioneer's system generates message(s) based on the bid information and transmits message(s) to user system(s), optionally for display to users. Subsequent to execution of step 909, the auctioneer process typically allows some time to pass so that the user systems may receive new flexible bid information. After the passage of a suitable period of time, the auctioneer process returns to step 902 to begin a new loop over user systems.

On the other hand, if branch 908 determines that the auction should not continue, the processing proceeds to step 910, in which the auctioneer's system generates final message(s) and transmits them to user system(s), optionally for display. This concludes the auction.

EXAMPLE NINE OF THE INVENTION'S APPLICATION

We have now seen how the rules of the generalized English auction for multiple dissimilar objects can be implemented on a flexible bidding system. Before proceeding, it is helpful to observe that dynamic auction designs for multiple dissimilar objects can also be implemented in a superior fashion on the inventive system. Consider, for example, the FCC auction, already discussed above. If we use exactly the same diagram (FIG. 11, above) as we used for the generalized English auction, but we interpret two of the blocks slightly differently, we have an illustration of how to implement the FCC auction on the flexible bidding system.

Let us reinterpret blocks 903 and 904 as querying for and receiving bids which now comprise pairs $(\omega,P)$, where $\omega \in \Omega$ is an element of the set of objects being auctioned. Stated differently, the generalized English auction allowed bids whose first component was a set; the FCC auction only allows bids whose first component is a single object. Let us also reinterpret block 907 as maximizing the bid revenues, without our previous constraint that only one bid per user is accepted. Stated differently, since the FCC auction does not allow bids for sets of objects, the auction generally involves the acceptance of more than one bid per user (i.e. the FCC simply accepts the highest bid on each object). With these two reinterpretations, we have now described the implementation of the FCC auction on the flexible bidding system.

The sample items of flexible bid information discussed under Example Eight equally serve as sample items of flexible bid information for Example Nine, where the meaning of bidding on {A,B} would now be to place the minimum acceptable raised bids on each of A and B whenever the user is not the current high bidder on the respective objects.

EXAMPLE TEN OF THE INVENTION'S APPLICATION

The foregoing description, while referring to actions of the "user(s)" should not be taken as an indication that a person must necessarily control the user(s)' system at all times to implement the auction which has just been described. Rather, FIGS. 12A-12B shows an exemplary implementation of element 604 of FIG. 3C, illustrating how the element 604 may be automated so that the auction can be carried out without human intervention on the part of a user once the user enters his values for subsets of $\Omega$ into the system.

The use of such an implementation of element 604 generally proceeds similarly to the description of the "safe bidding terminal" provided under the heading "5. The Submission of Bids," above. However—unlike the implementation of the efficient auction for multiple dissimilar objects—the implementation of the generalized English auction enables users to modify the valuations which they have entered into the system even after the auction is underway. Such modifications will typically have no effect on bids already submitted on behalf of the user: under typical embodiments of the auction design, bids once placed will remain binding on the user. However, modification of a user's flexible bid information can have a major impact on the future course of bids submitted on his behalf.

Figure 12A:
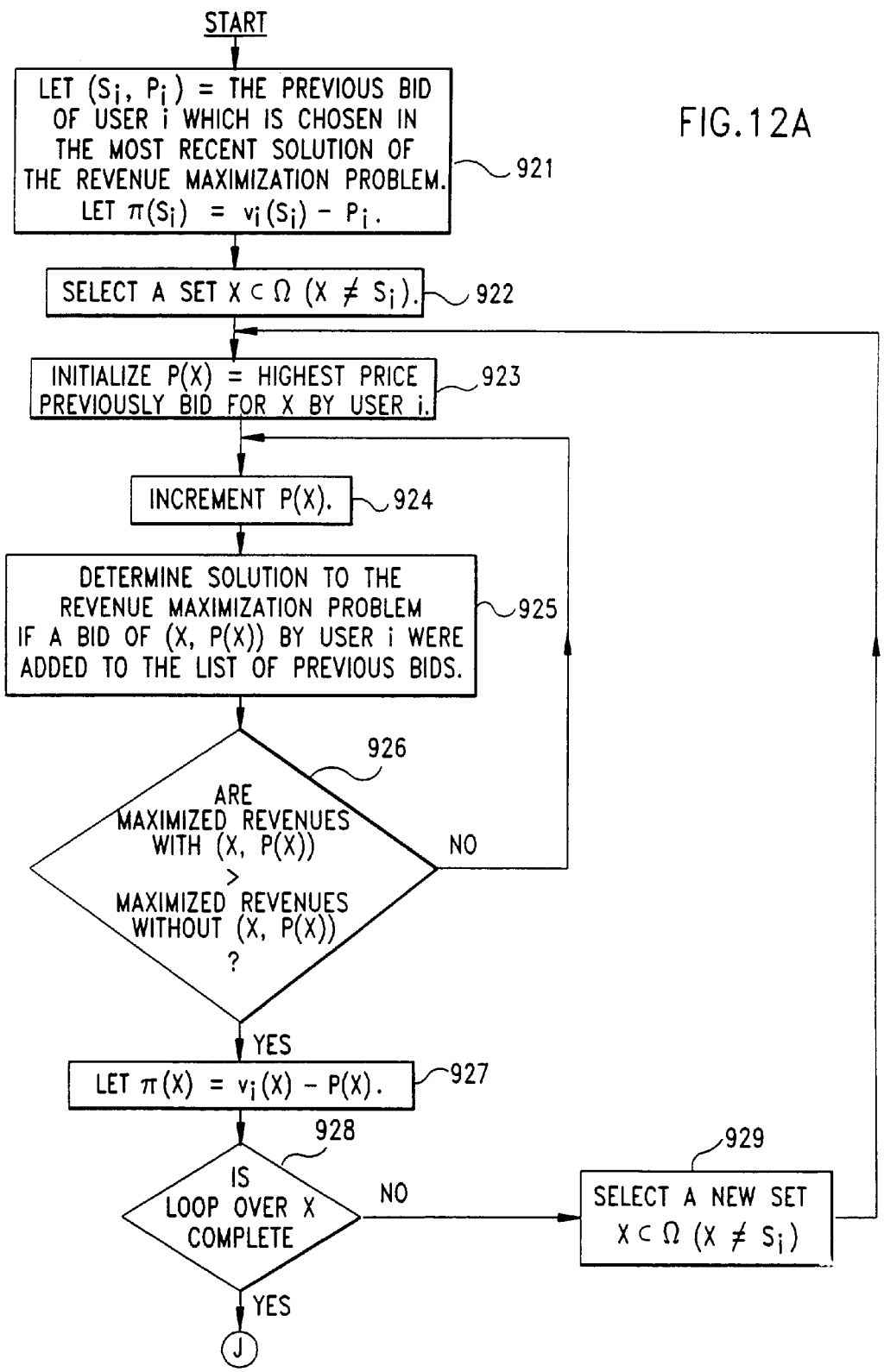
FIGS. 12A-12B are a flowchart illustrating an exemplary implementation of element 604 of FIG. 3C.
Figure 12B:
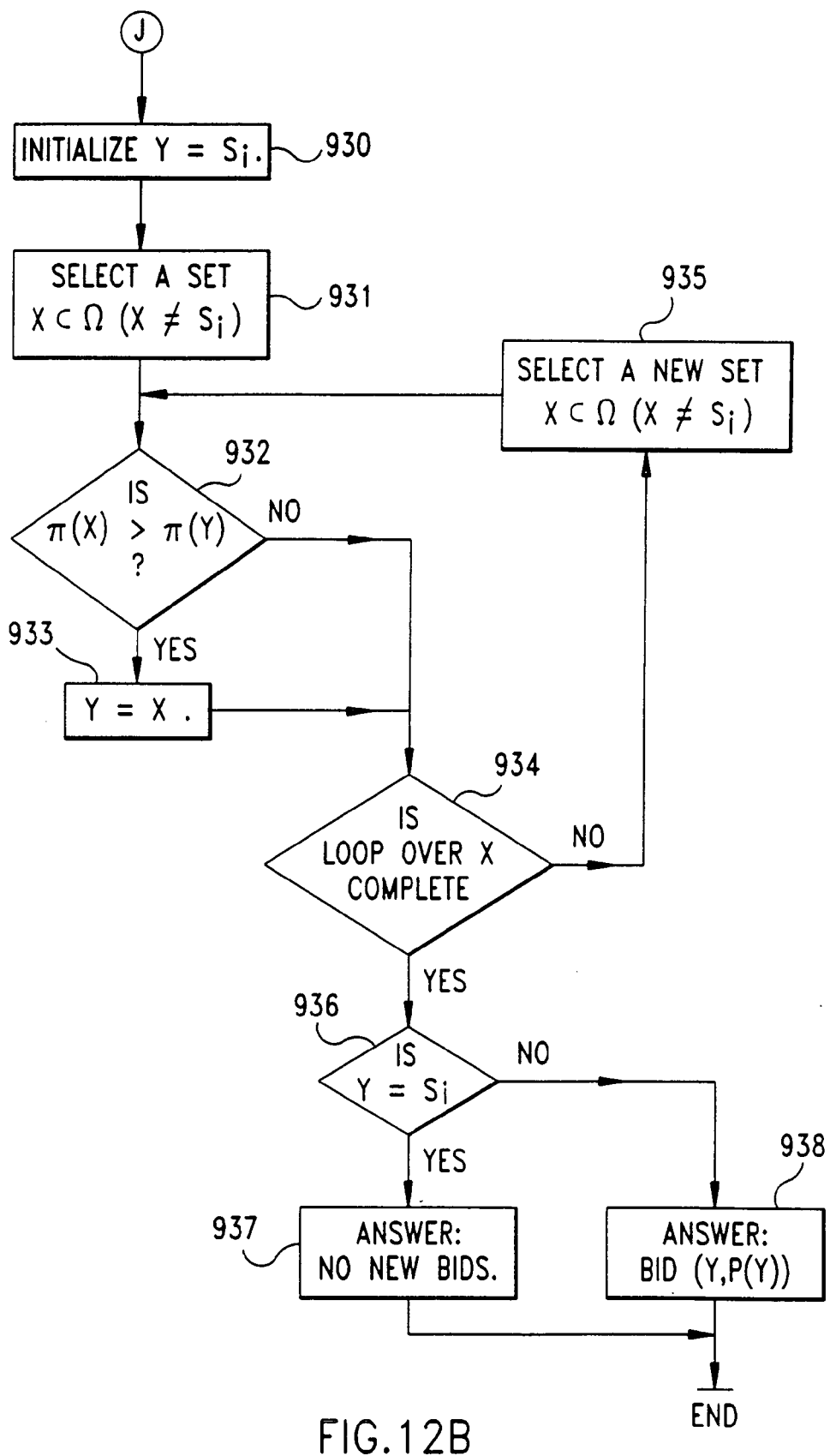

FIGS. 12A-12B show an embodiment of the database process as an automated bid generator for user i, illustrating an exemplary version of how the database process can repeatedly enter bids on behalf of user i. The process of FIGS. 12A-12B takes the role of logical element 604 in FIG. 3C. It could be used, for example, as a component of a larger system comprising the auctioneer process of FIG. 11 or FIG. 3A, the user process of FIG. 3B, and the database process of FIG. 3C.

As illustrated in FIGS. 12A-12B, the database process for user i begins to process a query for new bids at step 921. It begins at this step by examining the current revenue-maximizing n-tuple $\{(S_1,P_1), \ldots, (S_n,P_n)\}$. It lets parameter R denote the current maximized revenue, i.e., $R=P_1+\ldots+P_n$, and it lets $(S_i,P_i)$ denote the component of the revenue-maximizing n-tuple corresponding to user i. Also, it lets parameter $\pi(S_i)=v_i(S_i)-P_i$, i.e. $\pi(S_i)$ denotes user i's surplus from the auction if the auction were to end with user i's bid of $(S_i,P_i)$ accepted, calculated using the value which user i has previously indicated that he attaches to set $S_i$. The database process then executes the step 922 to select any other subset X of $\Omega(X \neq S_i)$. Step 923 initializes the parameter $P(X)$ to equal the highest price previously bid for set X on behalf of user i. Stated differently, $P(X)$ equals the largest P such that $(X,P)$ has been previously bid on behalf of user i, where if no such P is found, $P(X)$ is taken to equal zero. The database process then performs step 924 of incrementing $P(X)$, e.g. by setting $P(X)=P(X)+\Delta$ where $\Delta$ is a positive constant. At step 925, the database process determines a solution to the problem of maximizing bid revenues under the hypothetical condition that a bid of $(X,P(X))$ were entered on behalf of user i and added to the list of previous bids: find an n-tuple, $\{(S_1,P_1), \ldots, (S_n,P_n)\}$ of bids, one from each user k $(k=1,\ldots,n)$, which maximizes the sum $P_1+\ldots+P_n$, subject to the constraint that the $S_k$ are disjoint subsets of $\Omega$. Step 926 is then performed to compare the new maximized bid revenues calculated at step 925 with the parameter R. If branch 926 determines that the maximized bid revenues with $(X,P(X))$ added are no greater than R, i.e. if $P(X)$ is not sufficiently high as to change the solution to the maximization problem, then the processing returns to step 924, and $P(X)$ is further incremented. On the other hand, if branch 926 determines that the maximized bid revenues with $(X,P(X))$ added exceed R, then the processing proceeds to step 927, at which the database process lets parameter $\pi(X)=v_i(X)-P(X)$, i.e. $\pi(X)$ denotes user i's surplus from the auction if the auction were to end with user i's hypothetical bid of $(X,P(X))$ accepted, calculated using the value which user i has previously indicated that he attaches to set X. Step 928 then determines if the loop over X has been completed, i.e. has each possible subset X been used? If that is not the case, then step 929 is performed to select a new subset X $(X \neq S_i)$ different from all previously used subsets X. Processing returns to step 923.

If on the other hand, at the branch 928 it was determined that the loop over X has been completed, then step 930 is performed to initialize parameter $Y=S_i$. Parameter Y will represent the set which, if bid, would yield the highest surplus for user i. Step 931 selects any subset X of $\Omega(X \neq S_i)$. Step 932 then compares $\pi(X)$ with $\pi(Y)$. If branch 932 determines that $\pi(X)$ is strictly greater than $\pi(Y)$, then step 933 is performed by updating parameter Y to set $Y=X$, and processing proceed to step 934. On the other hand, if branch 932 determines that $\pi(X)$ is not strictly greater than $\pi(Y)$, then the processing skips step 933 and proceeds directly to step 934. Step 934 then determines if the loop over X has been completed, i.e. has each possible subset X been used? If that is not the case, then step 935 is performed to select a new subset X $(X \neq S_i)$ different from all previously used subsets X. Processing returns to step 932.

If on the other hand, at the branch 934 it was determined that the loop over X has been completed, then step 936 then determines whether $Y=S_i$. If branch 936 determines that Y=$S_i$, i.e. if ($S_i,P_i$) yields higher surplus to user i (if accepted) than any other acceptable bid (X,P), then the database process advances to step 937, where it replies to the query with an answer of "No new bids for user i." On the other hand, if branch 936 determines that Y≠$S_i$, then the database process advances to step 938, where it replies to the query with an answer of "User i bids (Y,P(Y))." This completes the steps in this implementation of element 604 (FIG. 3C), and so the logic flow proceeds to step 601 (FIG. 3C) where the database process looks for new information received.

Result of a Simulation

Table 4 contains the results of a simulation, where the bids were automatically generated using the method of FIGS. 12A-12B. The bidders' values are taken as in Example C, above. The initial bids were taken as:

| Bidder 1: | ({A}, 40), ({A,B}, 40) |
| Bidder 2: | (Ø, 0) |
| Bidder 3: | ({B}, 30), ({A,B}, 30) |

Bids were required to be placed in integer amounts.

As is shown in Table 4, the described procedure terminates in 13 bidding rounds, with exactly the outcome of the Vickrey auction.

Auctions with Machine-Generated Bids

In the course of this application, a method and apparatus for implementing auctions has been described. The methods and apparatus which have been described allow users to participate in various auctions with a level of attention which varies from constant, down to the input of information on a single occasion. It should also be apparent that the required level of attention by the "auctioneer" may vary from constant to essentially zero—aside from initiating the auction. Thus for all intents and purposes, once the basic auction description is selected and the users input desired information, the auction implemented by the invention can be essentially automatic, i.e. devoid of human interaction.

Because in the past auctions were generally considered to be a process engaged in by persons, the feature of an automatic auction may be, by itself, considered relatively new. There are, however, many other automatic systems which interact in a way which is entirely analogous to an auction and to which the present invention could be applied.

Consider for example a cellular telephone company whose basic operating principle is to continuously allocate its scarce bandwidth in a dynamic process, e.g. a dynamic auction. Each user's telephone or wireless modem is programmed to be allowed to demand bandwidth up to a given priority level whenever the telephone or wireless modem attempts to communicate. In the case of a wireless modem engaging in data communications, the wireless modem might for example be programmed to request sufficient bandwidth to engage in 28.8 kbit/sec communication up to a given priority level and to request sufficient bandwidth to engage in 14.4 kbit/sec communication up to a higher priority level. Whenever new bandwidth becomes available (for example, whenever another user terminates communications or moves outside the relevant cell), the cellular system conducts an ascending-bid auction. In the auction outcome, a given wireless modem might find there was sufficient capacity available that it was allowed to communicate at the full data rate, or it might find that it was only allowed to communicate at a reduced data rate, or it might find that the system was sufficiently congested that data transfer was not allowed at all. Thus, in this context, each telephone or wireless modem is considered a "user" and when presented with the need to communicate, it "bids" based on the priority level to which it is entitled. The base station—a la auctioneer's system—takes into account the "bids" it receives at any time, and the available bandwidth, and produces an auction result, i.e. it allocates the bandwidth in one particular fashion or another.

In another context, the air conditioning plant in an office building allocates cool air among individual offices in the building via a dynamic auction. Periodically, the central computer of the air conditioning system serves as an "auctioneer" (read auctioneer's system) in an auction, where the thermostat in each of the individual offices serve as "bidders" (read user systems). Each thermostat is programmed to send back bids consisting of a desired quantity of cooled air based on: the current temperature reading of the thermostat, the desired temperature in the office, possibly the temperature readings in adjacent offices, and possibly the quantity of cooled air requested by adjacent offices. The system may possibly allow bids with a limitation of the form: "Provide this office with sufficiently cooled air to cool it to 26° C., or do not provide any cooled air at all." Based on the parameters to which it has been programmed, the central controller—auctioneer's system—then provides the result of the auction in allocating cooled air among the demanding offices.

In another context, computational resources on a distributed computer system are allocated via a dynamic auction. Whenever a new job requiring a given quantity of CPU time enters the system, an auction is conducted. Each member of the distributed computer system indicates the quantity of CPU time which it can make available at a given priority level or a given price. In this case, the auctioneer's system selects and allocates the resources to be applied to the new job in accordance with some programmed schedule and hence in this fashion provides the results of the auction.

In another context, an electric utility allocates electric power during power shortages by means of a dynamic auction. Each customer site has been pre-assigned one or more priority levels. For example, a customer may have been offered a discount rate in order to accept a low priority level, or the customer may have agreed to pay a premium rate in order to obtain a higher priority level. In addition, a residential customer might be assigned a very high priority level for the particular circuit which powers the refrigerator but a much lower priority level for a circuit which powers an air conditioner. During power shortages, the central computer (the auctioneer's system) sends out messages consisting of a given priority level, P. The electric meter at each customer site returns a bid consisting of the amount of electric power currently being drawn from circuits which are in pre-assigned priority levels greater than P. If the bids add up to more than the current amount of power available, the auctioneer's system sends out a new message consisting of a higher priority level. This process continues until a priority level has been determined at which electric supply equals electric demand, and a signal is sent out instructing all circuits with a lower priority level to shut down. In this fashion the results of the auction are distributed.

The several examples described herein are exemplary of the invention, whose scope is not limited thereby but rather is indicated in the attached claims.

Summary of Results for Example a

TABLE 1A

| Subauction | Final Price | Bidder 1 In? | Bidder 2 In? |
|---|---|---|---|
| IA | 50 | Yes | No |
| IB | 40 | Yes | No |
| IC | 40 | Yes | No |
| IIA | 10 | Yes | No |
| IIB | 0 | Yes | No |
| IIIA | 10 | Yes | No |
| IIIB | 0 | Yes | No |
| IVA | 50 | Yes | No |
| IVB | 10 | Yes | No |
| IVC | 10 | Yes | No |
| VA | 40 | Yes | No |
| VB | 0 | Yes | No |
| VIA | 40 | Yes | No |
| VIB | 0 | No | No |

TABLE 1B

| Auction | Description of Auction | Does Named Bidder Win? |
|---|---|---|
| I | Bidder 1's Auction for {A,B} | Bidder 1 Wins |
| II | Bidder 1's Auction for {A} | Bidder 1 Wins |
| III | Bidder 1's Auction for {B} | Bidder 1 Wins |
| — | Bidder 1's Auction for Ø | Bidder 1 Wins |
| IV | Bidder 2's Auction for {A,B} | Bidder 2 Loses |
| V | Bidder 2's Auction for {A} | Bidder 2 Loses |
| VI | Bidder 2's Auction for {B} | Bidder 2 Loses |
| — | Bidder 2's Auction for Ø | Bidder 2 Wins |

Summary of Results for Example B

TABLE 2A

| Subauction | Final Price | Bidder 1 In? | Bidder 2 In? |
|---|---|---|---|
| IA | 50 | Yes | No |
| IB | 30 | No | Yes |
| IC | 40 | Yes | No |
| IIA | 10 | Yes | No |
| IIB | 0 | Yes | No |
| IIIA | 10 | Yes | No |
| IIIB | 0 | Yes | No |
| IVA | 50 | Yes | No |
| IVB | 10 | Yes | No |
| IVC | 10 | Yes | No |
| VA | 40 | Yes | No |
| VB | 0 | Yes | No |
| VIA | 30 | No | Yes |
| VIB | 0 | No | No |

TABLE 2B

| Auction | Description of Auction | Does Named Bidder Win? |
|---|---|---|
| I | Bidder 1's Auction for {A,B} | Bidder 1 Loses |
| II | Bidder 1's Auction for {A} | Bidder 1 Wins |
| III | Bidder 1's Auction for {B} | Bidder 1 Wins |
| — | Bidder 1's Auction for Ø | Bidder 1 Wins |
| IV | Bidder 2's Auction for {A,B} | Bidder 2 Loses |
| V | Bidder 2's Auction for {A} | Bidder 2 Loses |
| VI | Bidder 2's Auction for {B} | Bidder 2 Wins |
| — | Bidder 2's Auction for Ø | Bidder 2 Wins |

Summary of Results for Example C

TABLE 3A

| Subauction | Final Price | Bidder 3 In? | Bidder "12" In? |
|---|---|---|---|
| IA | 125 | No | Yes |
| IB | 40 | Yes | No |
| IC | 50 | No | Yes |
| IIA | 25 | No | Yes |
| IIB | 0 | No | Yes |
| IIIA | 40 | Yes | No |
| IIIB | 0 | Yes | No |
| IVA | 125 | Yes | No |
| IVB | 40 | No | Yes |
| IVC | 25 | Yes | No |
| VA | 50 | No | Yes |
| VB | 0 | No | Yes |
| VIA | 40 | Yes | No |
| VIB | 0 | Yes | No |

TABLE 3B

| Auction | Description of Auction | Does Named Bidder Win? |
|---|---|---|
| I | Bidder 3's Auction for {A,B} | Bidder 3 Loses |
| II | Bidder 3's Auction for {A} | Bidder 3 Loses |
| III | Bidder 3's Auction for {B} | Bidder 3 Wins |
| — | Bidder 3's Auction for Ø | Bidder 3 Wins |
| IV | Bidder "12" Auction for {A,B} | Bidder "12" Loses |
| V | Bidder "12" Auction for {A} | Bidder "12" Wins |
| VI | Bidder "12" Auction for {B} | Bidder "12" Loses |
| — | Bidder "12" Auction for Ø | Bidder "12" Wins |

TABLE 4

VALUES:
$V(1,1) = 200$     $V(1,2) = 30$     $V(1,3) = 230$
$V(2,1) = 40$      $V(2,2) = 40$     $V(2,3) = 50$
$V(3,1) = 25$      $V(3,2) = 75$     $V(3,3) = 125$

INITIAL BIDS:
$BID(1,1) = 40$    $BID(1,2) = 0$    $BID(1,3) = 40$
$BID(2,1) = 0$     $BID(2,2) = 0$    $BID(2,3) = 0$
$BID(3,1) = 0$     $BID(3,2) = 30$   $BID(3,3) = 30$
REVENUES FROM INITIAL BIDS ARE: 70

ROUND 1

BIDDER 1 ENTERS NO NEW BID
BIDDER 2 BIDS A PRICE OF 31 ON SET {B}
BIDDER 3 BIDS A PRICE OF 71 ON SET {A,B}
$BID(1,1) = 40$    $BID(1,2) = 0$    $BID(1,3) = 40$
$BID(2,1) = 0$     $BID(2,2) = 31$   $BID(2,3) = 0$
$BID(3,1) = 0$     $BID(3,2) = 30$   $BID(3,3) = 71$
REVENUES ARE: 71

ROUND 2

BIDDER 1 ENTERS NO NEW BID
BIDDER 2 ENTERS NO NEW BID
BIDDER 3 BIDS A PRICE OF 72 ON SET {A,B}
$BID(1,1) = 40$    $BID(1,2) = 0$    $BID(1,3) = 40$
$BID(2,1) = 0$     $BID(2,2) = 31$   $BID(2,3) = 0$
$BID(3,1) = 0$     $BID(3,2) = 30$   $BID(3,3) = 72$
REVENUES ARE: 72

ROUND 3

BIDDER 1 BIDS A PRICE OF 42 ON SET {A}
BIDDER 2 BIDS A PRICE OF 33 ON SET {B}
BIDDER 3 ENTERS NO NEW BID
$BID(1,1) = 42$    $BID(1,2) = 0$    $BID(1,3) = 40$
$BID(2,1) = 0$     $BID(2,2) = 33$   $BID(2,3) = 0$
$BID(3,1) = 0$     $BID(3,2) = 30$   $BID(3,3) = 72$
REVENUES ARE: 75

ROUND 4

BIDDER 1 ENTERS NO NEW BID
BIDDER 2 ENTERS NO NEW BID

TABLE 4-continued

BIDDER 3 BIDS A PRICE OF 76 ON SET {A,B}
    BID(1,1) = 42    BID(1,2) = 0    BID(1,3) = 40
    BID(2,1) = 0    BID(2,2) = 33    BID(2,3) = 0
    BID(3,1) = 0    BID(3,2) = 30    BID(3,3) = 76
REVENUES ARE: 76

ROUND 5

BIDDER 1 BIDS A PRICE OF 44 ON SET {A}
BIDDER 2 BIDS A PRICE OF 35 ON SET {B}
BIDDER 3 ENTERS NO NEW BID
    BID(1,1) = 44    BID(1,2) = 0    BID(1,3) = 40
    BID(2,1) = 0    BID(2,2) = 35    BID(2,3) = 0
    BID(3,1) = 0    BID(3,2) = 30    BID(3,3) = 76
REVENUES ARE: 79

ROUND 6

BIDDER 1 ENTERS NO NEW BID
BIDDER 2 ENTERS NO NEW BID
BIDDER 3 BIDS A PRICE OF 80 ON SET {A,B}
    BID(1,1) = 44    BID(1,2) = 0    BID(1,3) = 40
    BID(2,1) = 0    BID(2,2) = 35    BID(2,3) = 0
    BID(3,1) = 0    BID(3,2) = 30    BID(3,3) = 80
REVENUES ARE: 80

ROUND 7

BIDDER 1 BIDS A PRICE OF 46 ON SET {A}
BIDDER 2 BIDS A PRICE OF 37 ON SET {B}
BIDDER 3 ENTERS NO NEW BID
    BID(1,1) = 46    BID(1,2) = 0    BID(1,3) = 40
    BID(2,1) = 0    BID(2,2) = 37    BID(2,3) = 0
    BID(3,1) = 0    BID(3,2) = 30    BID(3,3) = 80
REVENUES ARE: 83

ROUND 8

BIDDER 1 ENTERS NO NEW BID
BIDDER 2 ENTERS NO NEW BID
BIDDER 3 BIDS A PRICE OF 84 ON SET {A,B}
    BID(1,1) = 46    BID(1,2) = 0    BID(1,3) = 40
    BID(2,1) = 0    BID(2,2) = 37    BID(2,3) = 0
    BID(3,1) = 0    BID(3,2) = 30    BID(3,3) = 84
REVENUES ARE: 84

ROUND 9

BIDDER 1 BIDS A PRICE OF 48 ON SET {A}
BIDDER 2 BIDS A PRICE OF 39 ON SET {B}
BIDDER 3 ENTERS NO NEW BID
    BID(1,1) = 48    BID(1,2) = 0    BID(1,3) = 40
    BID(2,1) = 0    BID(2,2) = 39    BID(2,3) = 0
    BID(3,1) = 0    BID(3,2) = 30    BID(3,3) = 84
REVENUES ARE: 87

ROUND 10

BIDDER 1 ENTERS NO NEW BID
BIDDER 2 ENTERS NO NEW BID
BIDDER 3 BIDS A PRICE OF 88 ON SET {A,B}
    BID(1,1) = 48    BID(1,2) = 0    BID(1,3) = 40
    BID(2,1) = 0    BID(2,2) = 39    BID(2,3) = 0
    BID(3,1) = 0    BID(3,2) = 30    BID(3,3) = 88
REVENUES ARE: 88

ROUND 11

BIDDER 1 BIDS A PRICE OF 50 ON SET {A}
BIDDER 2 ENTERS NO NEW BID
BIDDER 3 ENTERS NO NEW BID
    BID(1,1) = 50    BID(1,2) = 0    BID(1,3) = 40
    BID(2,1) = 0    BID(2,2) = 39    BID(2,3) = 0
    BID(3,1) = 0    BID(3,2) = 30    BID(3,3) = 88
REVENUES ARE: 89

ROUND 12

BIDDER 1 ENTERS NO NEW BID
BIDDER 2 ENTERS NO NEW BID
BIDDER 3 BIDS A PRICE OF 40 ON SET {B}
    BID(1,1) = 50    BID(1,2) = 0    BID(1,3) = 40
    BID(2,1) = 0    BID(2,2) = 39    BID(2,3) = 0
    BID(3,1) = 0    BID(3,2) = 40    BID(3,3) = 88
REVENUES ARE: 90

TABLE 4-continued

ROUND 13

BIDDER 1 ENTERS NO NEW BID
BIDDER 2 ENTERS NO NEW BID
BIDDER 3 ENTERS NO NEW BID
    BID(1,1) = 50    BID(1,2) = 0    BID(1,3) = 40
    BID(2,1) = 0    BID(2,2) = 39    BID(2,3) = 0
    BID(3,1) = 0    BID(3,2) = 40    BID(3,3) = 88
REVENUES ARE: 90
AUCTION OUTCOME:
    BIDDER 1 HAS WON SET {A} FOR A PRICE OF 50
    BIDDER 3 HAS WON SET {B} FOR A PRICE OF 40

The invention claimed is:

1. A computer-implemented system for conducting an auction of a plurality of items, at least some of said items being dissimilar, said system comprising:
    a) an auctioneer's system and at least two user systems, the auctioneer's system communicatively coupled to user systems;
    b) said user systems including:
        b1) means for receiving messages from the auctioneer's system and for displaying said messages;
        b2) means for receiving bid related information from users, and
        b3) means for transmitting bid information to the auctioneer's system, said bid information including bids ($S_i$, $P_i$) each comprising a set identification $S_i$ and a value parameter $P_i$, where the set identification $S_i$ identifies a set of items that a user proposes to transact and where the value parameter $P_i$ specifies a value proposed by the user for the set of items identified by $S_i$, at least one of the bids including a set identification $S_i$ identifying at least two different items; and
    c) said auctioneer's system including:
        c1) means for generating and transmitting messages to at least one of said user systems, said messages including a non-final message indicating that the auction will continue and a final message indicating that the auction has terminated;
        c2) means for receiving bid information from at least one of said user systems; and
        c3) decision means responsive to the bid information received from the user systems for determining whether the auction should continue or terminate, said decision means including:
        c31) selecting means which selects bids to maximize a function of the value parameters $P_i$ of the selected bids;
        c32) means to initiate the generation of a non-final message to at least one user system in response to a determination to continue the auction; and
        c33) means to initiate the generation of a final message to at least one user system in response to a determination to terminate the auction.

2. A system as recited in claim 1 wherein the selecting means constrains the selection such that the sets $S_i$ identified by the selected bids are disjoint.

3. A system as recited in claim 2 wherein the items comprise television licenses or associated derivative rights.

4. A system as recited in claim 2 wherein the auction is conducted in multiple rounds.

5. A system as recited in claim 4 wherein the decision means compares a sum of the parameters $P_i$ from the selected bids to a function of a sum of the parameters $P_i$ from the selected bids of an earlier round.

6. A system as recited in claim 2 which further includes means for limiting bids from a particular user based on previous bidding activity by said particular user.

7. A system as recited in claim 2 which further includes means for limiting the number of bids that may be entered by a particular user.

8. A system as recited in claim 2 which further includes means for limiting bids to identifying particular sets of said plurality of items.

9. A system as recited in claim 2 which further includes means for limiting a bid from a particular user to a value parameter no less than a minimum value, wherein said minimum value is specific to said particular user and to a particular set identified, and depends on previous bids by the users.

10. A system as recited in claim 2 which further includes means for limiting a bid from a particular user to a value parameter no greater than a maximum value, wherein said maximum value is specific to said particular user and to a particular set identified, and depends on previous bids by the users.

11. A computer-implemented system for conducting an auction of dissimilar items, including multiple instances of each of plural dissimilar items, said system comprising:
   a) an auctioneer's system and at least two user systems, the auctioneer's system communicatively coupled to user systems;
   b) said user systems including:
      b1) means for receiving messages from the auctioneer's system and for displaying said messages;
      b2) means for receiving bid related information from users; and
      b3) means for transmitting bid information to the auctioneer's system, said bid information including bids ($S_i$, $P_i$) each comprising a set identification $S_i$ and a value parameter $P_i$, where the set identification $S_i$ identifies a set of items that a user proposes to transact and where the value parameter $P_i$ specifies a value proposed by the user for a set of items identified by $S_i$, at least one of the bids including a set identification $S_i$ identifying at least two different items; and
   c) said auctioneer's system including:
      c1) means for generating and transmitting messages to at least one of said user systems, said messages including a non-final message indicating that the auction will continue and a final message indicating that the auction has terminated;
      c2) means for receiving bid information from at least one of said user systems; and
      c3) decision means responsive to the bid information received from the user systems for determining whether the auction should continue or terminate, said decision means including;
         c31) selecting means which selects bids to maximize a function of the value parameters $P_i$ of the selected bids subject to a constraint that the sets $S_i$ identified by the selected bids are compatible;
         c32) means to initiate the generation of a non-final message to at least one user system in response to a determination to continue the auction; and
         c33) means to initiate the generation of a final message to at least one user system in response to a determination to terminate the auction.

12. A system as recited in claim 11 wherein the items comprise television licenses or associated derivative rights.

13. A system as recited in claim 11 wherein the auction is conducted in multiple rounds.

14. A system as recited in claim 13 wherein the sets $S_i$ identified by the selected bids in a final round of the auction indicate items that will be assigned to respective users after the auction.

15. A system as recited in claim 13 wherein the decision means compares a sum of the parameters $P_i$ from the selected bids to a function of a sum of the parameters $P_i$ from the selected bids of an earlier round.

16. A system as recited in claim 11 which further includes means for limiting bids from a particular user based on previous bidding activity by said particular user.

17. A system as recited in claim 11 which further includes means for limiting the number of bids that may be entered by a particular user.

18. A system as recited in claim 11 which further includes means for limiting bids to identifying particular sets of said plurality of items.

19. A system as recited in claim 11 which further includes means for limiting a bid from a particular user to a value parameter no less than a minimum value, wherein said minimum value is specific to said particular user and to a particular set identified, and depends on previous bids by the users.

20. A system as recited in claim 11 which further includes means for limiting a bid from a particular user to a value parameter no greater than a maximum value, wherein said maximum value is specific to said particular user and to a particular set identified, and depends on previous bids by the users.

21. A computer-implemented method for conducting an auction of a plurality of items among a plurality of users, at least some of said items being dissimilar, the method comprising:
   a) receiving bid related information from users and transmitting bid information for processing by a computer, said bid information including bids ($S_i$, $P_i$) each comprising a set identification $S_i$ and a value parameter $P_i$, where the set identification $S_i$ identifies a set of items that a user proposes to transact and where the value parameter $P_i$ specifies a value proposed by the user for the set of items identified by $S_i$, at least one of the bids including a set identification $S_i$ identifying at least two different items;
   b) determining at said computer, in response to the bid information, whether the auction should continue or terminate, said determining including selecting bids to maximize a function of the value parameters $P_i$ of the selected bids;
   c) transmitting a message indicating that the auction will continue to at least one user, in response to a determination to continue the auction; and
   d) transmitting a message indicating that the auction will terminate to at least one user, in response to a determination to terminate the auction.

22. A method as recited in claim 21 wherein the determining further includes constraining the selection such that the sets $S_i$ identified by the selected bids are disjoint.

23. A method as recited in claim 22 wherein the items comprise television licenses or associated derivative rights.

24. A method as recited in claim 22 wherein the auction is conducted in multiple rounds.

25. A method as recited in claim 24 wherein the determining further includes comparing a sum of the parameters $P_i$ from the selected bids to a function of a sum of the parameters $P_i$ from selected bids of an earlier round.

26. A method as recited in claim 22 which further comprises limiting bids from a particular user based on previous bidding activity by said particular user.

27. A method as recited in claim 22 which further comprises limiting the number of bids that may be entered by a particular user.

28. A method as recited in claim 22 which further comprises limiting bids to identifying particular sets of said plurality of items.

29. A method as recited in claim 22 which further comprises limiting a bid from a particular user to a value parameter no less than a minimum value, wherein said minimum value is specific to said particular user and to a particular set identified, and depends on previous bids by the users.

30. A method as recited in claim 22 which further comprises limiting a bid from a particular user to a value parameter no greater than a maximum value, wherein said maximum value is specific to said particular user and to a particular set identified, and depends on previous bids by the users.

31. A computer-implemented method for conducting an auction of a plurality of items among a plurality of users, at least some of said items being dissimilar, the method comprising:
  a) receiving bid related information from users and transmitting bid information for processing by a computer, said bid information including bids ($S_i$, $P_i$) each comprising a set identification $S_i$ and a value parameter $P_i$, where the set identification $S_i$ identifies a set of items that a user proposes to transact and where the value parameter $P_i$ specifies a value proposed by the user for the set of items identified by $S_i$, at least one of the bids including a set identification $S_i$ identifying at least two different items;
  b) determining at said computer, in response to the bid information, whether the auction should continue or terminate, said determining including selecting bids to maximize a function of the value parameters $P_i$ of the selected bids subject to a constraint that the sets $S_i$ identified by the selected bids are compatible;
  c) transmitting a message indicating that the auction will continue to at least one user, in response to a determination to continue the auction; and
  d) transmitting a message indicating that the auction will terminate to at least one user, in response to a determination to terminate the auction.

32. A method as recited in claim 31 wherein the items comprise television licenses or associated derivative rights.

33. A method as recited in claim 31 wherein the auction is conducted in multiple rounds.

34. A method as recited in claim 33 wherein the sets $S_i$ identified by the selected bids in a final round of the auction indicate items that will be assigned to respective users after the auction.

35. A method as recited in claim 33 wherein the determining further includes comparing the sum of the parameters $P_i$ from the selected bids to a function of the sum of the parameters $P_i$ from the selected bids of an earlier round.

36. A method as recited in claim 31 which further comprises limiting bids from a particular user based on previous bidding activity by said particular user.

37. A method as recited in claim 31 which further comprises limiting the number of bids that may be entered by a particular user.

38. A method as recited in claim 31 which further comprises limiting bids to identify particular sets of said plurality of items.

39. A method as recited in claim 31 which further comprises limiting a bid from a particular user to a value parameter no less than a minimum value, wherein said minimum value is specific to said particular user and to a particular set identified, and depends on previous bids by the users.

40. A method as recited in claim 31 which further comprises limiting a bid from a particular user to a value parameter no greater than a maximum value, wherein said maximum value is specific to said particular user and to a particular set identified, and depends on previous bids by the users.

41. A system for conducting a computer-implemented auction of a plurality of items among a plurality of users, at least some of said items being dissimilar, said system comprising:
  a) means for receiving bid information, said bid information including bids ($S_i$, $P_i$) each comprising a set identification $S_i$ and a value parameter $P_i$, where the set identification $S_i$ identifies a set of items that a user proposes to transact and where the value parameter $P_i$ specifies a value proposed by the user for the set of items identified by $S_i$, at least one of the bids including a set identification $S_i$ identifying at least two different items;
  b) means for transmitting signals based on the bid information for processing by a computer; and
  c) means at said computer for determining, based on the signals, the items to be assigned to the users, said determining means including selecting means which selects bids to maximize a function of the value parameters $P_i$ of the selected bids.

42. A system as recited in claim 41 wherein the selecting means constrains the selection such that the sets $S_i$ identified by the selected bids are disjoint.

43. A system as recited in claim 42 wherein the items comprise television licenses or associated derivative rights.

44. A system as recited in claim 42 wherein the auction is conducted in multiple rounds.

45. A system as recited in claim 44 wherein the determining means compares the sum of the parameters $P_i$ from the selected bids to a function of the sum of the parameters $P_i$ from the selected bids of an earlier round.

46. A system as recited in claim 42 which further includes means for limiting bids from a particular user based on previous bidding activity by said particular user.

47. A system as recited in claim 42 which further includes means for limiting the number of bids that may be entered by a particular user.

48. A system as recited in claim 42 which further includes means for limiting bids to identifying particular sets of said plurality of items.

49. A system as recited in claim 42 which further includes means for limiting a bid from a particular user to a value parameter no less than a minimum value, wherein said minimum value is specific to said particular user and to a particular set identified, and depends on previous bids by the users.

50. A system as recited in claim 42 which further includes means for limiting a bid from a particular user to a value parameter no greater than a maximum value, wherein said maximum value is specific to said particular user and to a particular set identified, and depends on previous bids by the users.

51. A system for conducting a computer-implemented auction of dissimilar items, including multiple instances of each of plural dissimilar items, among a plurality of users, said system comprising:
 a) means for receiving bid information, said bid information including bids ($S_i$, $P_i$) each comprising a set identification $S_i$ and a value parameter $P_i$, where the set identification $S_i$ identifies a set of items that a user proposes to transact and where the value parameter $P_i$ specifies a value proposed by the user for the set of items identified by $S_i$, at least one of the bids including a set identification $S_i$ identifying at least two different items;
 b) means for transmitting signals based on the bid information for processing by a computer; and
 c) means at said computer for determining, based on the signals, the items to be assigned to the users, said determining means including selecting means which selects bids to maximize a function of the value parameters $P_i$ of the selected bids subject to a constraint that the sets $S_i$ identified by the selected bids are compatible.

52. A system as recited in claim 51 wherein the items comprise television licenses or associated derivative rights.

53. A system as recited in claim 51 wherein the auction is conducted in multiple rounds.

54. A system as recited in claim 53 wherein the sets $S_i$ identified by the selected bids in a final round of the auction indicate items that will be assigned to respective users after the auction.

55. A system as recited in claim 53 wherein the determining means compares the sum of the parameters $P_i$ from the selected bids to a function of the sum of the parameters $P_i$ from the selected bids of an earlier round.

56. A system as recited in claim 51 which further includes means for limiting bids from a particular user based on previous bidding activity by said particular user.

57. A system as recited in claim 51 which further includes means for limiting the number of bids that may be entered by a particular user.

58. A system as recited in claim 51 which further includes means for limiting bids to identifying particular sets of said plurality of items.

59. A system as recited in claim 51 which further includes means for limiting a bid from a particular user to a value parameter no less than a minimum value, wherein said minimum value is specific to said particular user and to a particular set identified, and depends on previous bids by the users.

60. A system as recited in claim 51 which further includes means for limiting a bid from a particular user to a value parameter no greater than a maximum value, wherein said maximum value is specific to said particular user and to a particular set identified, and depends on previous bids by the users.

61. A method for conducting a computer-implemented auction of a plurality of items among a plurality of users, at least some of said items being dissimilar, in a system including an auctioneer's system, the method comprising:
 a) receiving bid information from at least one of said users, said bid information including one or more bids ($S_i$, $P_i$), each bid comprising a set identification $S_i$ and a value parameter $P_i$, where the set identification $S_i$ identifies a set of items that a user proposes to transact and where the value parameter $P_i$ specifies a value proposed by the user for the set of items identified by $S_i$, at least one of the bids including a set identification $S_i$ identifying at least two different items;
 b) transmitting signals based on the bid information to a computer; and
 c) determining at said computer, based on the signals, the items to be assigned to the users, said determining including selecting bids to maximize a function of the value parameters $P_i$ of the selected bids.

62. A method as recited in claim 61 wherein the determining further includes constraining the selection such that the sets $S_i$ identified by the selected bids are disjoint.

63. A method as recited in claim 62 wherein the items comprise television licenses or associated derivative rights.

64. A method as recited in claim 62 wherein the auction is conducted in multiple rounds.

65. A method as recited in claim 64 wherein the determining further includes comparing the sum of the parameters $P_i$ from the selected bids to a function of the sum of the parameters $P_i$ from the selected bids of an earlier round.

66. A method as recited in claim 62 which further comprises limiting bids from a particular user based on previous bidding activity by said particular user.

67. A method as recited in claim 62 which further comprises limiting the number of bids that may be entered by a particular user.

68. A method as recited in claim 62 which further comprises limiting bids to identifying particular sets of said plurality of items.

69. A method as recited in claim 62 which further comprises limiting a bid from a particular user to a value parameter no less than a minimum value, wherein said minimum value is specific to said particular user and to a particular set identified, and depends on previous bids by the users.

70. A method as recited in claim 62 which further comprises limiting a bid from a particular user to a value parameter no greater than a maximum value, wherein said maximum value is specific to said particular user and to a particular set identified, and depends on previous bids by the users.

71. A method for conducting a computer-implemented auction of dissimilar items, including multiple instances of each of plural dissimilar items, among a plurality of users, the method comprising:
 a) receiving bid information from at least one of said users, said bid information including one or more bids ($S_i$, $P_i$), each bid comprising a set identification $S_i$ and a value parameter $P_i$, where the set identification $S_i$ identifies a set of items that a user proposes to transact and where the value parameter $P_i$ specifies a value proposed by the user for the set of items identified by $S_i$, at least one of the bids including a set identification $S_i$ identifying at least two different items;
 b) transmitting signals based on the bid information to a computer; and
 c) determining at said computer, based on the signals, the items to be assigned to the users, said determining including selecting bids to maximize a function of the value parameters $P_i$ of the selected bids subject to a constraint that the sets $S_i$ identified by the selected bids are compatible.

72. A method as recited in claim 71 wherein the items comprise television licenses or associated derivative rights.

73. A method as recited in claim 71 wherein the auction is conducted in multiple rounds.

74. A method as recited in claim 73 wherein the sets $S_i$ identified by the selected bids in a final round of the auction indicate items that will be assigned to respective users after the auction.

75. A method as recited in claim 73 wherein the determining further includes comparing the sum of the parameters $P_i$ from the selected bids to a function of the sum of the parameters $P_i$ from the selected bids of an earlier round.

76. A method as recited in claim 71 which further comprises limiting bids from a particular user based on previous bidding activity by said particular user.

77. A method as recited in claim 71 which further comprises limiting the number of bids that may be entered by a particular user.

78. A method as recited in claim 71 which further comprises limiting bids to identifying particular sets of said plurality of items.

79. A method as recited in claim 71 which further comprises limiting a bid from a particular user to a value parameter no less than a minimum value, wherein said minimum value is specific to said particular user and to a particular set identified, and depends on previous bids by the users.

80. A method as recited in claim 71 which further comprises limiting a bid from a particular user to a value parameter no greater than a maximum value, wherein said maximum value is specific to said particular user and to a particular set identified, and depends on previous bids by the users.

81. A computer-implemented system for conducting an auction of a plurality of types of items among a plurality of users, a plurality of each type of item being auctioned, the system comprising:
   a) means for transmitting to users information including at least a current proposed price for each of the plurality of types of items;
   b) means for receiving bid related information from users and transmitting bid information for processing by a computer, said bid information including bids each comprising a set identification $S_i$ where the set identification $S_i$ identifies a set of items that a user proposes to transact at the current proposed prices, at least one of the bids including a set identification $S_i$ identifying a set containing at least two different types of items;
   c) means for selecting bids to maximize a function of values of the selected bids based on the current proposed prices;
   d) means for determining at said computer, in response to the bid information, whether the auction should continue or terminate; and
   e) means for transmitting a message to users indicating that the auction will continue in response to a determination to continue the auction, said message including an updated current proposed price for at least one of the types of items.

82. A system as recited in claim 81 wherein the selecting means constrains the selection such that the sets $S_i$ identified by the selected bids are disjoint.

83. A system as recited in claim 82 wherein the items comprise television licenses or associated derivative rights.

84. A system as recited in claim 81 wherein the auction is conducted in multiple rounds and the determining means compares the sum of the values of the selected bids with a function of the sum of the values of the selected bids of an earlier round.

85. A system as recited in claim 81 wherein the auction is conducted in multiple rounds and the determining means considers whether any new bids were submitted by any user in a round.

86. A system as recited in claim 81 wherein the determining means compares the sum of bids to an amount offered.

87. A system as recited in claim 81 which further includes means for limiting bids from a particular user based on previous bidding activity by said particular user.

88. A computer-implemented system for conducting an auction of a plurality of types of items among a plurality of users, a plurality of each type of item being auctioned, the system comprising:
   a) means for transmitting to users information including at least a current proposed price for each of the plurality of types of items;
   b) means for receiving bid related information from users and transmitting bid information for processing by a computer, said bid information including bids each comprising a set identification $S_i$ where the set identification $S_i$ identifies a set of items that a user proposes to transact at the current proposed prices, at least one of the bids including a set identification $S_i$ identifying a set containing at least two different types of items;
   c) means for selecting bids to maximize a function of values of the selected bids based on the current proposed prices subject to a constraint that the sets $S_i$ identified by the selected bids are compatible;
   d) means for determining at said computer, in response to the bid information, whether the auction should continue or terminate; and
   e) means for transmitting a message to users indicating that the auction will continue in response to a determination to continue the auction, said message including an updated current proposed price for at least one of the types of items.

89. A system as recited in claim 88 wherein the selecting means constrains the selection such that the sets $S_i$ identified by the selected bids are disjoint.

90. A system as recited in claim 89 wherein the items comprise television licenses or associated derivative rights.

91. A system as recited in claim 88 wherein the auction is conducted in multiple rounds and the determining means compares the sum of the values of the selected bids with a function of the sum of the values of the selected bids of an earlier round.

92. A system as recited in claim 88 wherein the auction is conducted in multiple rounds and the determining means considers whether any new bids were submitted by any user in a round.

93. A system as recited in claim 88 wherein the determining means compares the sum of bids to an amount offered.

94. A system as recited in claim 88 which further includes means for limiting bids from a particular user based on previous bidding activity by said particular user.

95. A computer-implemented method for conducting an auction of a plurality of types of items among a plurality of users, a plurality of each type of item being auctioned, the method comprising:
   a) transmitting to users information including at least a current proposed price for each of the plurality of types of items;
   b) receiving bid related information from users and transmitting bid information for processing by a computer, said bid information including bids each comprising a set identification $S_i$ where the set identification $S_i$ identifies a set of items that a user proposes to transact at the current proposed prices, at least one of the bids including a set identification $S_i$ identifying a set containing at least two different types of items;

c) selecting bids to maximize a function of values of the selected bids based on the current proposed prices;

d) determining at said computer, in response to the bid information, whether the auction should continue or terminate; and e) transmitting a message to users indicating that the auction will continue in response to a determination to continue the auction, said message including an updated current proposed price for at least one of the types of items.

96. A method as recited in claim 95 wherein the selecting further includes constraining the selection such that the sets $S_i$ identified by the selected bids are disjoint.

97. A method as recited in claim 96 wherein the items comprise television licenses or associated derivative rights.

98. A method as recited in claim 95 wherein the auction is conducted in multiple rounds and the determining includes comparing the sum of the values of the selected bids with a function of the sum of the values of the selected bids of an earlier round.

99. A method as recited in claim 95 wherein the auction is conducted in multiple rounds and the determining includes considering whether any new bids were submitted by any user in a round.

100. A method as recited in claim 95 wherein the determining includes comparing the sum of bids with an amount offered.

101. A method as recited in claim 95 which further includes limiting bids from a particular user based on previous bidding activity by said particular user.

102. A computer-implemented method for conducting an auction of a plurality of types of items among a plurality of users, a plurality of each type of item being auctioned, the method comprising:

a) transmitting to users information including at least a current proposed price for each of the plurality of types of items;

b) receiving bid related information from at least one of said users and transmitting bid information for processing by a computer, said bid information including bids each comprising a set identification $S_i$ where the set identification $S_i$ identifies a set of items that the user proposes to transact at the current proposed prices, at least one of the bids including a set identification $S_i$ identifying a set containing at least two different types of items;

c) selecting bids to maximize a function of values of the selected bids based on the current proposed prices subject to a constraint that the sets $S_i$ identified by the selected bids are compatible;

d) determining at said computer, in response to the bid information, whether the auction should continue or terminate; and e) transmitting a message to users indicating that the auction will continue in response to a determination to continue the auction, said message including an updated current proposed price for at least one of the types of items.

103. A method as recited in claim 102 wherein the selecting further includes constraining the selection such that the sets $S_i$ identified by the selected bids are disjoint.

104. A method as recited in claim 103 wherein the items comprise television licenses or associated derivative rights.

105. A method as recited in claim 102 wherein the auction is conducted in multiple rounds and the determining includes comparing the sum of the values of the selected bids with a function of the sum of the values of the selected bids of an earlier round.

106. A method as recited in claim 102 wherein the auction is conducted in multiple rounds and the determining includes considering whether any new bids were submitted by any user in a round.

107. A method as recited in claim 102 wherein the determining includes comparing the sum of bids with an amount offered.

108. A method as recited in claim 102 which further includes limiting bids from a particular user based on previous bidding activity by said particular user.

* * * * *